(12) United States Patent
Eleish

(10) Patent No.: US 11,436,274 B2
(45) Date of Patent: Sep. 6, 2022

(54) VISUAL ACCESS CODE

(71) Applicant: REGWEZ, INC., Foster City, CA (US)

(72) Inventor: Ragy Farouk Eleish, Foster City, CA (US)

(73) Assignee: REGWEZ, INC., Foster City, CA (US)

( * ) Notice: Subject to any disclaimer, the term of this patent is extended or adjusted under 35 U.S.C. 154(b) by 1046 days.

(21) Appl. No.: 15/410,648

(22) Filed: Jan. 19, 2017

(65) Prior Publication Data

US 2017/0206346 A1    Jul. 20, 2017

Related U.S. Application Data

(60) Provisional application No. 62/280,653, filed on Jan. 19, 2016, provisional application No. 62/280,674, (Continued)

(51) Int. Cl.
*G06F 21/36* (2013.01)
*G06F 3/0482* (2013.01)
(Continued)

(52) U.S. Cl.
CPC ............ *G06F 16/58* (2019.01); *G06F 3/0482* (2013.01); *G06F 3/0486* (2013.01); (Continued)

(58) Field of Classification Search
CPC .......... G06F 21/36; G06F 21/6218; G06F 2221/2133; G06F 2221/2149; G06F 3/0482; G06F 3/04842; G06F 3/0486; G06F 3/04883; G06F 3/061; G06F 3/0638; G06F 3/0673; G06F 17/248; G06F 17/2785; G06F 17/3002; G06F 17/30056; G06F 17/30256; G06F 17/30268; G06F 17/3028; (Continued)

(56) References Cited

U.S. PATENT DOCUMENTS

| | | | |
|---|---|---|---|
| 5,220,604 | A | 6/1993 | Gasser et al. |
| 5,315,657 | A | 5/1994 | Abadi et al. |

(Continued)

FOREIGN PATENT DOCUMENTS

| | | |
|---|---|---|
| CN | 101213818 A | 7/2008 |
| CN | 101431472 B | 5/2011 |

(Continued)

OTHER PUBLICATIONS

International Search Report and Written Opinion for related PCT/US2017/014186, dated Apr. 19, 2017, in 11 pages.

(Continued)

*Primary Examiner* — Joseph P Hirl
*Assistant Examiner* — Thomas A Gyorfi
(74) *Attorney, Agent, or Firm* — Procopio, Cory, Hargreaves & Savitch LLP

(57) ABSTRACT

A method for registering and authenticating a user based on a visual access code. The method includes presenting, to the user, images; receiving a selection of a first image; receiving a selection of at least a first set of hotspots from a plurality of hotspots included in the first image; and generating a visual access code based at least in part on the selection of the first image and the first set of hotspots.

20 Claims, 47 Drawing Sheets

Step 1 Select an image from a set of images

Step 2 Select a set of different hotspots on the image

Related U.S. Application Data filed on Jan. 19, 2016, provisional application No. 62/280,671, filed on Jan. 19, 2016, provisional application No. 62/280,647, filed on Jan. 19, 2016.

(51) Int. Cl.
| | |
|---|---|
| *G06F 16/58* | (2019.01) |
| *G06F 16/583* | (2019.01) |
| *G06F 16/41* | (2019.01) |
| *G06F 16/51* | (2019.01) |
| *G06F 16/248* | (2019.01) |
| *G06F 16/28* | (2019.01) |
| *G06F 16/901* | (2019.01) |
| *G06F 16/2458* | (2019.01) |
| *G06F 16/9535* | (2019.01) |
| *H04L 9/40* | (2022.01) |
| *G06F 16/438* | (2019.01) |
| *G06F 40/30* | (2020.01) |
| *G06F 40/186* | (2020.01) |
| *G06F 3/0486* | (2013.01) |
| *G06F 3/04883* | (2022.01) |
| *H04L 67/50* | (2022.01) |
| *G06F 3/04842* | (2022.01) |
| *G06F 3/06* | (2006.01) |
| *G06F 21/62* | (2013.01) |

(52) U.S. Cl.
CPC ...... *G06F 3/04842* (2013.01); *G06F 3/04883* (2013.01); *G06F 3/061* (2013.01); *G06F 3/0638* (2013.01); *G06F 3/0673* (2013.01); *G06F 16/248* (2019.01); *G06F 16/2468* (2019.01); *G06F 16/289* (2019.01); *G06F 16/41* (2019.01); *G06F 16/4393* (2019.01); *G06F 16/51* (2019.01); *G06F 16/5838* (2019.01); *G06F 16/5866* (2019.01); *G06F 16/901* (2019.01); *G06F 16/9535* (2019.01); *G06F 21/36* (2013.01); *G06F 21/6218* (2013.01); *G06F 40/186* (2020.01); *G06F 40/30* (2020.01); *H04L 63/10* (2013.01); *H04L 63/101* (2013.01); *H04L 67/22* (2013.01); *G06F 2221/2113* (2013.01); *G06F 2221/2133* (2013.01); *G06F 2221/2147* (2013.01); *G06F 2221/2149* (2013.01); *H04L 63/083* (2013.01)

(58) Field of Classification Search
CPC ......... G06F 17/30542; G06F 17/30554; G06F 17/30607; G06F 17/30867; G06F 17/30946; H04L 63/083; H04L 63/10; H04L 63/101; H04L 67/22
See application file for complete search history.

(56) References Cited

U.S. PATENT DOCUMENTS

| | | | |
|---|---|---|---|
| 5,560,005 A | 9/1996 | Hoover | |
| 5,983,237 A | 11/1999 | Jain et al. | |
| 6,630,928 B1* | 10/2003 | McIntyre | G06F 3/04886 |
| | | | 345/173 |
| 6,757,680 B1 | 6/2004 | Choy | |
| 6,947,959 B1 | 9/2005 | Gill | |
| 7,076,558 B1 | 7/2006 | Dunn | |
| 7,325,248 B2 | 1/2008 | Syvänne et al. | |
| 7,636,733 B1 | 12/2009 | Rothmuller | |
| 7,805,531 B2 | 9/2010 | Groll et al. | |
| 7,856,652 B2 | 12/2010 | Hieda | |
| 7,925,666 B1 | 4/2011 | Johnson | |
| 8,041,643 B2 | 10/2011 | Mukerji et al. | |
| 8,176,562 B1 | 5/2012 | Hernacki et al. | |
| 8,505,071 B2* | 8/2013 | Fritz | H04L 63/08 |
| | | | 726/2 |
| 8,528,047 B2 | 9/2013 | Terzis et al. | |
| 8,555,365 B2 | 10/2013 | Shi | |
| 8,561,147 B2 | 10/2013 | Lee et al. | |
| 8,589,402 B1 | 11/2013 | Iampietro et al. | |
| 8,595,788 B2 | 11/2013 | Lim | |
| 8,661,036 B2 | 2/2014 | Turski et al. | |
| 8,862,894 B2 | 10/2014 | Hoffman et al. | |
| 8,935,792 B1 | 1/2015 | Spurlock et al. | |
| 9,218,364 B1 | 12/2015 | Garrigues et al. | |
| 9,430,636 B2 | 8/2016 | Hayton | |
| 9,471,767 B2* | 10/2016 | Akula | G06F 21/36 |
| 9,471,795 B2 | 10/2016 | Jayaraman et al. | |
| 9,516,028 B1 | 12/2016 | Andruschuk | |
| 9,887,992 B1* | 2/2018 | Venkat | H04L 63/0853 |
| 9,959,398 B1 | 5/2018 | Blair et al. | |
| 2001/0007133 A1 | 7/2001 | Moriconi | |
| 2002/0188602 A1 | 12/2002 | Stubler et al. | |
| 2003/0046586 A1 | 3/2003 | Bheemarasetti et al. | |
| 2003/0195883 A1 | 10/2003 | Mojsilovic et al. | |
| 2004/0044776 A1 | 3/2004 | Larkin | |
| 2004/0123160 A1* | 6/2004 | Mizrah | G06F 21/31 |
| | | | 726/5 |
| 2004/0177319 A1 | 9/2004 | Horn | |
| 2005/0044411 A1 | 2/2005 | Somin et al. | |
| 2005/0055380 A1 | 3/2005 | Thompson et al. | |
| 2005/0157647 A1 | 7/2005 | Sterne et al. | |
| 2006/0112188 A1 | 5/2006 | Albanese et al. | |
| 2006/0136246 A1 | 6/2006 | Tu | |
| 2006/0174334 A1 | 8/2006 | Perlin et al. | |
| 2006/0285514 A1 | 12/2006 | Hoerl et al. | |
| 2006/0294578 A1 | 12/2006 | Burke et al. | |
| 2007/0038725 A1* | 2/2007 | Kwak | G06F 17/30017 |
| | | | 709/219 |
| 2007/0050362 A1 | 3/2007 | Low et al. | |
| 2007/0056031 A1 | 3/2007 | Sivaramakrishna Iyer | |
| 2007/0057048 A1 | 3/2007 | Plotkin et al. | |
| 2007/0118525 A1 | 5/2007 | Svendsen | |
| 2007/0159482 A1 | 7/2007 | Yuan et al. | |
| 2007/0226650 A1 | 9/2007 | Hintermeister et al. | |
| 2007/0244896 A1 | 10/2007 | Liu et al. | |
| 2007/0288714 A1 | 12/2007 | Nakamura | |
| 2008/0091723 A1 | 4/2008 | Zuckerberg et al. | |
| 2008/0112405 A1 | 5/2008 | Cholas et al. | |
| 2008/0216163 A1* | 9/2008 | Pratte | G06F 21/316 |
| | | | 726/7 |
| 2008/0306954 A1 | 12/2008 | Hornqvist | |
| 2008/0307362 A1 | 12/2008 | Chaudhri et al. | |
| 2009/0157738 A1 | 6/2009 | Lection | |
| 2009/0198732 A1 | 8/2009 | Ross et al. | |
| 2009/0288028 A1 | 11/2009 | Gohda et al. | |
| 2009/0307261 A1 | 12/2009 | Lindley et al. | |
| 2010/0030734 A1 | 2/2010 | Chunilal | |
| 2010/0063961 A1 | 3/2010 | Guiheneuf | |
| 2010/0070448 A1 | 3/2010 | Omoigui | |
| 2010/0107125 A1 | 4/2010 | Ockene et al. | |
| 2010/0115472 A1 | 5/2010 | Lee et al. | |
| 2010/0186074 A1* | 7/2010 | Stavrou | G06F 21/36 |
| | | | 726/7 |
| 2010/0287382 A1* | 11/2010 | Gyorffy | G06F 21/36 |
| | | | 713/185 |
| 2011/0002341 A1 | 1/2011 | Damola et al. | |
| 2011/0010388 A1 | 1/2011 | MacLaurin | |
| 2011/0072375 A1 | 3/2011 | Victor | |
| 2011/0113488 A1 | 5/2011 | Schultz et al. | |
| 2011/0191271 A1 | 8/2011 | Baker et al. | |
| 2011/0191417 A1 | 8/2011 | Rathod | |
| 2011/0202982 A1 | 8/2011 | Alexander et al. | |
| 2011/0211764 A1 | 9/2011 | Krupka et al. | |
| 2011/0212717 A1 | 9/2011 | Rhoads et al. | |
| 2011/0247052 A1 | 10/2011 | Kim et al. | |
| 2011/0277022 A1 | 11/2011 | Weizman | |
| 2011/0314071 A1 | 12/2011 | Johnson et al. | |
| 2012/0023103 A1 | 1/2012 | Soderberg et al. | |
| 2012/0076427 A1 | 3/2012 | Hibino et al. | |
| 2012/0110632 A1 | 5/2012 | Burghart | |
| 2012/0114199 A1 | 5/2012 | Panyam et al. | |
| 2012/0136936 A1 | 5/2012 | Quintuna | |

(56) References Cited

U.S. PATENT DOCUMENTS

| | | |
|---|---|---|
| 2012/0143894 A1 | 6/2012 | Ferguson et al. |
| 2012/0143931 A1 | 6/2012 | Rosenberger et al. |
| 2012/0193409 A1* | 8/2012 | Rothschild ......... H04N 1/00244 235/375 |
| 2012/0197919 A1 | 8/2012 | Chen et al. |
| 2012/0240073 A1 | 9/2012 | McCann |
| 2012/0291108 A1* | 11/2012 | Talamo ................ H04L 9/3273 726/6 |
| 2012/0291120 A1* | 11/2012 | Griffin .................... G06F 21/36 726/19 |
| 2012/0324353 A1 | 12/2012 | Forbey et al. |
| 2013/0036462 A1 | 2/2013 | Krishnamurthi |
| 2013/0097697 A1* | 4/2013 | Zhu ........................ G06F 21/31 726/18 |
| 2013/0103660 A1 | 4/2013 | Welsh et al. |
| 2013/0142039 A1 | 6/2013 | Bloch et al. |
| 2013/0152160 A1 | 6/2013 | Smith et al. |
| 2013/0167055 A1 | 6/2013 | Penev et al. |
| 2013/0212151 A1 | 8/2013 | Herbach et al. |
| 2013/0223614 A1 | 8/2013 | Tuchman et al. |
| 2013/0246470 A1 | 9/2013 | Price et al. |
| 2013/0290818 A1 | 10/2013 | Arrasvuori et al. |
| 2013/0312060 A1 | 11/2013 | Petkovic et al. |
| 2013/0314566 A1 | 11/2013 | Walker et al. |
| 2013/0346068 A1 | 12/2013 | Solem et al. |
| 2014/0040828 A1 | 2/2014 | Choi et al. |
| 2014/0047386 A1 | 2/2014 | Lynch et al. |
| 2014/0047527 A1* | 2/2014 | Ngo ........................ H04L 63/08 726/7 |
| 2014/0075004 A1 | 3/2014 | Van Dusen et al. |
| 2014/0098671 A1 | 4/2014 | Raleigh et al. |
| 2014/0130182 A1 | 5/2014 | Yackanich et al. |
| 2014/0229739 A1 | 8/2014 | Roth et al. |
| 2014/0258251 A1 | 9/2014 | Bestgen et al. |
| 2014/0270407 A1 | 9/2014 | Balakrishnan et al. |
| 2014/0310792 A1 | 10/2014 | Hyland et al. |
| 2014/0324823 A1 | 10/2014 | Iorio |
| 2014/0343989 A1 | 11/2014 | Martini |
| 2014/0380420 A1 | 12/2014 | Wang et al. |
| 2015/0074107 A1 | 3/2015 | Johnson et al. |
| 2015/0085317 A1 | 3/2015 | Kim et al. |
| 2015/0100578 A1 | 4/2015 | Rosen et al. |
| 2015/0169616 A1 | 6/2015 | Benraz |
| 2015/0261789 A1 | 9/2015 | Wong |
| 2015/0278486 A1 | 10/2015 | Huang et al. |
| 2015/0339324 A1 | 11/2015 | Westmoreland et al. |
| 2016/0042166 A1* | 2/2016 | Kang ..................... G06F 21/32 726/7 |
| 2016/0078218 A1* | 3/2016 | Rozenfeld ............... G06F 21/45 726/6 |
| 2016/0092557 A1 | 3/2016 | Stojanovic et al. |
| 2016/0140146 A1 | 5/2016 | Wexler et al. |
| 2016/0162695 A1 | 6/2016 | Scafaria et al. |
| 2016/0314314 A1 | 10/2016 | Sirbu |
| 2016/0352705 A1 | 12/2016 | Lockhart et al. |
| 2016/0379189 A1 | 12/2016 | Gschwind et al. |
| 2017/0054756 A1 | 2/2017 | Jones et al. |
| 2017/0118025 A1 | 4/2017 | Shastri et al. |
| 2017/0177706 A1 | 6/2017 | Ben-Tzur et al. |
| 2017/0185632 A1 | 6/2017 | Lee |
| 2017/0185670 A1 | 6/2017 | Dua et al. |
| 2017/0206346 A1 | 7/2017 | Eleish |
| 2017/0249308 A1 | 8/2017 | Cronin |
| 2017/0257358 A1 | 9/2017 | Ebrahimi et al. |
| 2017/0257372 A1 | 9/2017 | Meriac |
| 2017/0323361 A1 | 11/2017 | Gir |
| 2017/0351417 A1 | 12/2017 | Manico et al. |
| 2018/0025003 A1 | 1/2018 | Marriott et al. |
| 2018/0205739 A1 | 7/2018 | Sommerfelt |

FOREIGN PATENT DOCUMENTS

| | | |
|---|---|---|
| JP | 2013025680 A | 2/2013 |
| JP | 2014520313 A | 8/2014 |
| WO | 2011111115 A1 | 9/2011 |
| WO | 2017049302 A1 | 3/2017 |

OTHER PUBLICATIONS

Office Action for related U.S. Appl. No. 15/410,679, dated Apr. 18, 2019, in 42 pages.

Office Action for related U.S. Appl. No. 15/410,654 dated Nov. 6, 2018 in 34 pages.

Office Action for related U.S. Appl. No. 15/410,658 dated Oct. 17, 2018 in 19 pages.

Office Action for related U.S. Appl. No. 15/410,666 dated Dec. 5, 2018 in 23 pages.

Office Action for related U.S. Appl. No. 15/410,668 dated Aug. 7, 2018 in 27 pages.

Office Action for related U.S. Appl. No. 15/410,671 dated Jun. 7, 2018 in 48 pages.

Office Action for related U.S. Appl. No. 15/410,675 dated Sep. 5, 2018 in 37 pages.

Office Action for related U.S. Appl. No. 15/410,679 dated Sep. 21, 2018 in 29 pages.

Wikipedia. "SAML Metadata." https://en.wikipedia.org/wiki/SAML_Metadata (Year: 2018).

Wikipedia. "Single sign-on." https://en.wikipedia.org/wiki/Single_sign-on (Year: 2018).

Extended European Search Report for related EP Patent Application No. 17741947.0, dated Jun. 7, 2019, in 10 pages.

International Search Report and Written Opinion for related PCT application No. PCT/US2019/024306, dated Jul. 2, 2019, in 13 pages.

Klemperer et al. "Tag, You Can See It! Using Tags for Access Control in Photo Sharing." Proceedings of the 2012 ACM Annual Conference on Human Factors in Computing Systems, CHI '12. May 5, 2012. Austin, Texas, US.pp. 377-386.

Samarati et al. "Access Control: Policies, Models, and Mechanisms." Foundations of Security Analysis and Design: Tutorial Lectures. International School on Foundations of Security Analysis and Design. Sep. 18, 2000. vol. 2171. pp. 137-196.

Yeung et al. "Providing Access Control to Online Photo Albums Based on Tags and Linked Data." Jan. 1, 2009. pp. 9-14. Retrieved from http://citeseerx.ist.psu.edu/viewdoc/download?doi=10.1.1.494.8922&rep=rep1&type=pdf on May 28, 2019.

Office Action for related U.S. Appl. No. 15/410,671 dated May 13, 2020 in 32 pages.

Office Action for related U.S. Appl. No. 15/410,679 dated May 1, 2020 in 31 pages.

Office Action for related U.S. Appl. No. 15/410,666 dated Nov. 27, 2019 in 16 pages.

Office Action for related U.S. Appl. No. 15/410,671 dated Aug. 22, 2019 in 31 pages.

Office Action for related U.S. Appl. No. 15/952,533, dated Jan. 13, 2020, in 57 pages.

Notice of Allowance for related U.S. Appl. No. 15/410,675, dated Feb. 3, 2020, in 27 pages.

Notice of Allowance for related U.S. Appl. No. 15/410,666, dated Jul. 2, 2020, in 25 pages.

Office Action dated Aug. 21, 2020 for related U.S. Appl. No. 15/952,533, in 20 pages.

"LastPass Manual" article dated Jan. 11, 2014 as verified by the Internet Archive (194 pages) https://web.archive.org/web/20141011040836/https://helpdesk.lastpass.com/full.pdf (Year: 2014).

Gibson et al. "Security Now! Episode 256—LastPass." Transcript of recording originally broadcast on Jul. 9, 2010 (35 pages) https://www.grc.com/sn/sn-256.pdf (Year: 2010).

Office Action dated Oct. 1, 2020 for related U.S. Appl. No. 15/410,671, in 32 pages.

Office Action dated Sep. 29, 2020 for related U.S. Appl. No. 15/410,679, in 25 pages.

(56) References Cited

OTHER PUBLICATIONS

Office Action for related CN Applciation No. 2017800119436, dated Jul. 30, 2021, 9 pages.
Ross et al. "Stronger Password Authentication Using Browser Extensions", USENIX Association; 15 pages, Jun. 6, 2005.

* cited by examiner

Single or Multiple Association Picking Process
A click in this area will convert the dialog to a full fledged regular dialog that will accept more information about the Selfie.
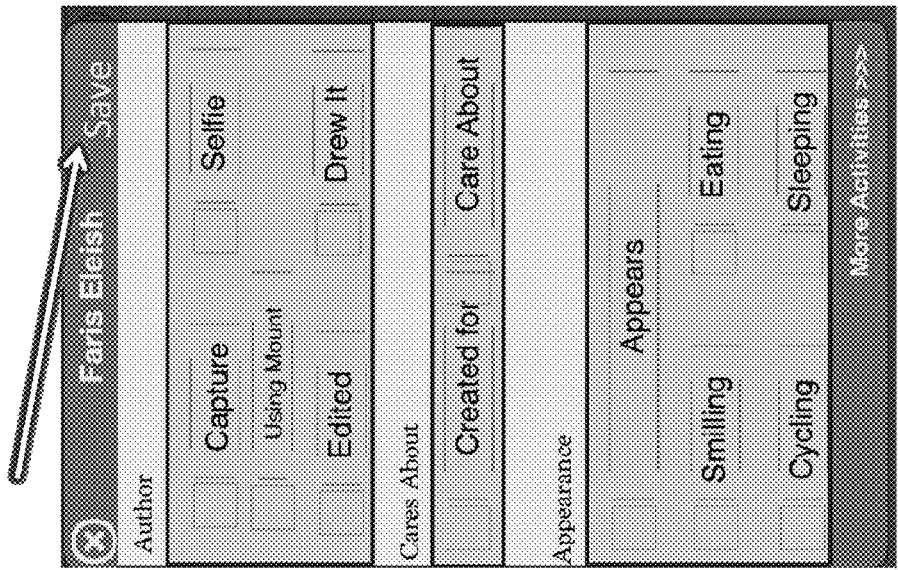
Step 1
A "Save" button now appears to indicate to the user that this is now a two step process that needs confirmation
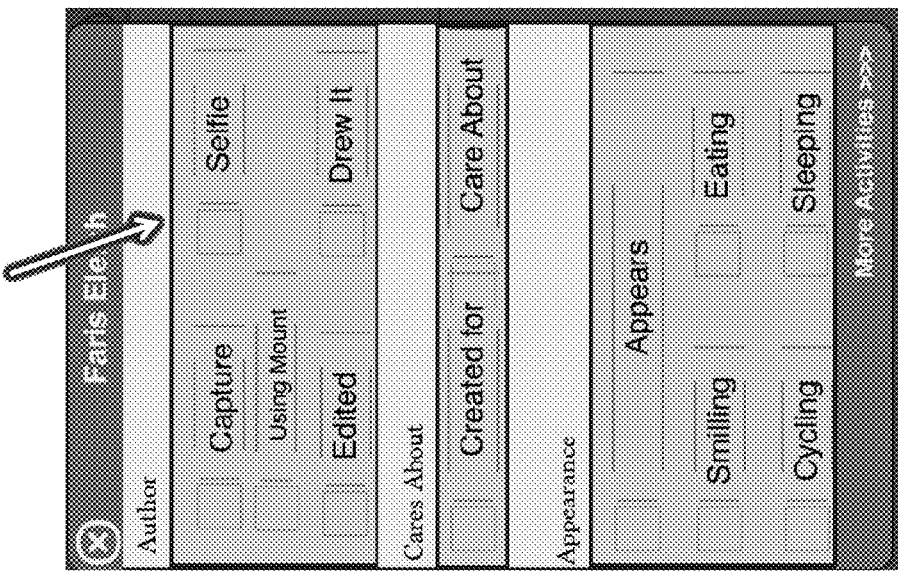
Step 2
FIG. 7B

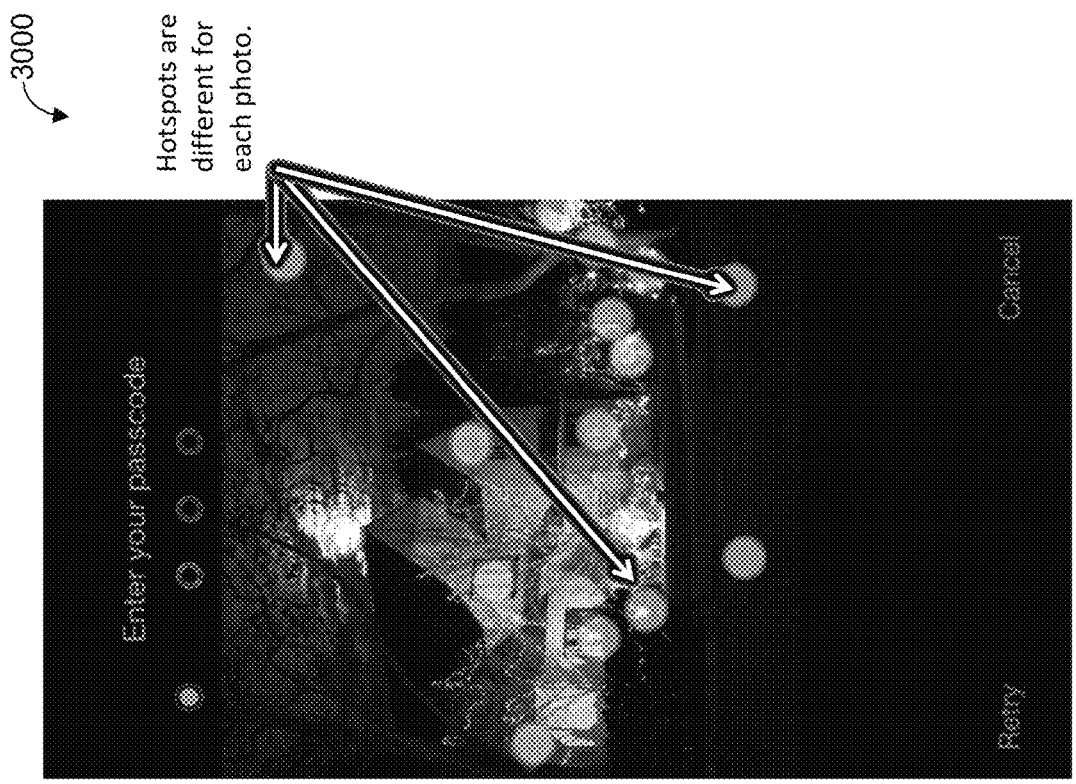
Hotspots are different for each photo.
Step 2. Select a set of different hotspots on the image
Step 1. Select an image from a set of images
FIG. 30

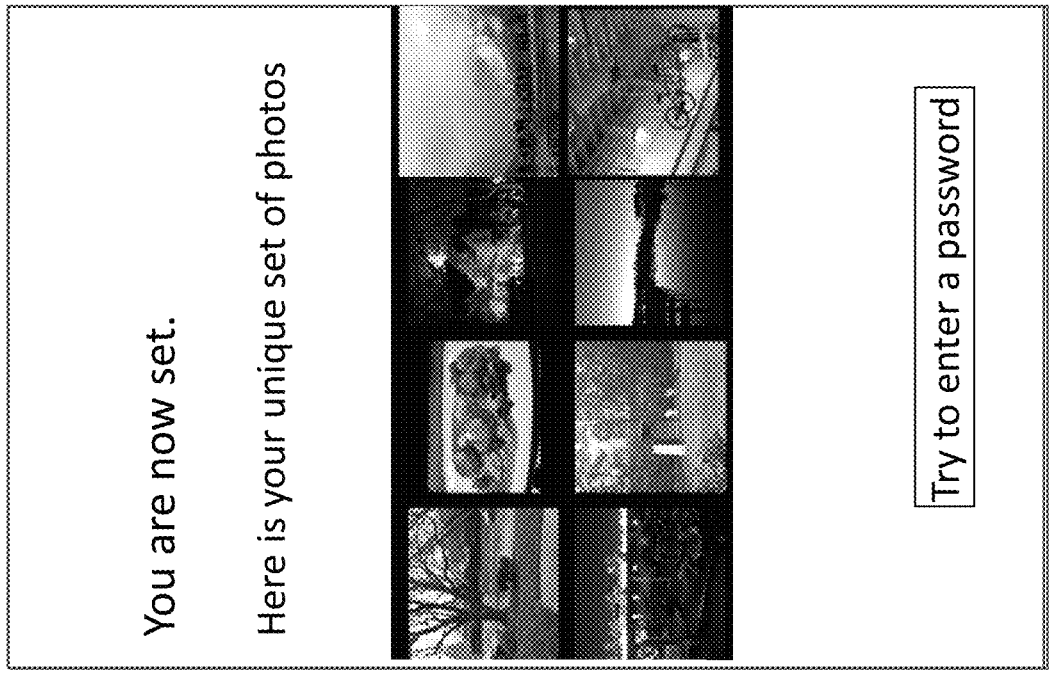
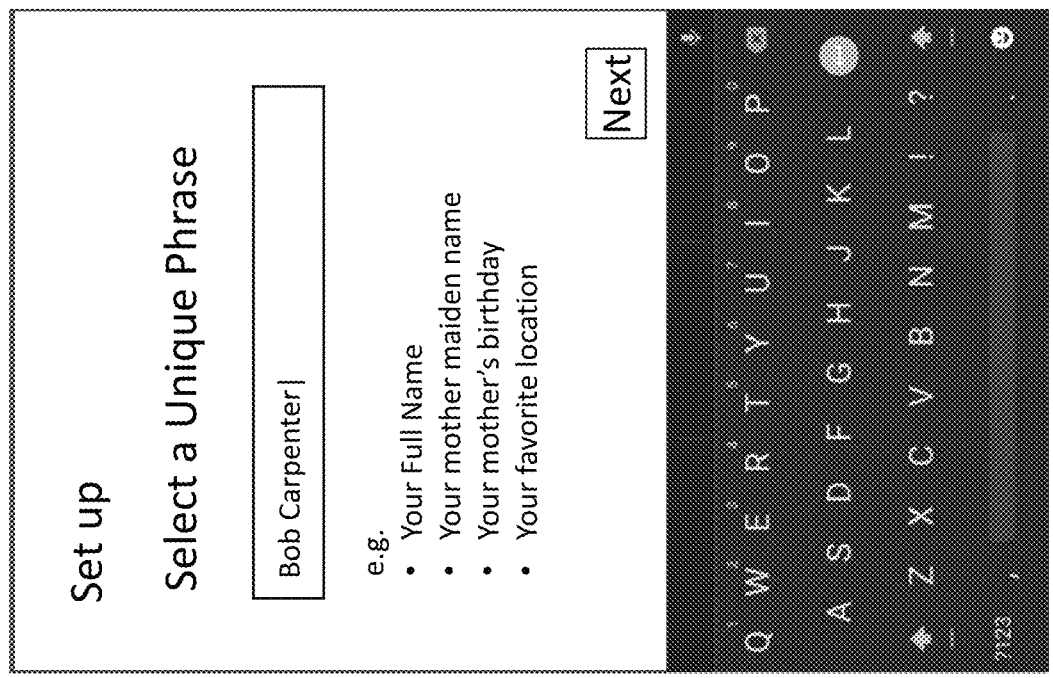
FIG. 37

FIG. 38

VISUAL ACCESS CODE

CROSS-REFERENCE TO RELATED APPLICATIONS

This application claims priority to provisional U.S. Provisional Patent App. No. 62/280,647, filed on Jan. 19, 2016, U.S. Provisional Patent App. No. 62/280,653, filed on Jan. 19, 2016, U.S. Provisional Patent App. No. 62/280,671, filed on Jan. 19, 2016, U.S. Provisional Patent App. No. 62/280,674, filed on Jan. 19, 2016, which are incorporated herein by reference.

BACKGROUND

1. Technical Field

The various embodiments described herein are related to user authentication and more specifically to systems and methods for a visual access code.

2. Related Art

Conventional media object indexing techniques are limited. For example, a library of media objects may be organized according to a tree hierarchy (e.g., folders and sub-folders, or albums and sub-albums) where each node corresponds to a separate label. Membership of a media object at a node in the tree (e.g., folder or album) is maintained manually. Thus, reclassifying media objects from one type of classification (e.g., location) to another (e.g., event) requires reclassification of every media object in the library.

Keyword based classifications (e.g., textual tagging) may be better adapted to creating and maintain dynamic albums or folders. However, keyword based classifications technique involve manual input of addition of every possible tag permutation. Thus, a multitude of tags may have to be added for just a single location (e.g., nature, park, tree, grass). Moreover, some tags tend to be ambiguous (e.g., "Paris" could be a city name or a person name).

Classification based on direct attributes (e.g., Apple® iPhoto®) allows a user to create dynamic albums that are based on direct attributes associated to the constituent media object. For example, an album can include all photos from a certain timeframe (e.g., from Apr. 11, 2013 to May 5, 2014). However, direct attribute systems offer poor user interface (UI) and impose significant limitations on searches conducted based on direct attributes.

Limited semantic tagging (e.g., Facebook® tagging) provides dynamic classification of media objects based on a limited set of indirect attributes. Specifically, tags do not distinguish between different types of relationships that may exist with respect to the media object. For example, a person who was tagged in a photo can appear in the photo, have an interest in the content of the photo, or is a creator of the photo.

Fully-automated media object indexing techniques are generally inaccurate. For example, image recognition systems have only a 70% success rate at identifying even a generic object (e.g., a shoe) depicted in a media object. These systems further are not able to determine relationships with respect to the media object (e.g., an owner, designer, and/or retailer for the shoe). By contrast, manual methods to index media objects tend to be tedious and error prone while offering little user incentive.

What is needed are systems and methods for indexing media objects that can supports advanced searching and browsing capabilities.

SUMMARY

Systems and methods for authentication using visual access code are provided. According to various embodiments, a system for registering and authenticating a user is based on a visual access code. The method includes presenting, to the user, images, receiving a selection of a first image, receiving a selection of at least a first set of hotspots from a plurality of hotspots included in the first image; and generating a visual access code based at least in part on the selection of the first image and the first set of hotspots.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which:

FIG. 7B illustrates single and multiple association selection according to various embodiments;

FIG. 30 illustrates a process for configuring a visual access code according to various embodiments;

FIG. 37 illustrates an example mobile interface in accordance with various embodiments;

FIG. 38 illustrates an example implementation of entering a visual access code according to an example embodiment;

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Figure 1:
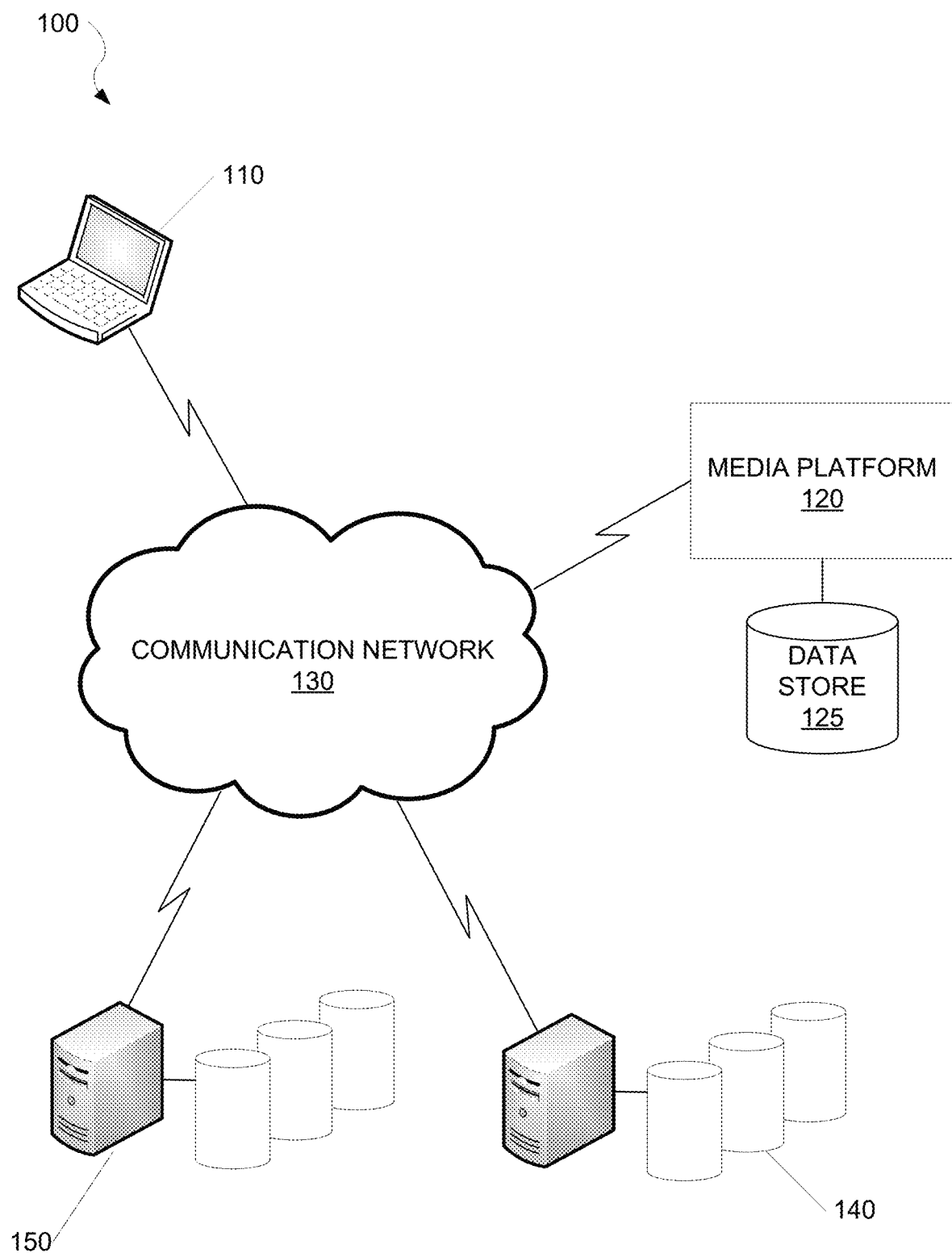
FIG. 1 is a network diagram illustrating a network environment various embodiments.

FIG. 1 is a network diagram illustrating a network environment 100 according to various embodiments. Referring to FIG. 1, a user device 110 communicates with a media platform 120. The user device 110 may be any device that is capable of communication with or causing communication with the media platform 120 through a wired or a wireless connection. For example, the user device 110 may be a wired or wireless communication device including, for example, but not limited to, a smartphone, a wearable device, a tablet personal computer (PC), a laptop, a desktop PC, a personal entertainment system, and an embedded processing system.

The user device 110 may communicate with the media platform 120 via a communication network 130. In various embodiments, the communication network 130 represents one or more wired and/or wireless connections. For example, the communication network 130 may include, for example, but not limited to, a wired and/or wireless local area network (LAN), a wired and/or wireless wide area network (WAN), and any combinations thereof.

The media platform 120 may be communicatively coupled with a local data store 125. In addition, the media platform 120 may further communicate with a plurality of remote and/or third party data sources including, for example, but not limited to, a first data source 140 and a second data source 150.

Association Model

Semantic Indexing

In various embodiments, the media platform 120 can associate a media object with semantic information that includes, for example, but not limited to, attributes, relationships, and classifications. The semantic information can be inherited from one or more other objects (i.e., including other media objects) that each provides an individual set of attributes, relationships, and/or classifications.

For example one media object (e.g., a photo) can depict a smiling Bill Gates. The media object can inherit all attributes of Bill Gates as a person and the relationships Bill Gates has with other people (e.g., age, an entrepreneur, an influencer, a billionaire, a philanthropist, a father, a family man, a techie, an American, etc.). Smiling implies that Bill Gates appeared in the photo and was in a good mood.

John Smith may be interested in the contents of the media object (e.g., the photo) depicting Bill Gates. Thus, the media object can further inherit all attributes of John Smith as a person and the relationships John Smith has with other people although John Smith is not depicted in the photo.

As another example, a media object (e.g., a video) can depict a vehicle belonging to Alice after an accident. The media object can inherit all attributes of Alice's car (e.g., make, model, year, mileage, and maintenance records), which can be determined via a third party source (e.g., Carfax®). The media object can further inherit all attributes about Alice including, for example, but not limited to, Alice's driving records, professional activities, and biographic information. In addition, the media object can also inherit all attributes about the particular accident (e.g., classification as a minor or a major accident).

In various embodiments, the media platform 120 can allow the media object to be searched via any of corresponding semantic information. For example, the media object depicting Bill Gates may be found through a search for photos of 50-year old men who are smiling. Similarly, the video of Alice's car accident may be found through a search for videos of cars owned by women that are involved in accidents.

It is to be understood that the media object may be any kind of computer stored file including, for example, but not limited to, a text and a multimedia (e.g., photograph, video) file.

Figure 2:
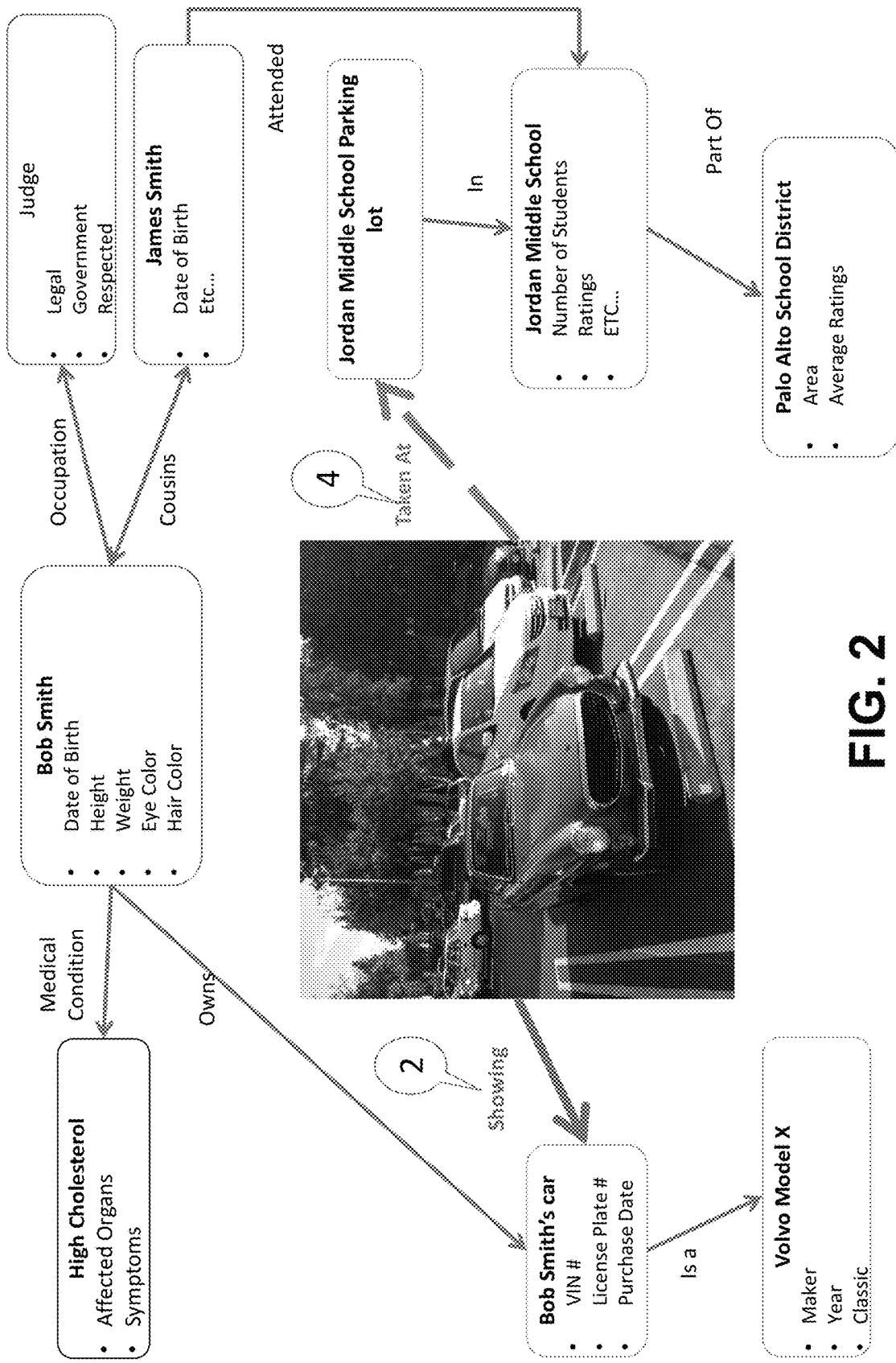
FIG. 2 illustrates semantic indexing according to various embodiments.
Figure 3:
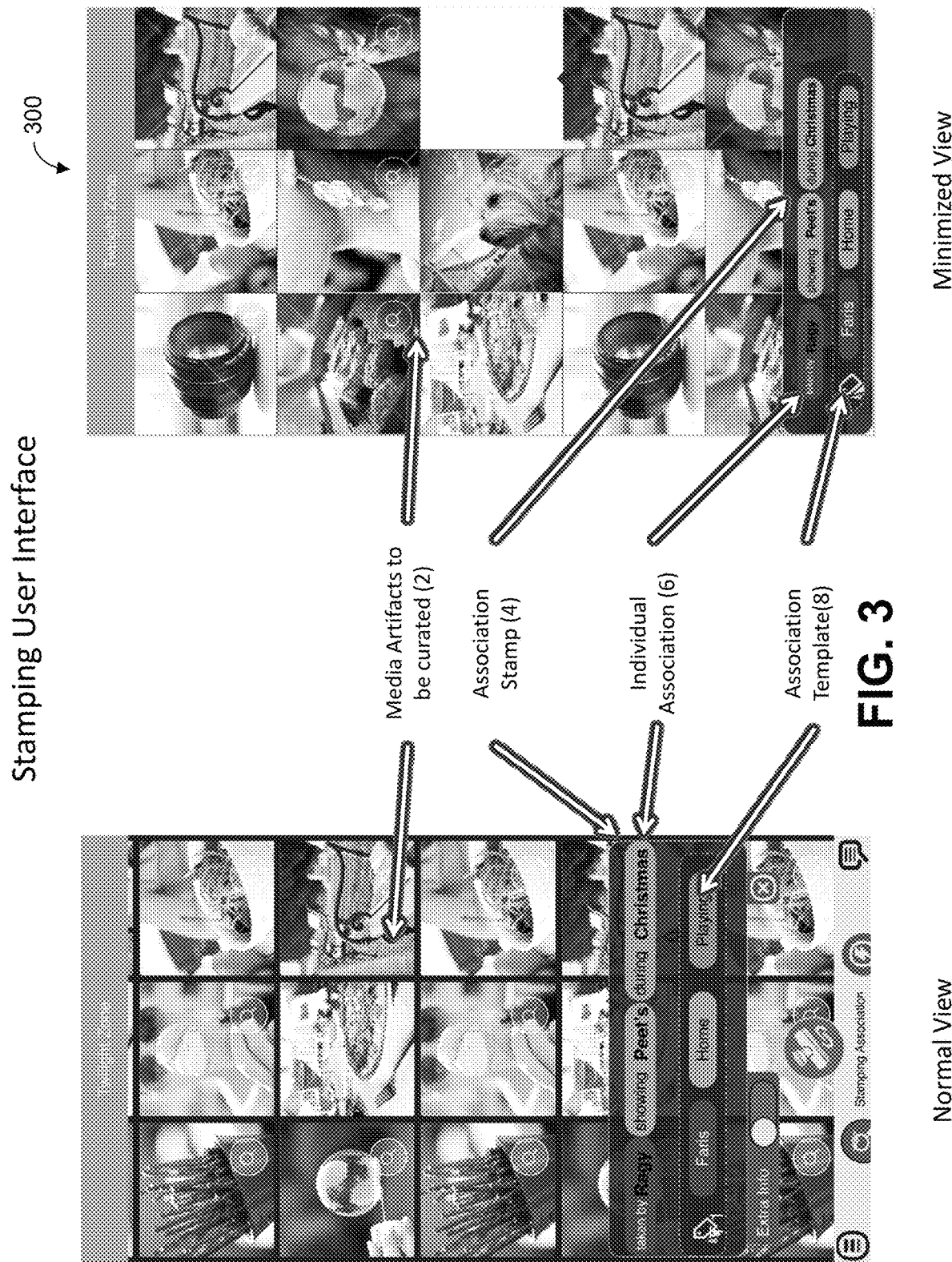
FIG. 3 illustrates a stamping user interface according to various embodiments.

FIG. 2 illustrates semantic indexing according to various embodiments. Referring to FIG. 2, a media object (e.g., a photo of a vehicle) can be associated with a plurality of semantic information including, for example, but not limited to, a manual association 2 and an automatic association 4. In various embodiments, the media platform 120 can generate and add the automatic association 2 based on geolocation information included in the media object's meta-data. Based on the manual association 2 and the automatic association 4, the media object can inherit a plurality of other relationships including, for example, but not limited to, ownership (e.g., Bob Smith) and location (e.g., Jordan Middle School parking lot).

Automatic Association Model

In various embodiments, automatic associations can be added to a media object. For example, automatic associations can be generated based on a geolocation and/or timestamp. Automatic associations can also be generated and added to the media object based on current events (e.g., fairs, holidays, private birthdays, etc.) and weather (e.g., rain, snow, storm). In some embodiments, if the certainty of the automatic association is below a certain threshold, the automatic associations can be presented to a user for confirmation.

Augmented Semantic Information

In various embodiments, the media platform 120 can add new semantic information to a media object, which allows the media object to be searched based on the new semantic information. For example, if Bob Smith retires, then the media object depicting Bob Smith's vehicle is searchable as "photos of cars owned by retired people."

A media object can further be searchable based on new semantic information that has been added to objects having existing associations with the media object. For example, if Bob Smith's son Charlie Smith is added as an object and Charlie Smith is a student at Jordan Middle School, then the media object depicting Bob Smith's vehicle is also searchable as "photos of cars owned by a student's parents."

A system for semantic indexing includes a media platform. In various embodiments, the media platform may comprise one or more hardware processors configured to: receive a first media object associated with a first set of semantic information; and associate the first media object with a second media object associated with a second set of semantic information.

According to an example implementation, the first media object inherits the second set of semantic information associated with the second media object. The first set and second set of semantic information can each includes at least one of attributes, relationships, and classifications. The one or more hardware processors can be configured to automatically generate additional semantic information and associate the automatically generated semantic information with the first media object. The one or more hardware processors can be configured to automatically generate the additional semantic information based at least in part one or more of a geolocation and a timestamp associated with the first media object.

According to another example implementation, the one or more hardware processors are configured to receive additional semantic information from a user and associate the additional semantic received from the user with the first media object. For example, the user can provide the additional semantic information at least in part by indicating an association between the first media object and a third media object associated with a third set of semantic information. In another example, the user provides the additional semantic information at least in part by indicating an association between the first media object and one or more of an attribute, relationship, and classification.

Human-Centric Association Interface

In various embodiments, the media platform 120 presents a user interface (UI) that allows the user to quickly attach semantic information to a media object.

Stamping User Interface

The media platform 120 allows the user to assign semantic information to media content using the stamping UI 300. In various embodiments, the stamping UI 300 allows the user assign semantic information to multiple media object using a single click. The stamping UI 300 provides a stamp area 4 displaying the categories, sources, or values of semantic information to be added. In one example implementation, the user clicks on a target media object from a list 2, the stamp are 4 recommends a list of semantic information based on analysis of the target media object. Analysis of the target media object can include object recognition, metadata analysis, as well as, inspecting semantic information of other media items associated with the target media item. The user has the option to edit the recommended list of semantic information in the stamp area 4 or can accept an entire set of recommendations. For example, a single click by the user can stamp the target media object with the set of semantic information shown in the stamp area 4.

The stamp area 4 can include individual associations 6, which may be added independent of other associations. The stamp area 4 can further include association templates 8. A stamp association template 8 can include a group of semantic categories configured based on commonly used associations. Selecting a stamp association template 8 assigns a set of semantic information for each of the categories in the template. For example, a home stamp associate template can associate the target media object with other media objects associated with home, add semantic information for the geographic location of the home, add relationships to people that are also part of the home category, etc. The stamp association template 8 can be pre-configured for repeated use for commonly used associations.

According to an example embodiment, a system for semantic indexing can include a media platform with one or more processing device configured to: index media objects of the media platform to identify semantic information of each media object; and associate a plurality of media objects based on matching semantic information. In an example, the processing device searches the index of media objects for semantic information in common with the stamp template and based on the search, the processing device sorts the corresponding media objects based on common semantic information; and present the sorted media objects for curation by a user. In some embodiments, the processing device generates a stamp template of the association comprising the common semantic information for applying the association to one or more media object. For example, curation can include applying the stamp template or one or more other associations. The stamp template can be editable to modify semantic information of the association and include multiple associations. In some embodiments, the system includes an interface with stamp templates that allow a user to curate media objects of the media platform by applying an association from a selected stamp template to multiple media objects based on a single selection. In an example, the processing device receives additional semantic information from user input to associate with one or more media object.

Stamping Workflow

Figure 4:
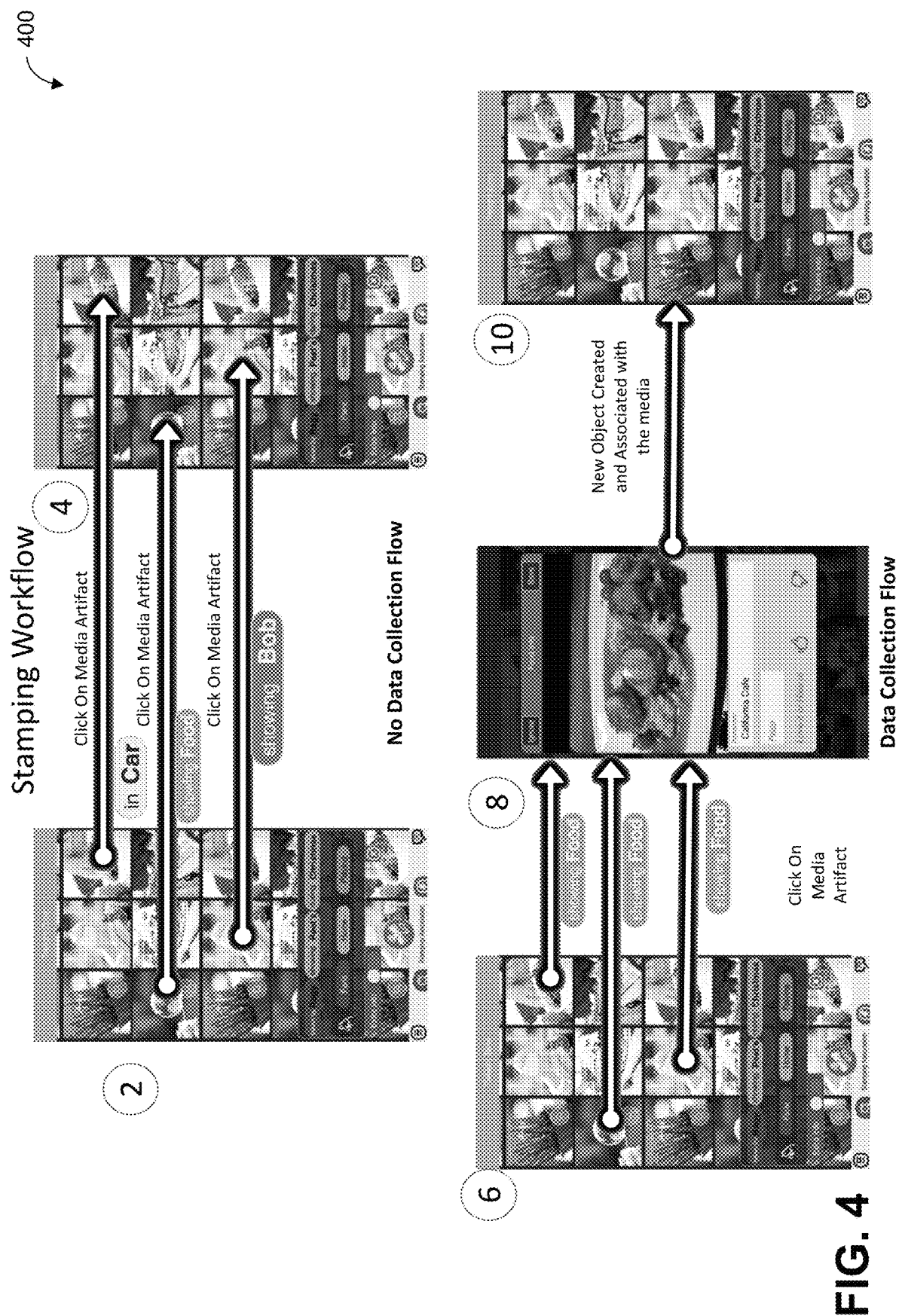
FIG. 4 is a flowchart illustrating a process for stamping according to various embodiments.

FIG. 4 is a flowchart illustrating a process 400 for stamping according to various embodiments. Referring to FIG. 4, in various embodiments, the process 400 can be performed by the media platform 120.

In various embodiments, the process 400 is performed when a data collection mode is selected. As such, the media platform 120 can collect additional information for at least some specific associations in a stamp. That is, objects with common semantic information are identified and the common semantic information can be grouped as an association. The groupings of common semantic information can form a template. When a grouping of semantic information is attached via the stamping action and an actual media object is defined in the system. An association can also form a relationship between objects with common semantic information that allows modifications to propagate.

For example, when the user clicks on a media object shown in a screen display 6, a screen display 8 appears in response to determining that the stamp includes a food item association. In the screen display 8, the UI allows for collecting information about the food. The screen display 8 is object template type specific. After the user activates a save feature, a new object is created (or stored) and the association is assigned to that object.

Alternately, if the data collection mode is not selected, the user can click on a media object and other objects in the stamp area 4 are assocaited with the media object.

In various embodients, the two workflows are part of an overload approach of the media platform 120. The media platform 120 can collect information incrementally as specified by the user. Advantageously, the user is incentivized to expend effort to input extra information because of an enhanced ability to search based on that information using a visual search.

Association Selection Interface

In various embodiments, the user may identify content of a media object, associate the semantic information with the media object, and select a type of the association. Once the user associates content of another media object with the target media object, the target media objects inherits the other associations of the contents of the other media object. Advantageously, the user can efficiently identify and associate content with media object with high accuracy. FIG. 4 illustrates a flowchart for an example data collection process for associating world objects with media content.

Figure 5:
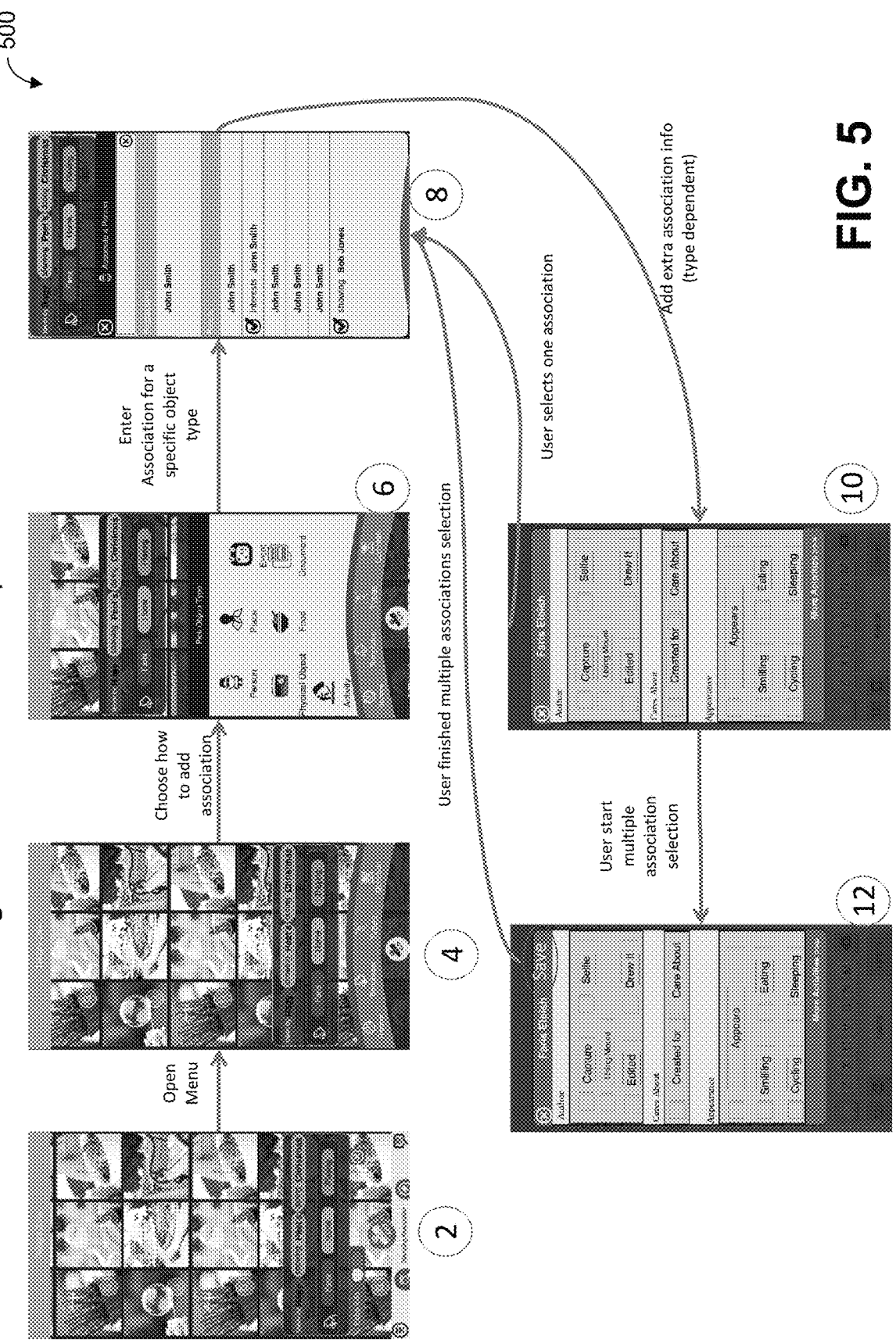
FIG. 5 illustrates a process for adding an association to a stamp according to various embodiments.

FIG. 5 illustrates a process 500 for adding an association to a stamp according to various embodiments. Referring to FIG. 5, the process 500 may be performed by the media platform 120. In a screen display 2, the user can examine media objects to be curated. From the stamp view, the user can see the associations to be added. At the stamp view, the user can stamp the media object by selecting (e.g., clicking, touching, etc.) a photo and all the associations in the stamp will be added to the photo. Alternately, the user can select to add new associations to the stamp.

In response to the user clicking on a stamping mode button, the process advances to a present a screen display 4 where the menu allows the user to select from different processes to add new associations. For example, in some embodiments, the user can add a new association by selecting object types via the screen display 6. When the user selects an object type, the UI switches to screen display 8 (i.e., an object selection screen) that presents a searchable list of possible objects based on the selected object type. The user can search for an object to add. In some embodiments, the screen display 8 includes the stamp icon to provide for easy navigation.

Upon selecting a specific object, an association selection screen display 10 is presented to allow the user to further select an association for the object. The user has the option to can cancel and return without completing the association operation. Alternately, the user can select one or more associations on an association selection screen display 10 to complete the stamping operation. Subsequently or alternatively to the association selection screen 10, the UI provides additional confirmation controls (e.g., save, cancel, etc.) to complete the association, such as depicted on a screen display 12.

Figure 6:
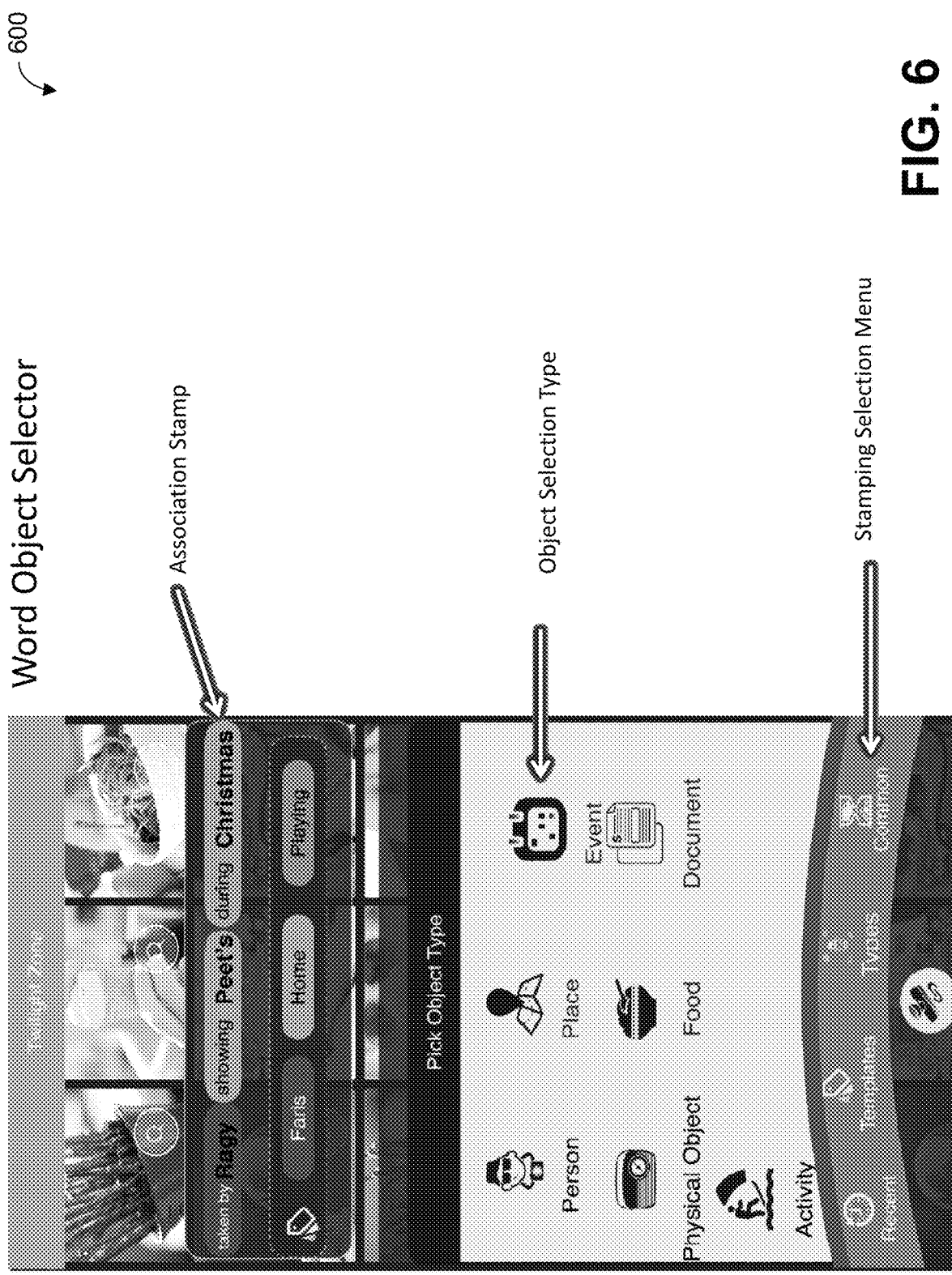
FIG. 6 illustrates an object selector according to various embodiments.

FIG. 6 illustrates an object selector 600 according to various embodiments. The user can select the object type and start a search for various objects to associate. The UI 600 displays the association stamp that displays existing stamps to communicate to the users the objects are already loaded into the stamp.

Association Selection

When the user clicks the menu button to start the association editing mode, the user can select to add the association to the stamp in multiple ways. For example, the user can select from a list of recent associations. In another example, the user can select from a previously configured association template. Each template is a group of associations input by the user. For example, a template can include "baby Jim playing", "Project X", or "expense receipts for project Y." In some embodiments, the media platform 120 allows the user to define and edit a fixed number of templates. Having a limited number of configurable templates allows the user to easily access preconfigured templates without a template management system.

Alternately, the user can select a world object type that allows the user to browse object types to select an association. Additionally, the user can select from common associations, such as general associations configured by an application author. For example, an application that employs thumbnails may use a temporary photo association.

Association Picker Flow

Figure 7A:
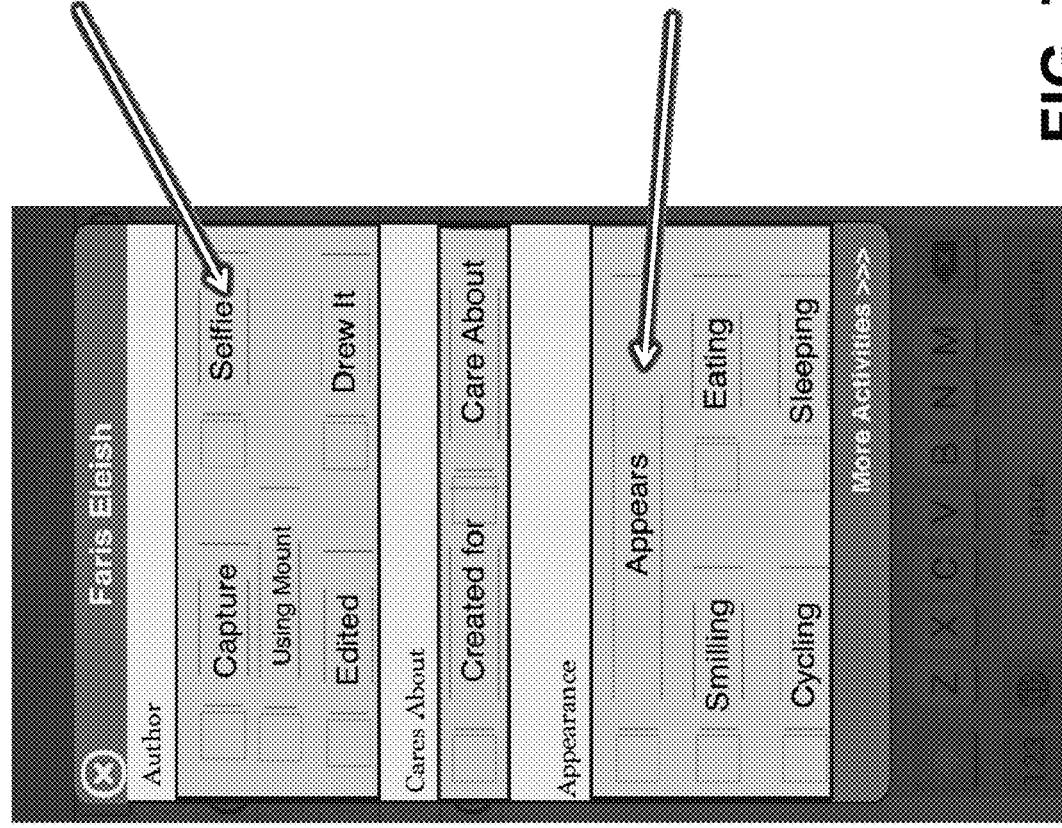
FIG. 7A illustrates an association selector according to various embodiments.

To streamline the association type selection between the world object and a media object, the media platform 120 provides an optimized association selector that allows the user to pick one or more associations. FIG. 7A illustrates an association selector 700 according to an example embodiment.

For example, to select one association, the user can click on the association button or checkbox (e.g., selection), which completes the association selection. To select multiple associations, the user can click the checkbox (e.g., selection) and the association dialog box performs as a multiple selection dialog box. FIG. 7B illustrates single and multiple association selection according to an example embodiment.

Association Search

The media platform 120 enables the user add associations incrementally. Moreover, the media platform 120 allows the user to quickly group the artifacts with common parameters together for faster association. In various embodiments, the media platform 120 links the association process with the search process via the multi-mode user interface. Using the multi-mode user interface, the user can quickly switch between association and search and vice-versa. This quick switching allows the following scenarios:

While the user is adding association, the user can switch to search mode to limit or filter the number of available media objects. As such, the user searches on the already added semantic information or on simple attributes such as timestamp.

While the user is searching, the user may determine that some semantic information is missing. Then the user can quickly switch to the stamping mode via the first level menu and start adding more associations to the media object.

The interface enables the user to add as much information as desired in an incremental fashion, which reduces the perceived amount of work and effort. Moreover, the user can immediately appreciate the benefits of the newly added information because the UI allows the user to start searching using the new added semantic information.

Hierarchical Visual Faceted Search

Figure 8:
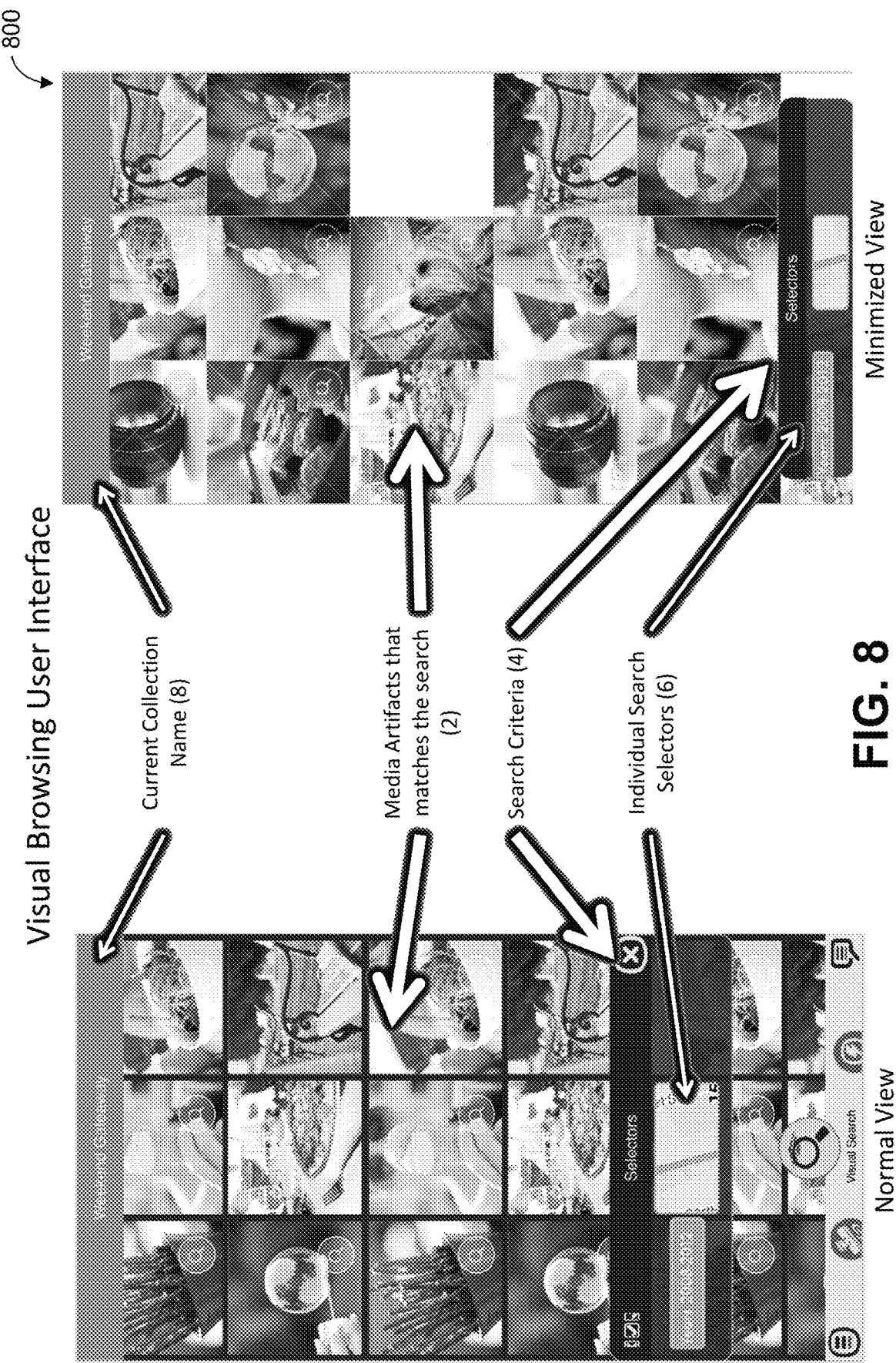
FIG. 8 illustrates a visual interface according to various embodiments.

In various embodiments, the media platform 120 provides a visual interface that allows the user to quickly glance at the criteria the presented media meet. The selection criteria can be displayed in a specific area. In addition, the interface can have a normal mode and a minimized mode to provide more space to the user. FIG. 8 illustrates a visual interface 800 according to various embodiments. In minimized mode, the user is in a read-only mode and cannot interact with various selectors.

In various embodiments, presenting the query as a group of selectors simplify the concept to the end users. Furthermore, the position of the selectors relative to each other is important and the user is able to reorder them.

Figure 9:
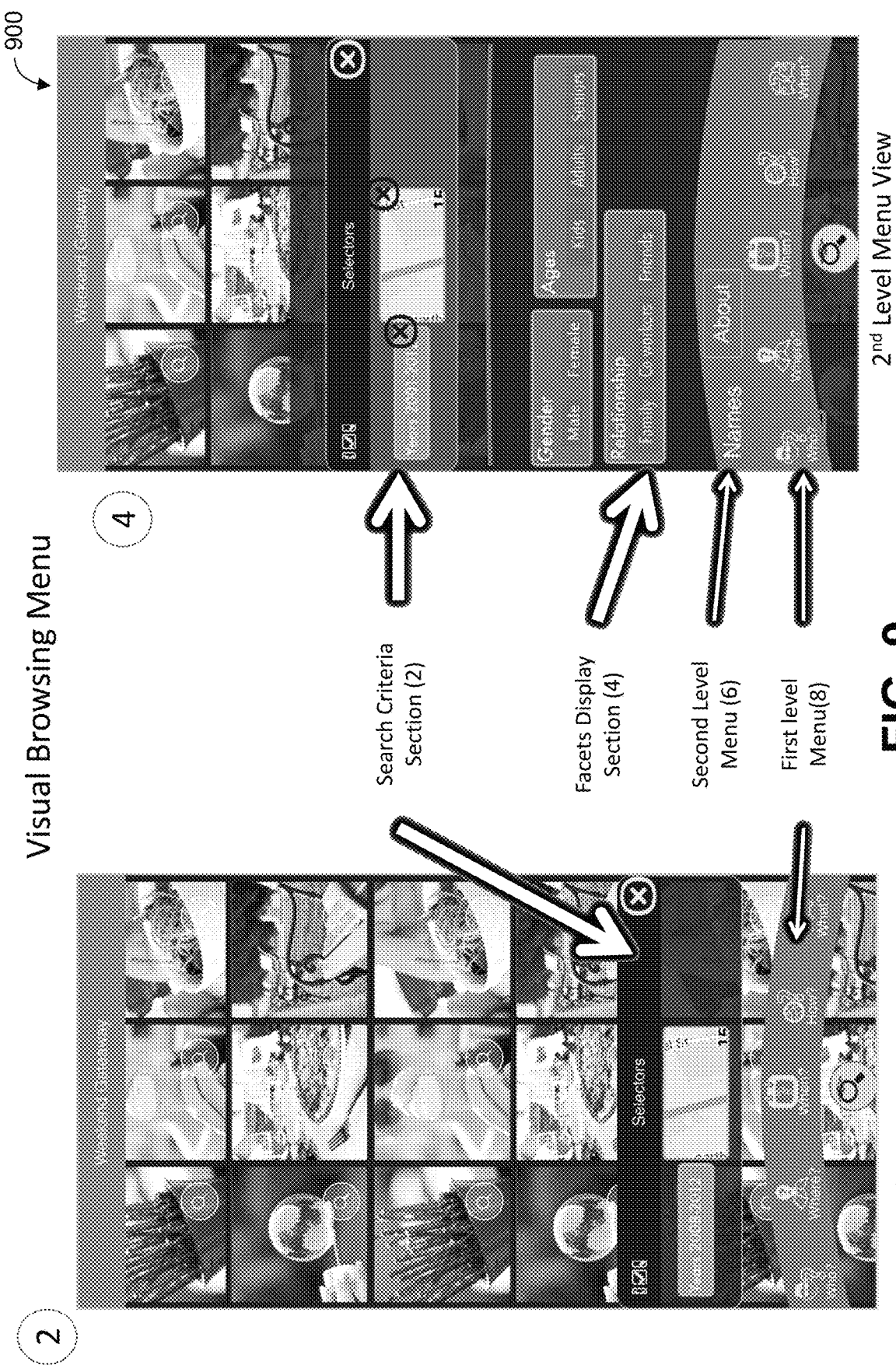
FIG. 9 illustrates a visual browsing menu according to various embodiments.

FIG. 9 illustrates a visual browsing menu 900 according to various embodiments. Referring to FIG. 9, in various embodiments, when the user clicks the central menu button in the normal mode, the media platform 120 presents a first level menu view 2. This menu enables the user to browse the two level hierarchical facets classification. A single click on the menu button presents the first level facet categories, which allows the user to navigate to a second level menu view 4. In the second level menu view 4, the user is provided with information about various media objects. The user can determine whether multiple media objects from multiple years (e.g., 2008, 2010 and 2012 but not 2011) are present and filter to see the media objects from the month of March through August. In parallel, the interface displays the selectors used to pick the data.

Selector

Figure 10:
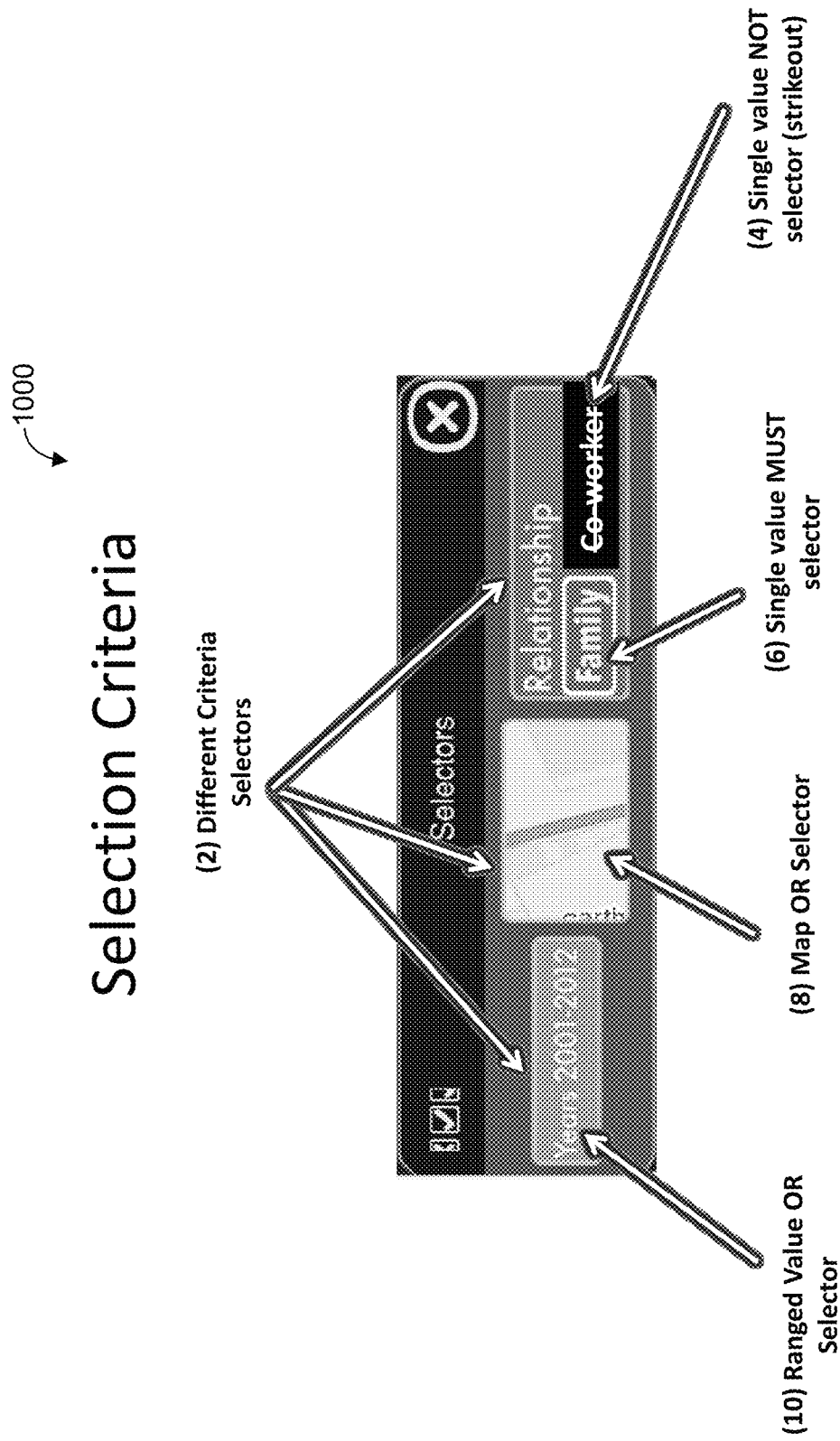
FIG. 10 illustrates selection criteria according to various embodiments.

FIG. 10 illustrates selection criteria 1000 according to various embodiments. Referring to FIG. 10, the selection criteria 1000 can be built by a user. As shown in FIG. 10, there can be multiple selectors 2 for each facet. The selectors 2 can specify what facets values are used for searching. The selection criteria 1000 can include a NOT criterion 4 and a MUST criterion 6, both of which can be single value selectors. The selection criteria 1000 can further include a map location criterion 8 and a value range criterion 10, both of which can be an OR criterion (i.e., at least one of the map location criterion 8 and the value range criterion 10 has to be true). Advantageously, the user can glance quickly and understand the criteria that is being used for the search.

Adding New Search Selector

Figure 11:
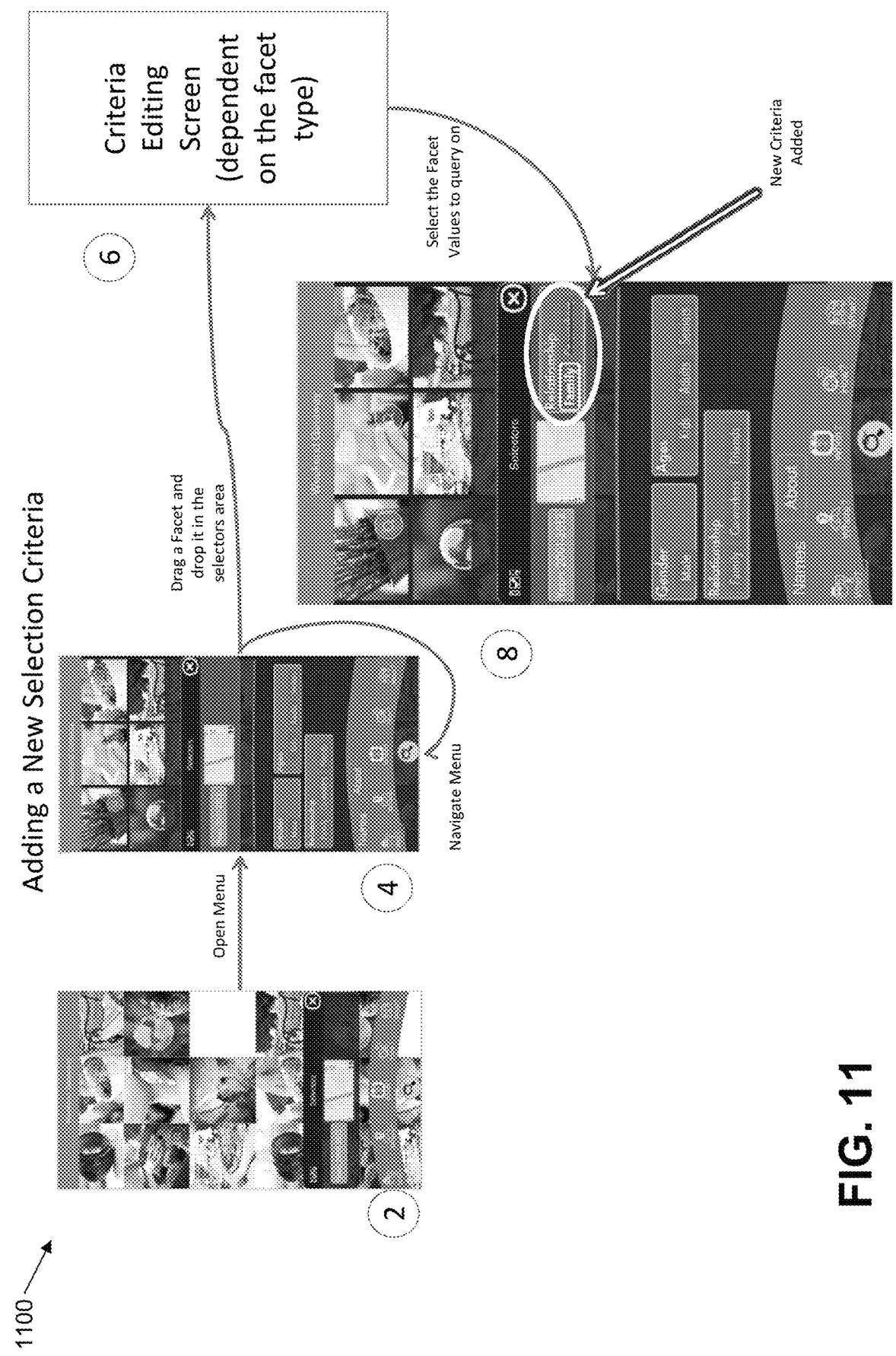
FIG. 11 illustrates a process for adding a new search selector according to various embodiments.

FIG. 11 illustrates a process 1100 for adding a new search selector according to various embodiments. Referring to FIG. 11, the user clicks an open menu 2, which leads the user to facets browsing mode 4. When the use decides to search using a specific facet, the user can drag that facet to the selector area. The dragging action is important because it allows the user to position the selector relative to the already existing ones. Once the selector is dragged and dropped, a dialog box 6 is displayed to allow the user to edit the selections in more details. The dialog box 6 may show an UI that differs from one facet type to another. The purpose of displaying a large interface is to give the computer application designer more space to display various options to the user. Furthermore, the large interface saves the user the frustration of having to deal with small spaces. In the dialog box 6, the user can specify AND, OR and MUST criteria to different facet values or range of values. Once the user clicks accept, the newly added selectors are presented in screen display 8.

Facet Navigation

Figure 12:
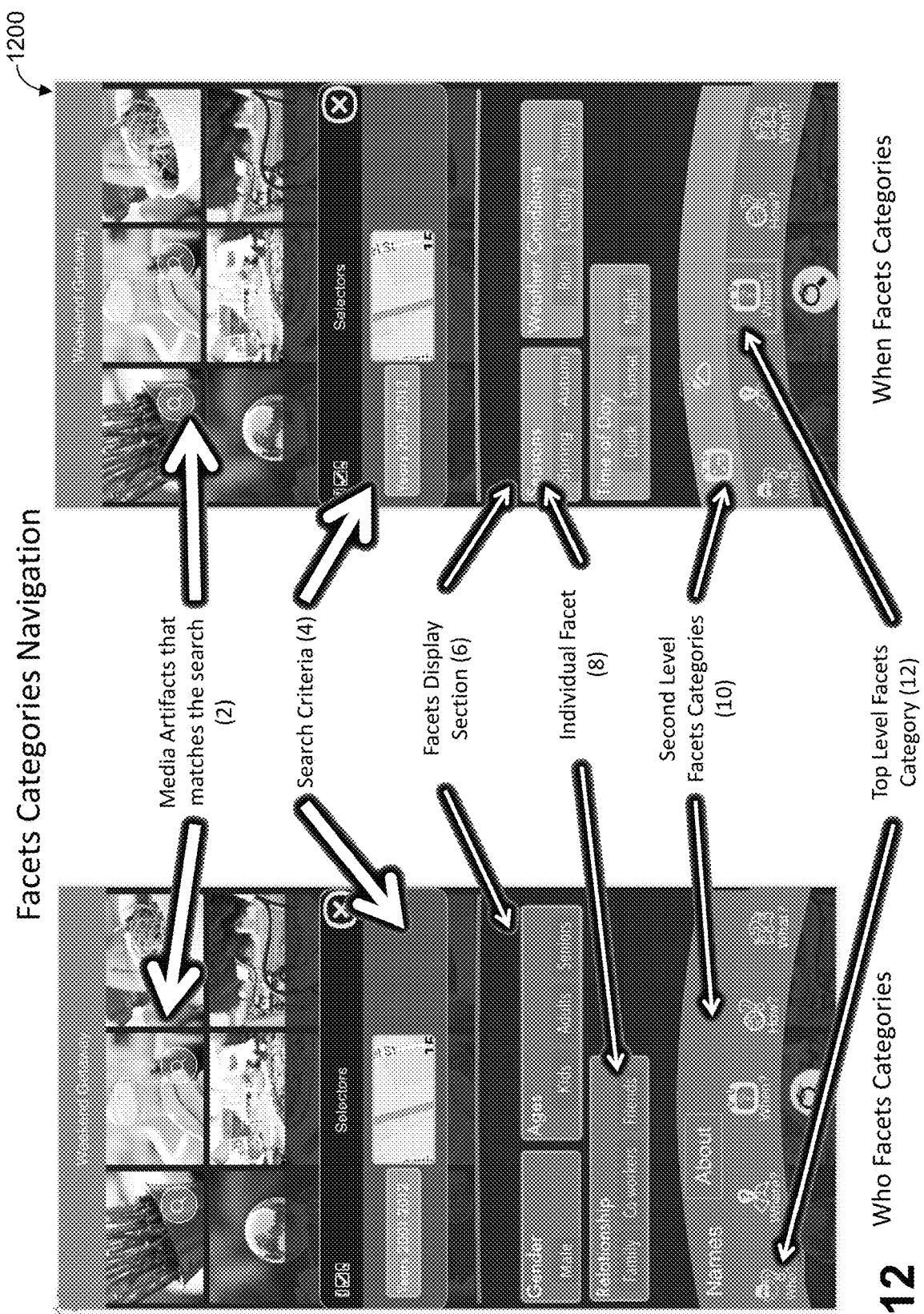
FIG. 12 illustrates a facet navigation interface according to various embodiments.

FIG. 12 illustrates a facet navigation interface 1200 according to various embodiments.

The user can navigate between facets by selecting one of first level facet categories. For example, the first level of facet categories can be divided into several (e.g., 5) main groups. The groups are specific to media objects to be searched on, e.g., who, what, when, where, and how. When the user clicks on one of the first level facet categories, the second level facet categories can be displayed to simplify the user's search. For example, under the "when" first level facet category, there can be multiple second level facet categories including, for example, but not limited to, specific dates, weather conditions, event types, and event names. In one exemplary embodiment, each top level category has a different color to highlight and help identify the category.

When the user clicks on a second level facets category, the interface displays the available facets and the facet values that exist in the user's media objects. In some embodiments, a second level facets category can include a single facet with unlimited values. Advantageously, the facet navigation interface provides a way to quickly glance at the media objects' meta-data. The facet navigation interface allows the user to explore the media collection based on the meta-information driven by curiosity. The user can be further encouraged to identify missing meta-information (e.g., the user can switch to the stamping mode and add the missing information). Moreover, the facet navigation interface provides a unified interface for the user to start requesting media that is not available in the media library. For instance, if a user discovers that the media library is missing a certain media object (e.g., a photo from the user's cousin's birthday last year), the user can use that interface to initiate a request for the missing media object.

Facet Display Section

Figure 13:
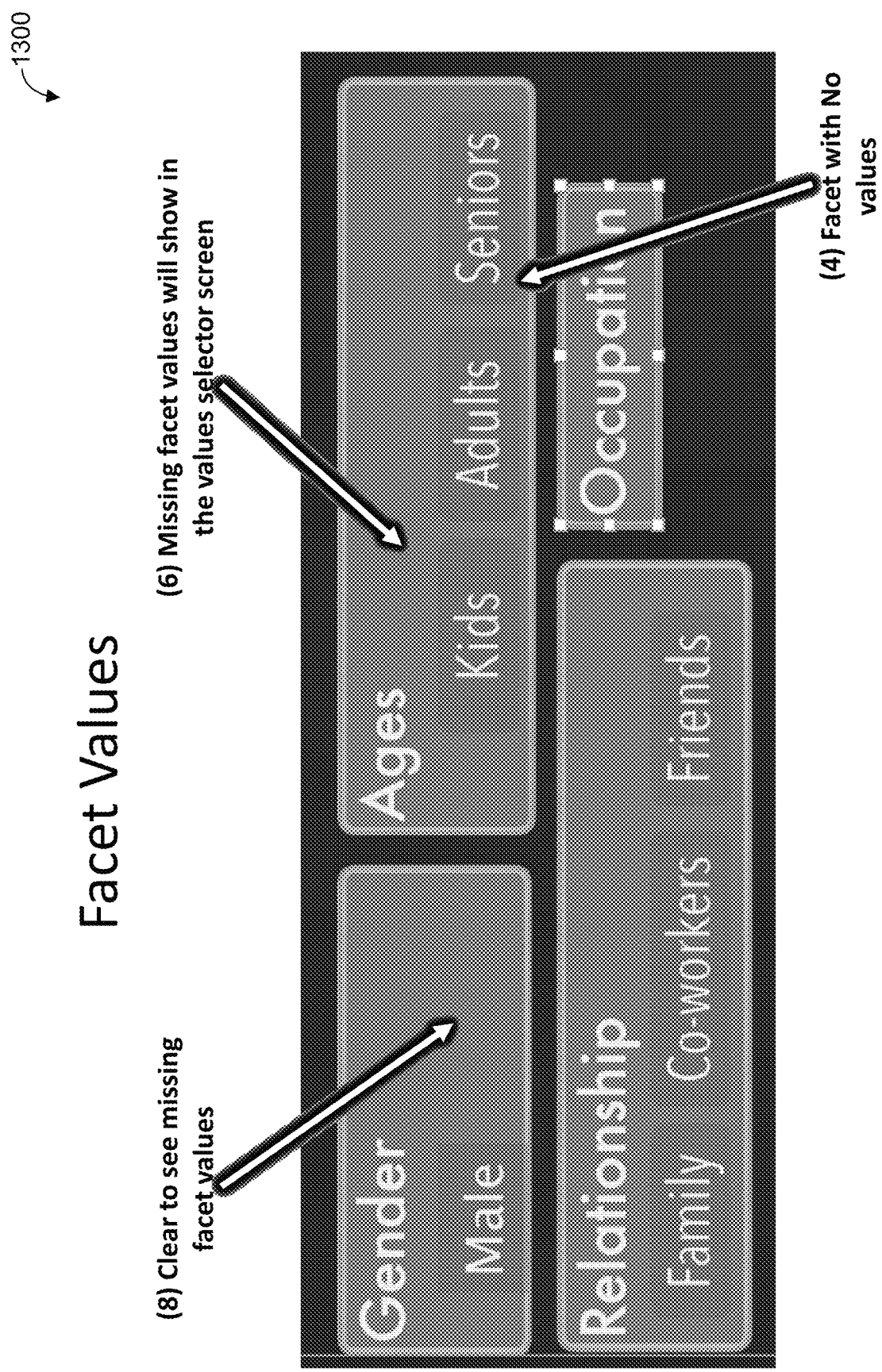
FIG. 13 illustrates a facet display section according to various embodiments.

FIG. 13 illustrates a facet display section 1300 according to various embodiments. Referring to FIG. 13, the facet display section 1300 displays the facets in a particular facet category whether or not the facets have corresponding values. By showing facets having absent values, the user can become aware of what is missing about the collection of media objects the user is currently viewing. For example, the user can observes from the facet display section 1300 that neither the occupation facet nor the gender facet has been provided any values.

The system may display the facets in response to determining that there are no values associated with the facets. Presenting facets with empty values or no search hits communicates to the user that a background search has determined that the facet is not useful on the data set. Empty facets may also communicate to the user that semantic data is missing from one or more data objects or the data object is unavailable. Then the user can locate the media object to add missing the meta-data or acquire an unavailable media object.

Facet Representation

In various embodiments, the media platform 120 displays facets to the user in different ways based on a type associated with the facet's values. Advantageously, displays facets based on a type associated with the facet's values improves communication to the user regarding the available types of data.

Discrete values are individual values. There are two types of discreet values: limited discreet values and unlimited discreet values. Limited discrete values (e.g., gender) are values having a limited number of possible values. Facets having limited discrete values are part of a second level facet category. By contrast, unlimited discrete values (e.g., humans, events) are displayed as an individual second level facet category.

Range values are values that can be grouped into a range. Some range values are a continuous range which includes an unlimited number of possible values (e.g., timestamp). Continuous range values are always displayed in a range or group of ranges. By contrast, an integer range is made up of discrete values (e.g., days of the week). Integer ranges can be displayed as groupings of discreet values. Map values can be displayed in a special map presentation where the map values are special values.

Figure 14:
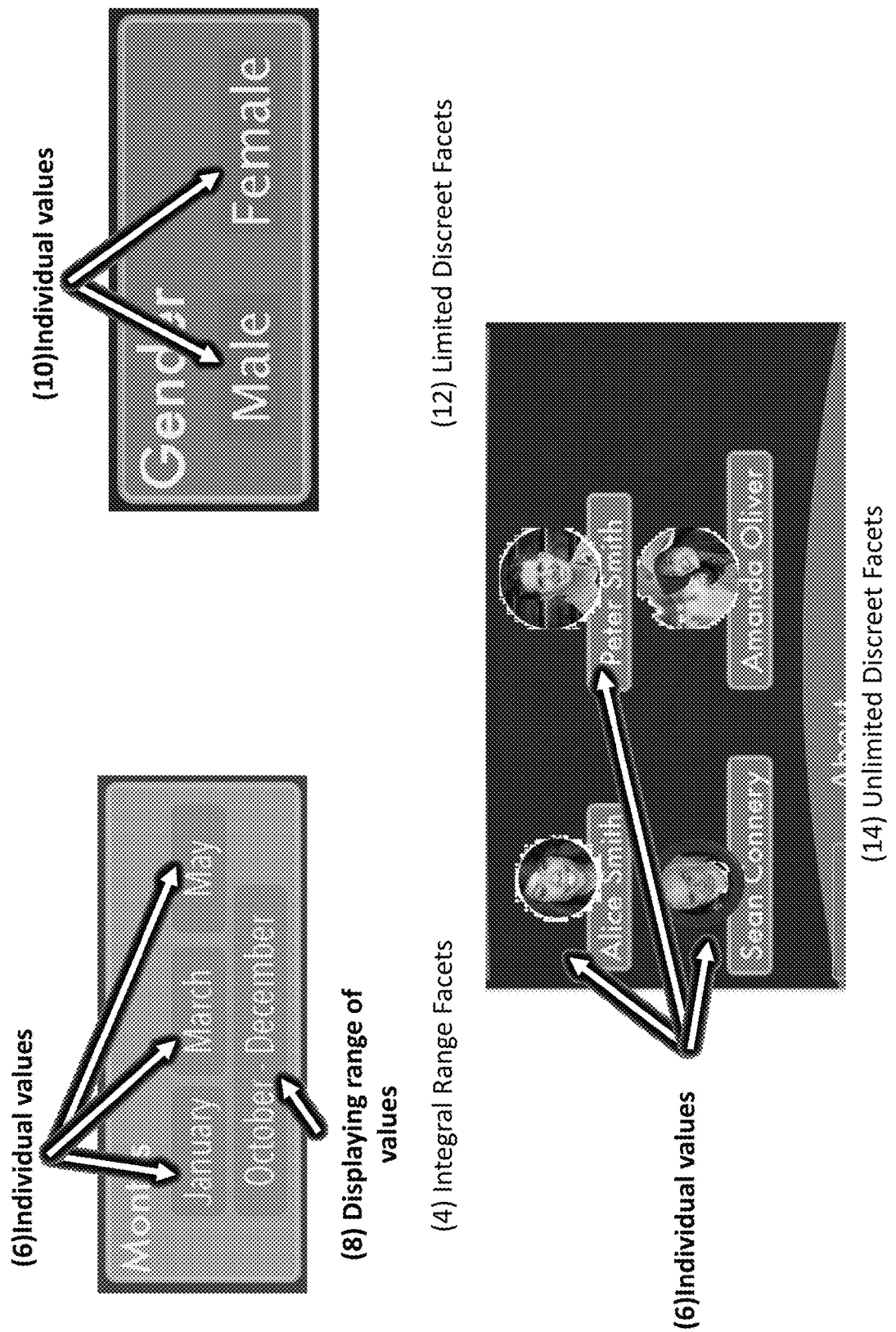
FIG. 14 illustrates facet representations according to various embodiments.

FIG. 14 illustrates facet representations according to various embodiments. As shown in FIG. 14, facet representations can include representation of limited discreet facets 12, integer range facets 4, and unlimited discreet facets 14. The unlimited discreet facet 14 can require an entire subcategory to display where other facet representations (e.g., the limited discreet facets 12 and the integer range facets 4) can be grouped together.

Hierarchical Facets for Media Content

In various embodiments, facets can be organized into a two level hierarchy. The hierarchy is stored into a data structure (e.g., tree). Each leaf node of the tree can point to an individual facet value's index. As such, the media platform 120 can handle different facet hierarchies based on the user. For example, the facet hierarchies may be established based on the user level of expertise or interests.

For example, a hierarchy can include:
1) Who?
   a. Name
   b. Relationship
   c. Interests
   d. Profession
2) When?
   a. Dates
   b. Events
   c. Event Types
   d. Weather Conditions
3) Where?
   a. Place Name
   b. Map
   c. Place Type
4) How?
   a. Photographer
   b. Camera Type
   c. Media Type
5) What?
   a. Objects
   b. Types of Objects Appendix B further illustrates the hierarchical faceted search engine according to various embodiments.

According to various embodiments, a system for performing a hierarchical visual faceted search for one or more media objects includes a media platform. In various embodiments, the media platform may comprise one or more hardware processors configured to: provide, to a user device, a selector user interface (UI) adapted to receive a plurality of selection criteria; provide, to the user device, a first level menu comprising a plurality of first level selection criteria that includes a first selection criterion; receive, from the user device, an indication to add at least the first selection criterion to the selector UI; provide, to the user device, a second level menu comprising a plurality of second level selection criteria corresponding to the first selection criterion, wherein the plurality of second level selection criteria includes a second selection criterion; receive, from the user device, an indication to add at least the second selection criterion to the selector UI; add the first selection criterion and the second selection criterion to the selector UI; and execute a search to identify one or more media objects satisfying the first selection criterion and the second selection criterion based at least in part on a content of the selector UI.

In example implementations, the first selection criterion can include an identity criterion, a location criterion, and the second selection criterion can include one of a name, relationship, interest, and profession of an individual associated with a media object. For example, the first selection criterion can include a time criterion and the second selection criterion comprises one of a date, event, event type, and weather conditions associated with a media object. In another example, the first selection criterion comprises a location criterion and the second selection criterion can include one of map coordinates, location name, and location type associated with a media object. In another example, the first selection criterion comprises a manner or means criterion, and the second selection criterion can include one of a photographer, camera type, and media type associated with a media object. In another example, the first selection criterion comprises an identification criterion, and the second selection criterion can include one of an object and object type associated with a media object.

Hybrid In-Memory Faceted Engine

In various embodiments, a faceted search engine may be deployed on the user device 110. As such, the faceted search engine can rely on in-memory search indices that can be loaded on-demand based on the facets being searched. The search indices are built on top of real objects attribute values.

A facet is a way to search for one or more media objects. A facet can be associated with various facet values. Moreover, each facet corresponds to a specific field in the data being indexed. Fields have data types and expected values. To perform a search, the faceted search engine can build an index of all the values in each filed. Advantageously, the faceted search engine can very quickly execute any query. By contrast, conventional faced search engines depend on pre-calculated views of fixed queries and cannot handle dynamic complex queries.

In an example embodiment, a system performs a hybrid in-memory faceted search for one or more digital objects. The system can include a media platform with one or more processing device configured to: store an index for a data set generated using one or more indexing processes, where the index includes a mapping of values to identifiers for each digital object in the data set; receive an update for the index; store the index update with a timestamp independent from the stored index; and in response to a request for the stored index, apply the index updates to the index. In an example, the processing device determines a characteristic associated with the data set; and the index is processes based on the characteristic of the data set, where the index includes a mapping of values to identifiers for each digital object in the data set.

For example, the data set can include discrete data and the index includes multiple arrays for each digital object including at least one of sorted values of the discrete data and identifiers. For example, the identifiers can be grouped in ordered groups. In an example embodiment, the data set includes continuous data and each digital object is mapped to a unique timestamp.

When the mapping of values to identifiers for each digital object in the data set includes overlapping values, the processing device can determine a certainty factor associated with each value for each digital object and rank the identifier based on the certainty factor.

The request for the stored index can be a search request with query criteria, the processing device can generate a selector object to match query criteria to identifiers of the index; calculate a count of the unmodified identifiers associate with each query criteria based on the selector object; and execute the search starting with the query criteria associated with the most unmodified identifiers of the query criteria.

Types of Indices

To index data, the faceted search engine can use different types of indices depending on the type and nature of data being indexed. Each index type is built differently and has a specific purpose.

An index can be a basic index or a derived index. While each index type is implemented in a different way, all indices have the function of mapping real world values to certain rows of the media object they are indexing.

Basic Indices

Basic indices are directly calculated from the world object's raw values. Different types of basic indices may be calculated depending on the nature of the raw value as each type of raw value is handled differently.

Figure 15:
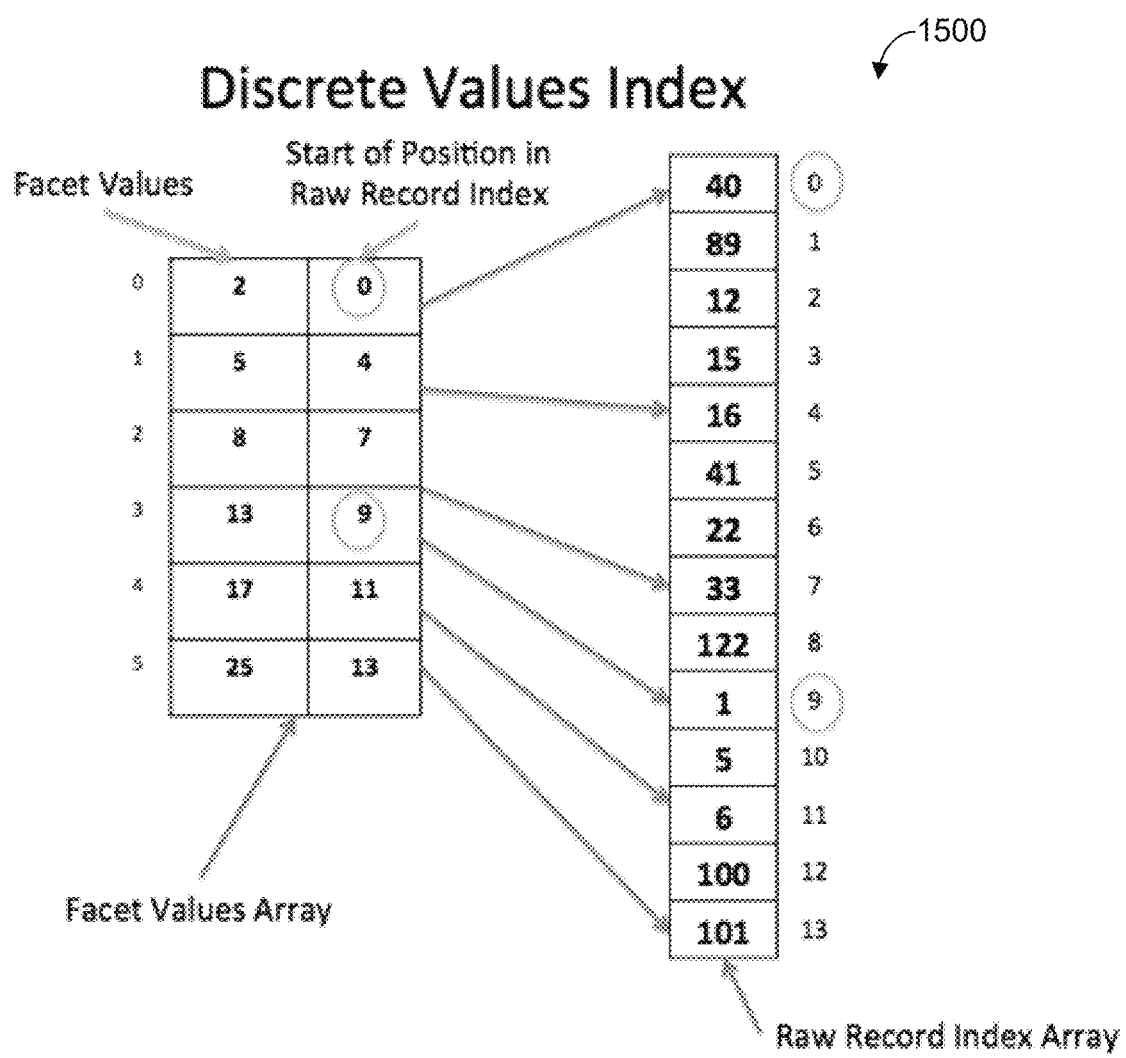
FIG. 15 illustrates a limited discrete index according to various embodiments.

FIG. 15 illustrates a limited discrete index 1500 according to various embodiments. Referring to FIG. 15, the limited discrete index 1500 is a basic type of index that includes discrete an unlimited. The limited discrete index 1500 is kept in memory (e.g., of the user device 110) at all times and is deployed whenever the limited discrete index 1500 is needed. In various embodiments, the limited discrete index 1500 can be implemented as two arrays. The first array can hold the values indexed in an ascending sorting order and the starting position into the second index. The second array can hold the media row identifiers, which are grouped according to the raw values and are in a sorted order in each group. Advantageously, storing the limited discrete index 1500 requires a small amount of memory.

A large discrete index includes very large number of discrete values.

A continuous index contains an unlimited number of possible values that have almost one-to-one mapping with values (e.g., timestamp). Almost every single photo, for example, can have a different timestamp. Continuous range values can be handled by special index structure. For example, continuous indices may be handled using a regular B-Tree similar to the database indices.

A map index includes geolocation data. Geolocation data can be three dimensional data (e.g., longitude, latitude, and altitude) that are handled as a whole. In some embodiments, map indices may be handled using a database engine (e.g., SQLite®).

Derived Indices

Derived indices are based on other indices (e.g., basic or derived) and provide classifications and/or implications. In various embodiments, a derived index can be a simple derived index or a fuzzy derived index.

Figure 16:
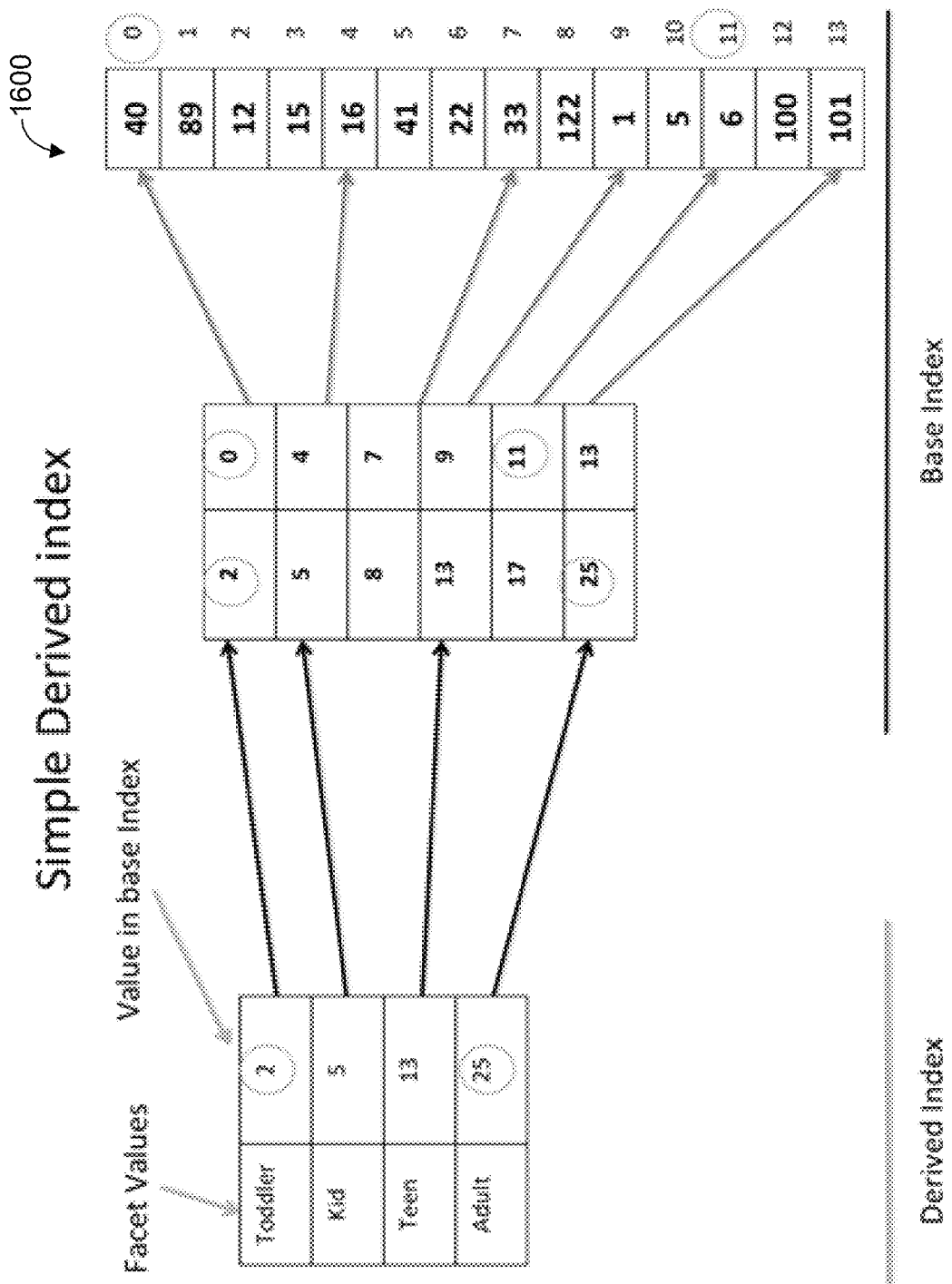
FIG. 16 illustrates a simple derived index according to various embodiments.

FIG. 16 illustrates a simple derived index 1600 according to various embodiments. Referring to FIG. 16, the index values of the simple derived index 1600 are based on values indexed by another index. For example, age groups may be indexed into a plurality of facet values including, for example, but not limited to, baby, toddle, kid, teenager, young adult, adult, middle age, and senior. The actual indexed values are derived from age raw values, e.g., a toddler is a person whose age is between 2 and 5. In various embodiments, the simple derived index 1600 is built using a single array that holds the values and the corresponding raw value in the based index. As such, the simple derived index 1600 occupies very limited space in memory and can easily accommodate changes to the base index.

Figure 17:
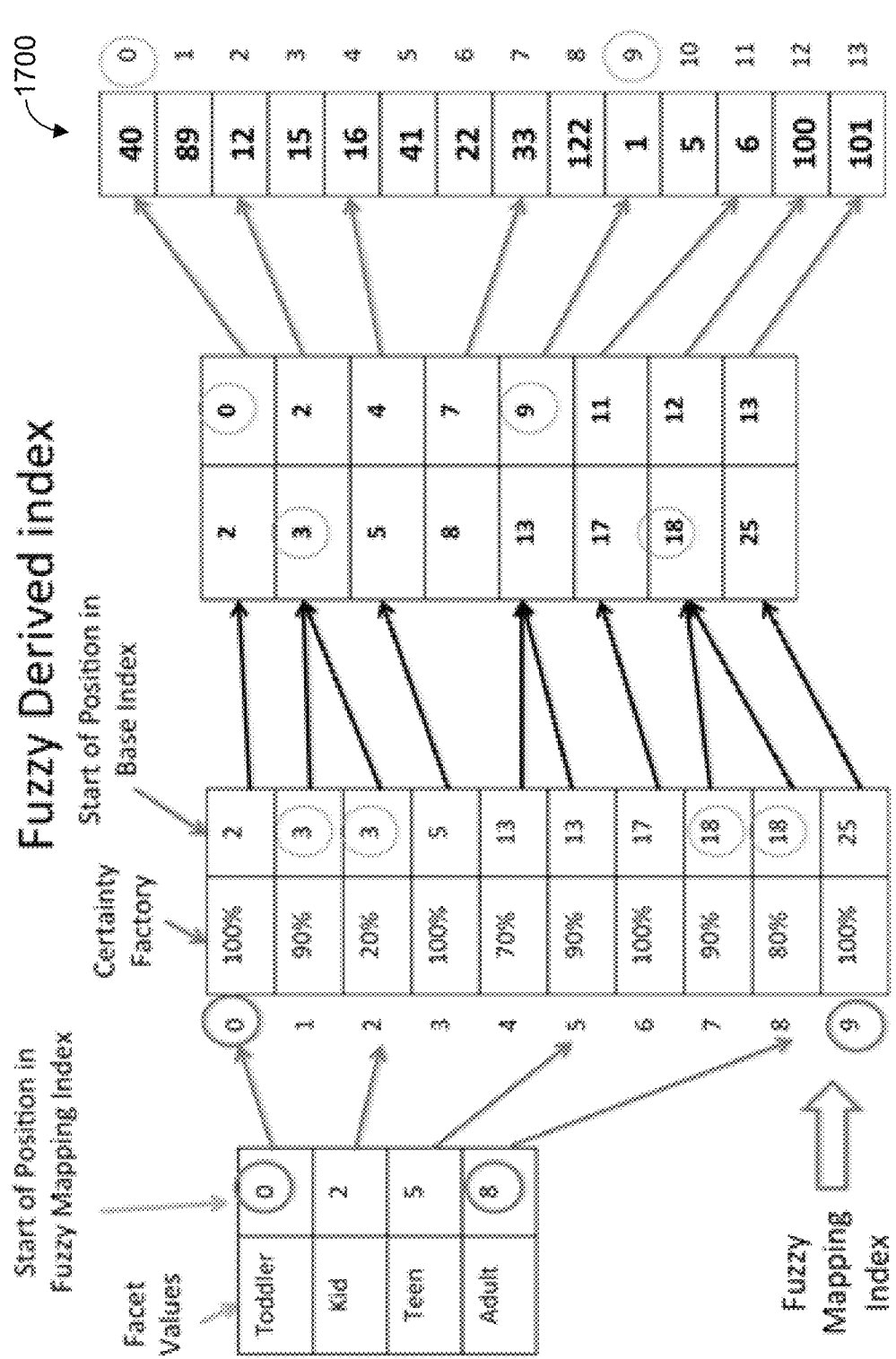
FIG. 17 illustrates a fuzzy derived index according to various embodiments.

FIG. 17 illustrates a fuzzy derived index 1700 according to various embodiments. Referring to FIG. 17, the fuzzy derived index 1700 can include multiple indexed values that overlap with raw values. Thus, each mapping has a certainty factor associated with it. For example, if age group has a fuzzy index, then a person who is 1.8 years old can be both a baby and a toddler. However, the person is more likely to be a toddler. As such, the certainty factor for toddler is 90% while the certainty factor for baby is 15%. The certainty factor is selected to be suitable for each value. The benefit of such fuzzy indexing is to enable us to find the same information in different way and use the certainty to rank the search results.

Index Life Cycle

The index can be created in memory by iterating through the raw data. The index is kept in the most compact form in memory. By contrast, raw data is accessed differently in an orthogonal operation. In order to keep memory usage small, raw data may be iterated in batches in instances where the volume of raw data is large. The process may include multiple iteration passes (e.g., one pass for each index) since the data is to be loaded in a sorted order. Thus, if the volume of raw data is small, the raw data can be loaded in to memory at once and sorted during the creation of the index.

Once the index is created in the most compact form, the index is saved to a file in that form. For indices that have two or more arrays, the individual arrays are saved in the same file in a specific order, e.g., the indexed data array before the row id array.

The index can also be updated including by adding or deleting values to and from the index. In various embodiments, if the index is already in memory, the updates are applied to the index and the index saved to disk once the update is complete.

If the index is on disk, then the updates are appended to an update file for that particular index. The update file contains all the updates sorted by the timestamp. The index is not uploaded for an update operation. Instead of loading an index to apply one or more updates, the faceted search engine stores the changes that are to be made to the index. When the index is required for a search, the index is loaded to memory from the disk, the stored updates are loaded and applied to the index, and the index is saved to memory and can be used in a search.

Advantageously, the update process reduces unnecessary calculations that from being performed each time the index is updated. The update process preserves computational power for the index that is not being used between the updates. The index is updated when the index is called (e.g., for performing a search).

Querying Model

The faceted search engine affords the user the power and control of an enterprise search interface but in an easy to understand way that does not have a steep learning curve. To perform a query, the user selects one or more facet values and indicates if results must, can, or should not have the selected facet values. For example, suppose the user wants to find media objects taken during a holiday that is not Thanksgiving and depict a shoe, a dress, a bag, or sunglasses. The user can define the following query:

MUST: event type holiday
NOT: event Thanksgiving
OR: object shoe appear
OR: object dress appear
OR: object bad appear A user can also specify a complex query for the user's son's photo around the house during autumn alone while my wife took the photo. The query can be specified as follows:

MUST: person son appear
MUST: person wife photographer
MUST: At house location
MUST: event autumn
NOT: At inside house
NOT: person any appears Querying Mechanism For each criteria defined by the user, the faceted search engine can create a selector object that operates on the facet index. The selector's purpose is to match the criteria to the raw media object identifiers. It also can return the number of possible media object identifiers that match the given criteria, which in turn returns the possible matches. The faceted search engine sorts the indices by the possible matches in an ascending order. As such, the index with the least number of matches is executed first, and the faceted search engine iterates over the list of indices and calculates the values that match the entire criteria.

```
MustSelectors[ ]
CanSelectors[ ]
NotSelectors[ ]
mustSelectorsIdx = 0
canSelectorsIdx = 0
notSelectorsIdx = 0
For each user criteria
    If criteria is MUST
        MustSelectors[mustSelectorsIdx] = new Selector(criteria)
        mustSelectorsIdx++
    else If criteria is CAN
        CanSelectors[canSelectorsIdx] = new Selector(criteria)
        canSelectorsIdx ++
    else If criteria is NOT
        NotSelectors [notSelectorsIdx] = new Selector(criteria)
        notSelectorsIdx ++
For each MustSelectors
    calculate the number of resulting row ids
Sort the MustSelectors selectors by the number of resulting row ids in
ascending order
Result = MustSelectors[0].rowIds
For each mustSeletor in MustSelectors<1 to mustSelectorsIdx–1>
    Result = Result AND mustSeletor.rowIds
For each NotSelectors
    calculate number of possible row ids
Sort the NotSelectors by the number of row ids in ascending order
For each notSeletor in NotSelectors <0 to notSelectorsIdx –1>
    Result = Result NOT notSeletor.rowIds
ORResult = CanSelectors[0].rowId
For each canSeletor in CanSelectors <1 to canSelectorsIdx–1>
    ORResult = ORResult OR canSeletor.rowIds
Result = Result AND ORResult
```

Advantageously, multiple query algorithms can be executed in parallel. Thus, each selector is independent and avoids race conditions. The selectors are further executed in order from the strictest to the least strict (e.g., AND followed by NOT followed by OR). The selector order provides the functionality to skip the execution of the lesser strict selectors if the result set will be empty.

In addition, the algorithm may be optimized as follows:

```
Perform the AND and NOT part of the query using criteria that have
indices in memory
If the results has row ids
Perform the query on the criteria that have unmodified indices
If the results has row ids
Perform the query on the remaining criteria
```

The above optimization reduces the need for unnecessary loading of indices if it is know that the query result contains zero records.

Selection Operation

Selection operations are performed to select matching row identifiers for a certain selection criteria. Each index type implements the selector in a specific way that corresponds to that particular index type's structure.

Discrete Value Indices

Discrete value indices can be numeric or non-numeric. A numeric discrete value index affords mathematical operations including, for example, but not limited to, range selection, greater than, and less than.

Less Than X:
   Binary search the facet values array and find the position of greatest value in the index that is less than X. The position of greatest value indicates the position in the Raw record Ids Array. Then, the preceding row ids before the position of greatest value position can be collected.

Greater Than X:
   Binary search the facet values index and find the position of the least value that is larger than X. The position of the least value indicates the position in the Raw record Ids Array. Then, the row ids after position of the least value can be collected.

Equals to X:
   Binary search the facet values index and find the position where the value is equal to X. The position where the value is equal indicates the position in the Raw record Ids Array. The Raw record Ids array has the starting position. The ending position is determined from the following index in the facet values index.

Derived value indices can also be either numeric or non-numeric, where numeric derived value indices are able to support mathematical operations.

Less Than X:
   Binary search the facet values array and find the position of greatest value in the index that is less than X. The position of greatest value indicates in the based index values arraRaw record Ids Array. Then the row ids before position of greatest value are collected.

Greater Than X:
   Binary search the facet values index and find the position of the least value that is larger than X. The position of the least value indicates the position in the Raw record Ids Array. Then the row ids after the position of the least value position are collected.

Equals to X:
   Binary search the facet values index and find the position where the value is equal to X. The position where the value is equal indicates the position in the Raw record Ids Array. The Raw record Ids array has the starting position. The ending position is taken from the following index in the facet values index.

Query Basic Operations

Query operations (e.g., AND, NOT and OR) may be performed in multiple embodiments. For large arrays, compressed bit vector arrays are used to store the row identifiers (e.g., roaring array) and a binary bitmask is used to perform the operations that are suitable to such data structure. For small sized arrays, the algorithms are applied such as:

The AND operation works on two arrays of row identifiers: rowIDs1 and rowID2. The results are included in resultingIDs. The algorithm for an AND operation operates in linear time (i.e., O(n)) and includes:

```
Sort rowIDs1 and rowIDs2 in an ascending order. Using radix sort
Assign rowIDs1 to the array of fewer elements
Pointer1 = 0
Pointer2 = 0
ResultsPointer = 0
while Pointer1< number of count rowIDs1 && Pointer2< number of count rowIDs2
    if rowIDs1[Pointer1] == rowIDs2[Pointer2]
        resultingIDs[ResultsPointer] = rowIDs1[Pointer1]
        ResultsPointer++
        Pointer1++
        Pointer2++
    else if rowIDs1[Pointer1] > rowIDs2[Pointer2]
        Pointer2++
    else
        Pointer1++
```

The NOT operation is akin to a set subtraction operation. One set of row identifiers are subtracted from the result. The algorithm for a NOT operation also operates in linear time (i.e., O(n)) and includes:

```
Sort rowIDs1 and rowIDs2 in an ascending order. Using radix sort
Pointer1 = 0
Pointer2 = 0
ResultsPointer = 0
while Pointer1< number of count rowIDs1 && Pointer2< number of count rowIDs2
    if rowIDs1[Pointer1] == rowIDs2[Pointer2]
        Pointer1++
        Pointer2++
    else if rowIDs1[Pointer1] > rowIDs2[Pointer2]
        Pointer2++
    else
        resultingIDs[ResultsPointer] = rowIDs1[Pointer1]
        ResultsPointer++
        Pointer1++
while Pointer1< number of count rowIDs1
    resultingIDs[ResultsPointer] = rowIDs1[Pointer1]
    ResultsPointer++
    Pointer1++
```

The OR operation works on two arrays of row identifiers: rowIDs1 and rowID2; the result is called resultingIDs. The results are included in resultingIDs. The algorithm for an AND operation operates in linear time (i.e., O(n)) and includes:

```
Sort rowIDs1 and rowIDs2 in an ascending order. Using radix sort
Assign rowIDs1 to the array of fewer elements
Pointer1 = 0
Pointer2 = 0
ResultsPointer = 0
while Pointer1< number of count rowIDs1 && Pointer2< number of count rowIDs2
    if rowIDs1[Pointer1] == rowIDs2[Pointer2]
        resultingIDs[ResultsPointer] = rowIDs1[Pointer1]
        ResultsPointer++
        Pointer1++
        Pointer2++
    else if rowIDs1[Pointer1] > rowIDs2[Pointer2]
        if resultingIDs[ResultsPointer] < rowIDs2[Pointer2]
            resultingIDs[ResultsPointer] = rowIDs2[Pointer2]
            ResultsPointer++
        Pointer2++
    else
        if resultingIDs[ResultsPointer] < rowIDs1[Pointer1]
            resultingIDs[ResultsPointer] = rowIDs1[Pointer1]
            ResultsPointer++
        Pointer1++
```

Multi-Mode User Interface

In various embodiments, the media platform 120 supports a multi-mode UI that is adaptable to various major activity types. For example, the UI can be in the visual search mode, the object association mode, or the object manipulation mode. As such, the UI can focus on the major activity without cluttering the screen with an endless set of options. In various embodiments, the commands are positioned in substantially the same relative place or region in the screen, allowing users access them by memory. The UI can be controlled by a mode switching control that indicates to the user which mode the UI is in and allows the user to quickly switch to other modes.

In an example embodiment, a system for interacting with a media platform that includes a media platform with a processing device configured to: provide, to a user device, a user interface (UI) to control a multi-mode application of the media platform, where the user interface comprises multiple mode navigation regions and each mode navigation region is associated with a mode of the multi-mode application, where each mode navigation region comprises a specific set of functions for controlling the mode associated with the mode navigation region. The UI is to present the navigation region for an active mode based on detecting device activity, where the UI includes a global navigation menu for switching to non-active modes and suppresses functions associated with the non-active modes.

For example, each mode navigation region can include a specific set of functions for controlling the mode associated with the mode navigation region; and when the navigation region is presented, the specific set of functions are maintained in the mode navigation region. In an example embodiment, the global navigation menu is controllable by a gesture input of the user. To present the specific set of functions, the UI can include one or more expandable sub-mode navigation regions. The one or more expandable sub-mode navigation regions can be presented based on the detected device activity while the UI suppresses functions associated with the non-active sub-modes.

The UI can include an active mode indicator on the global navigation menu. In some embodiments, the processing device detects device activing by tracking a user's activity pattern to suggest a next mode by highlighting a shortcut on the global navigation menu. The multi-mode application can include at least one of a visual search mode, object manipulation mode, or data entry mode.

Multi-Mode Control Switch

Figure 18:
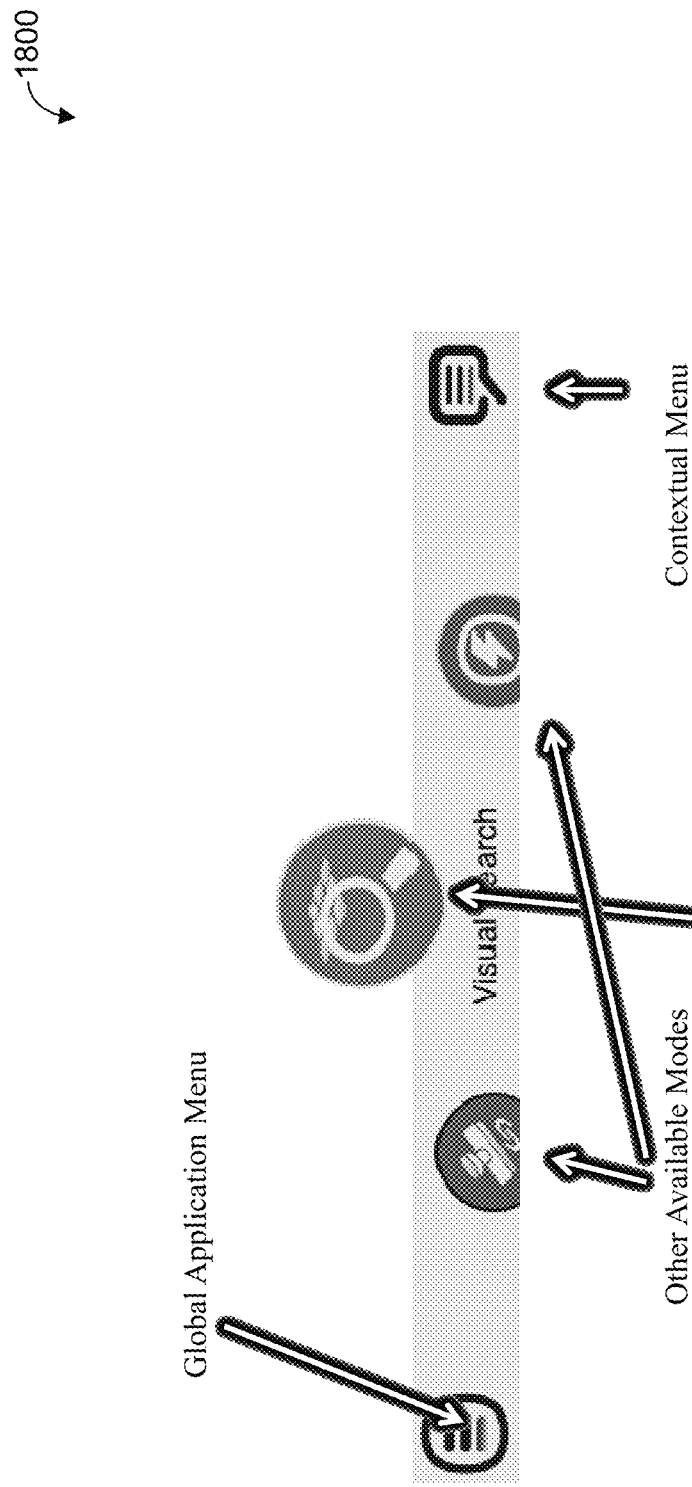
FIG. 18 illustrates a multi-mode control switch according to various embodiments.

FIG. 18 illustrates a multi-mode control switch 1800 according to various embodiments. Referring to FIG. 18, the multi-mode control switch 1800 can be displayed on the user device 110 (e.g., a smartphone). The multi-mode control switch 1800 displays the current mode "Visual Search" as well as additional modes the user can switch to. Alternatively the user can use a swipe gesture (e.g., on a touch screen) to switch between different modes and/or reveal additional modes.

Multi-Mode Overview

Figure 19A:
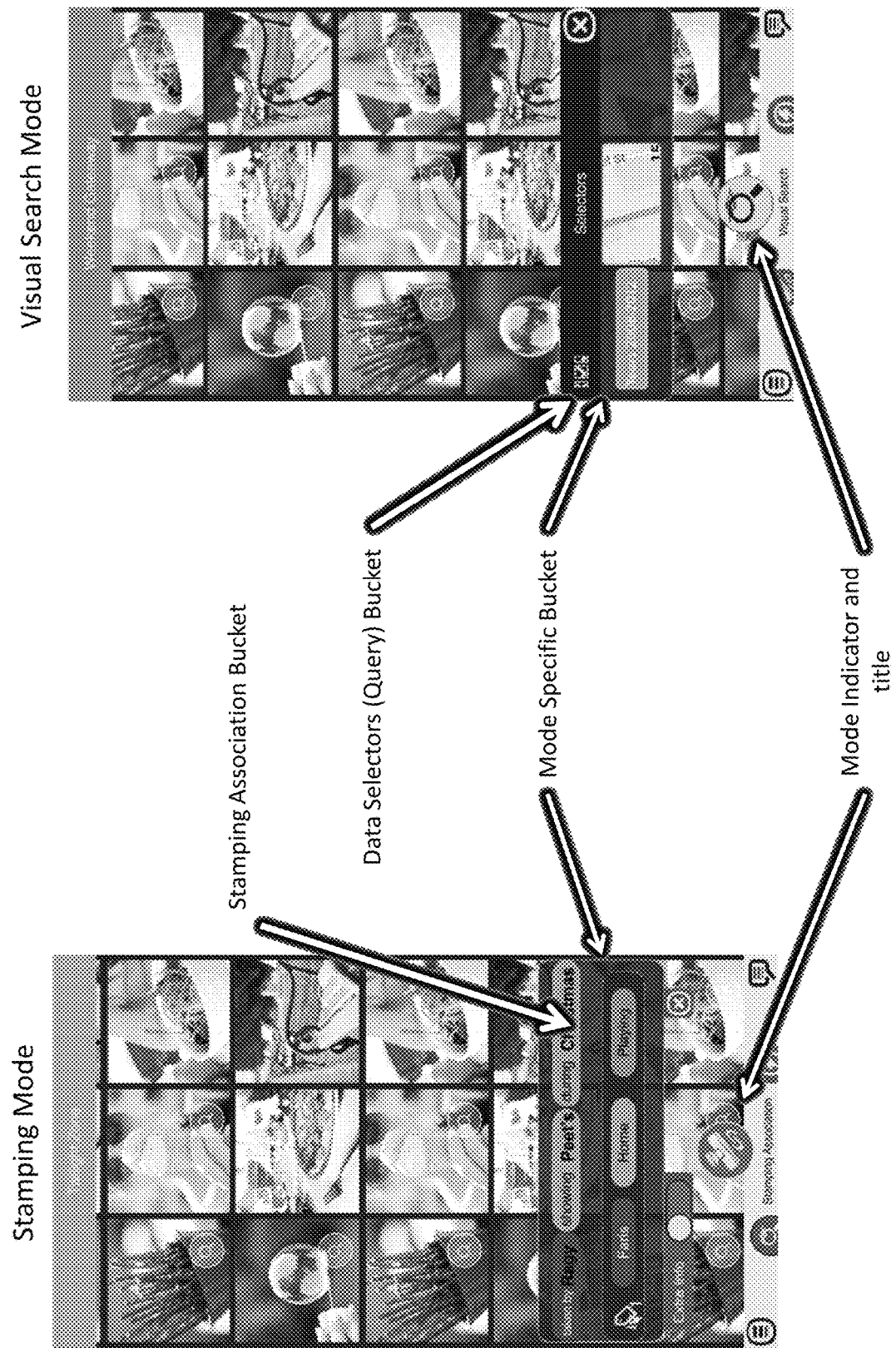
FIGS. 19A-C illustrate a multi-mode UI according to various embodiments.
Figure 19B:
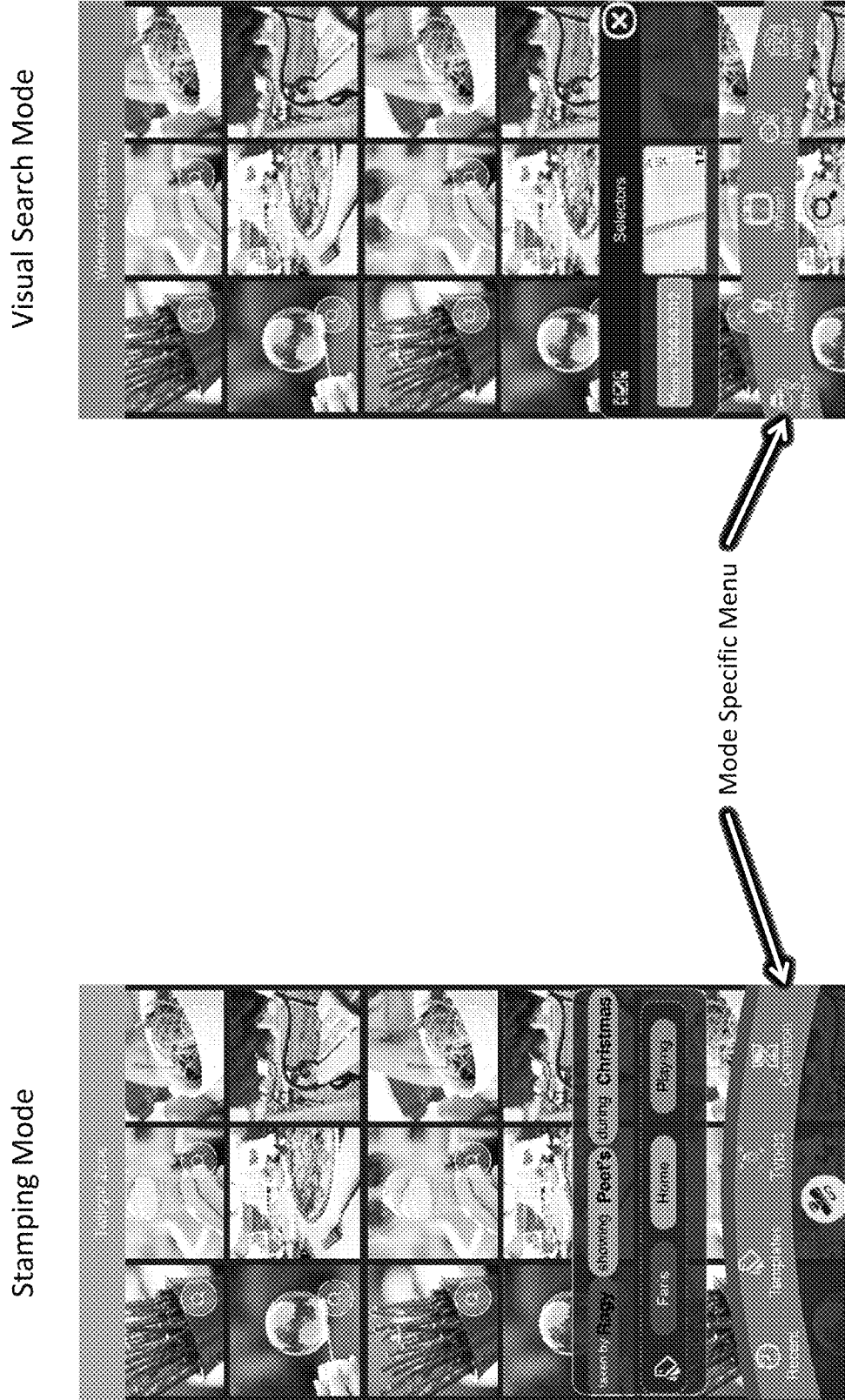
Figure 19C:
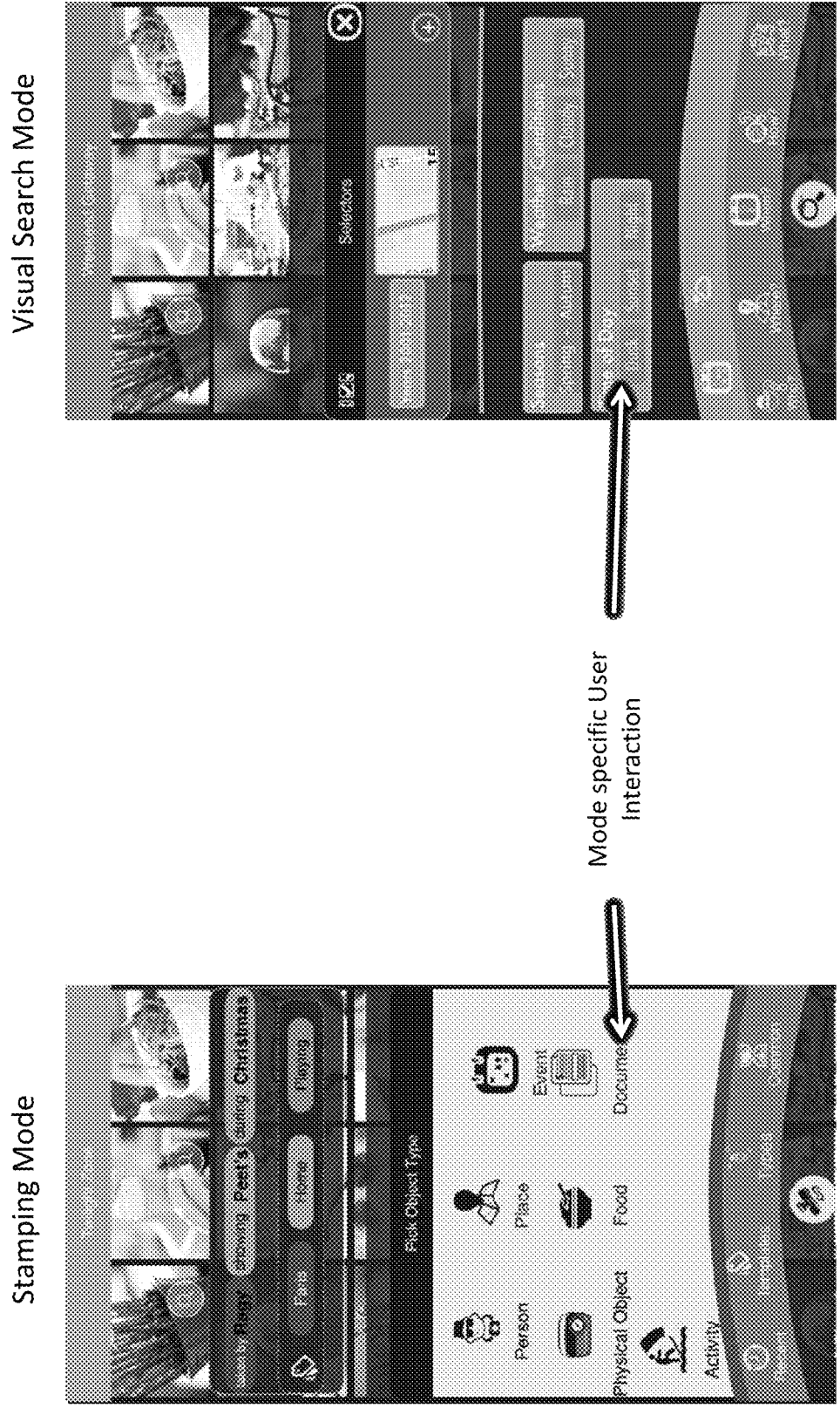

FIGS. 19A-C illustrate a multi-mode UI according to various embodiments. Referring to FIGS. 19A-C, the multi-mode UI can be used for associating semantic information to media objects and for searching for media objects. The stamping mode provides an interface from determining associations for media objects. The UI is constructed to allow efficient searching of the media objects that can be associated in a very effective way that allows the user to perform batch association. The controls in the stamping UI are related to association functions. To search, the user can switch to the visual search mode (on the right side). The multi-mode control switch, as described in FIG. 18, allows for quick navigation between modes. In search mode the visual search UI presents control options focused on searching the media library.

Advantageously, the multi-mode UI frees the user from guessing what actions are available for different activities (e.g., search, stamping, sharing, etc.). The multi-mode UI efficiently categorizes and presents the actions which are related to each activity mode. The UI commands are placed in the same location or region of the screen for a given mode. Thus, the multi-mode UI reduces the cognitive requirements for individual users without reducing functionality of the application.

Masking Access Control

In various embodiments, the media platform 120 controls access to stored data objects (e.g., media objects stored in the data store 125) in a manner that does not require user accounts. By contrast, access is controlled based on automatic or manual data object protection rules that are orthogonal to user account mechanisms. Each data protection rule selects specific data objects to be protected and can be turned on and off to make the objects inaccessible or accessible respectively. Data protection rules statuses are combinable to compute an effective data-masking layer. The data-masking layer determines if a given data object is accessible or not. Presenting data protection as simple data selection rules simplifies complex access control mechanisms.

Data Access Computation

Figure 20:
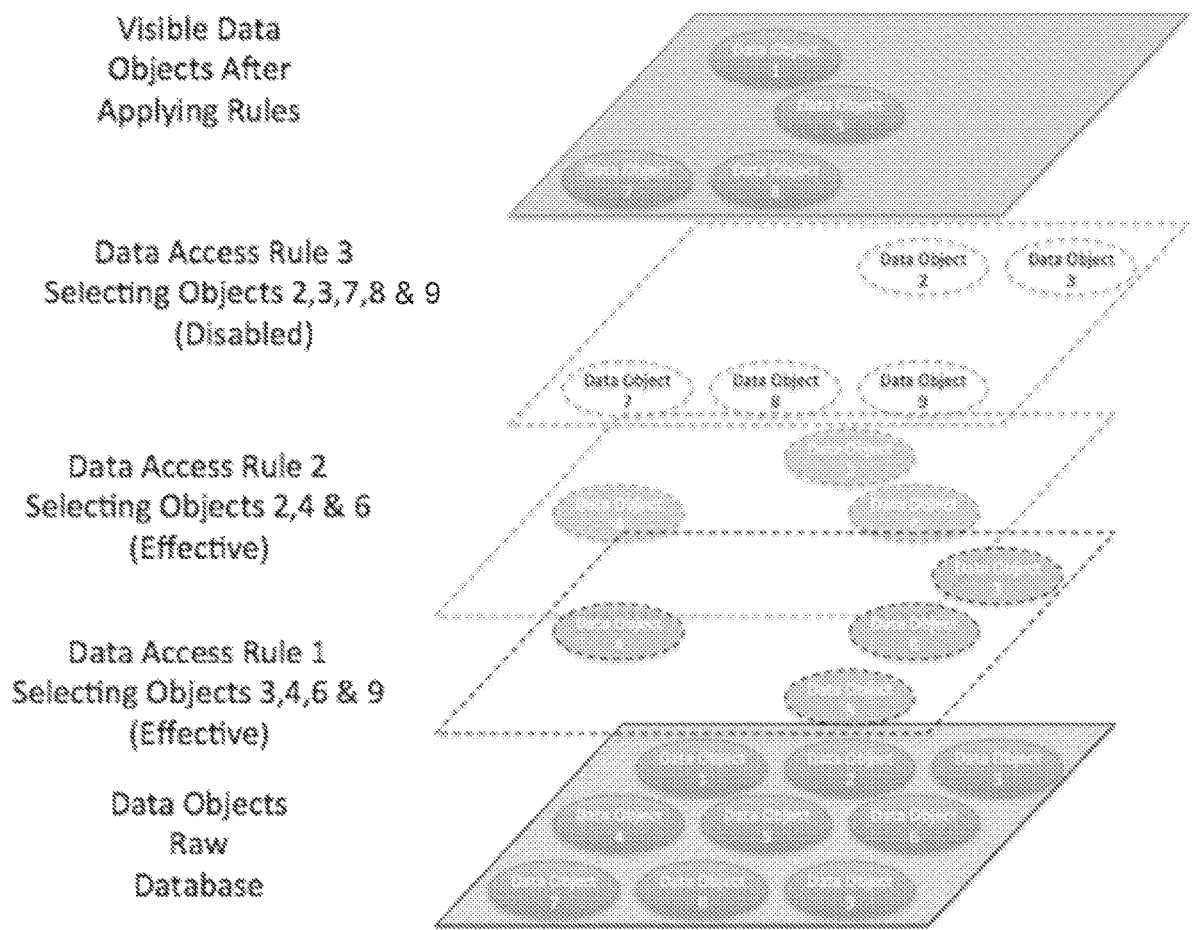
FIG. 20 illustrates data access computation according to various embodiments.

FIG. 20 illustrates data access computation according to various embodiments. In various embodiments, the media platform 120 can calculate data object visibility by performing an effective data masking computation. Access control rules are combinable to create a masking mechanism. Each rule identifies data objects that are to be inaccessible (e.g., hidden). When multiple rules are combined, the data objects that have not been obscured by any rule are left visible to the user.

In some embodiments, the media platform 120 implements the masking mechanism by creating a lock count and attaches the lock count to each data object. When an access control rule is activated, the rule identifies the data objects associated with the rule, determines a corresponding lock count incremented (e.g., by one), and restricts access to the associated data objects. When a user performs a search, the system restricts access (e.g., hides the data objects from the search results, or prevents accessing the data object) to data objects that have a lock count greater than zero. By contrast, data objects with a lock count of zero are displayed and accessible to the user. In some embodiments, the media platform 120 can implement the masking mechanism by performing a check on whether a data object selected is associated with any active access control rules.

Access Control Workflow

Figure 21:
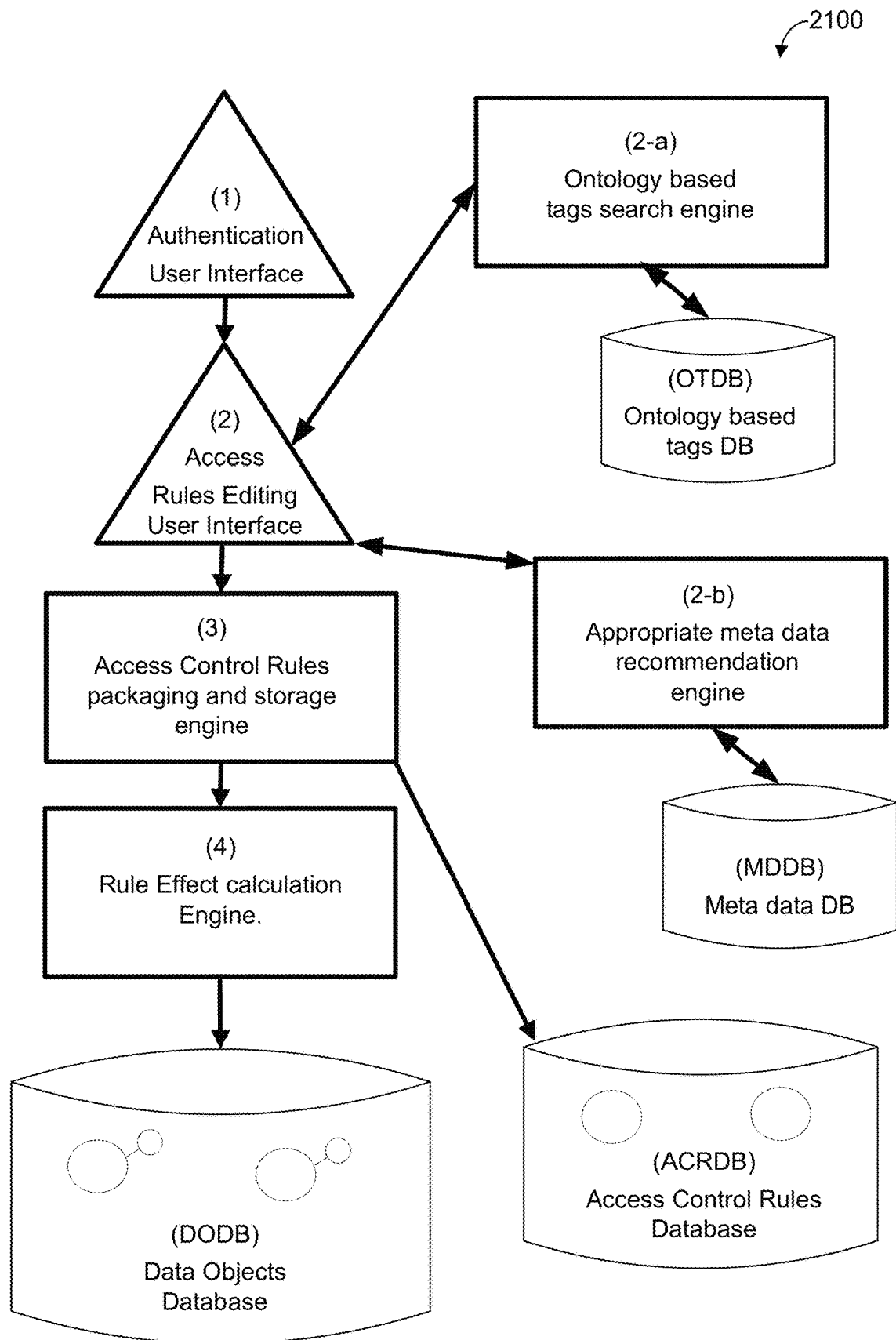
FIG. 21 illustrates a process for enforcing access control according to various embodiments.

FIG. 21 illustrates a process 2100 for enforcing access control according to various embodiments.

Referring to FIG. 21, a first UI is presented to challenge the user to re-establish the user identity before editing the rules (1). A second UI is presented to enable the user to create a new access control rule or edit an existing one (2). The second UI is a dynamic UI based on the available meta data to pick from and the relevant tags. Moreover, the second UI consults with two services. First, the second UI may consult with an ontology based tag search engine service to assist in the access control editor interface to facilitate the addition of relevant tags by the user. For example, the user may wish to pick tags for cities in Italy and the ontology based tag search engine helps the user find them efficiently.

Second, the second UI may consult with an appropriate metadata recommendation engine, which indicates what kind of metadata is available for a particular object type. For example, videos may have duration as metadata while text documents may have a word or character count. The engine assists in narrowing down the selection to the user for easy editing.

After the user confirms the final version of the access control rule, the access control rule is packaged for efficient storage and transportation (3). The rule is made ready for execution by the media platform 120. The access control rule is then stored (e.g., in a rules databased with existing rules).

The effect of the rule is pre-calculated for efficient enforcement at runtime and such effect is stored with each data object (4).

Alternately, access control rules can be symbolic link access control rules, where the rules are a simple group of hand selected data objects. In one embodiment, symbolic links are used to identify files in a file system to be locked. As such, when a group of symbolic links are locked the actual files are also locked. Data control locks implemented using symbolic links are separate from organizational structure.

The access control rules can also be meta-data access control rules where the access control rules are based on meta-data instead of tags.

The access control rules can also be keyword based tags access control rules where the tags are keyword matching tags and not ontology based tags The access control rules can also be ontology based tags access control rules.

Changing Access Control Rule Status

Access control rule status can be changed either manually or automatically.

Figure 22:
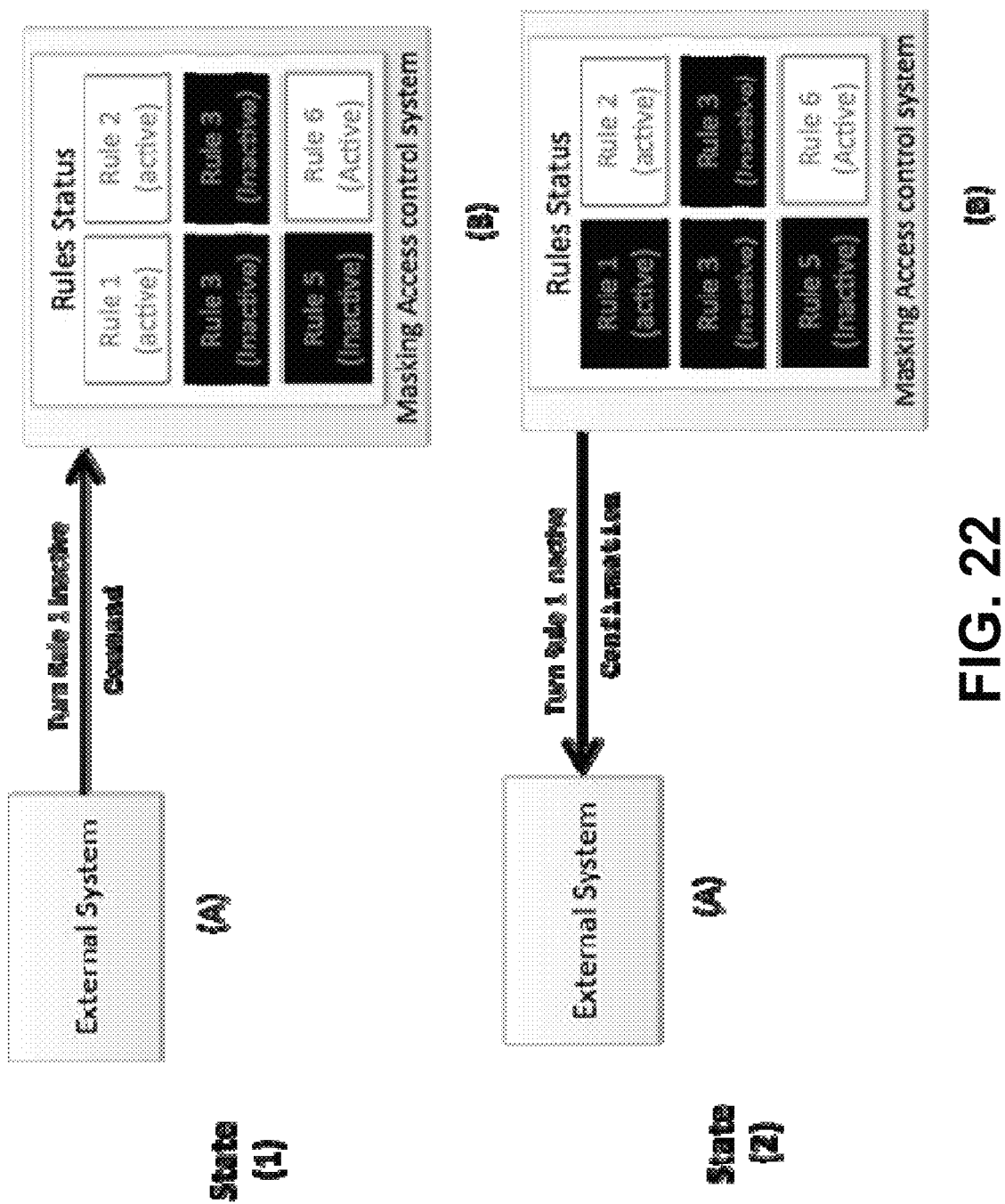
FIG. 22 illustrates an automatic change to access control rule status according to various embodiments.

FIG. 22 illustrates an automatic change to access control rule status according to various embodiments. Referring to FIG. 22, an external system may be working in conjunction with the masking access control system. The external system is responsible for controlling which access control rules are effective which access control rules are not. For example, an operating system can control the access control rules implemented in physical storage system controller (e.g., hard drive or solid state drive (SSD) controller). In this case, the operating system can add an extra level of protection that works in conjunction with the underlying operating system level. As shown in FIG. 22, in state 1, the external system sends a command to the described system where the command instructs to turn off one or more of the rules. The system responds in state 2 by confirming the new status of the access control rule after changing that rule status.

Figure 23:
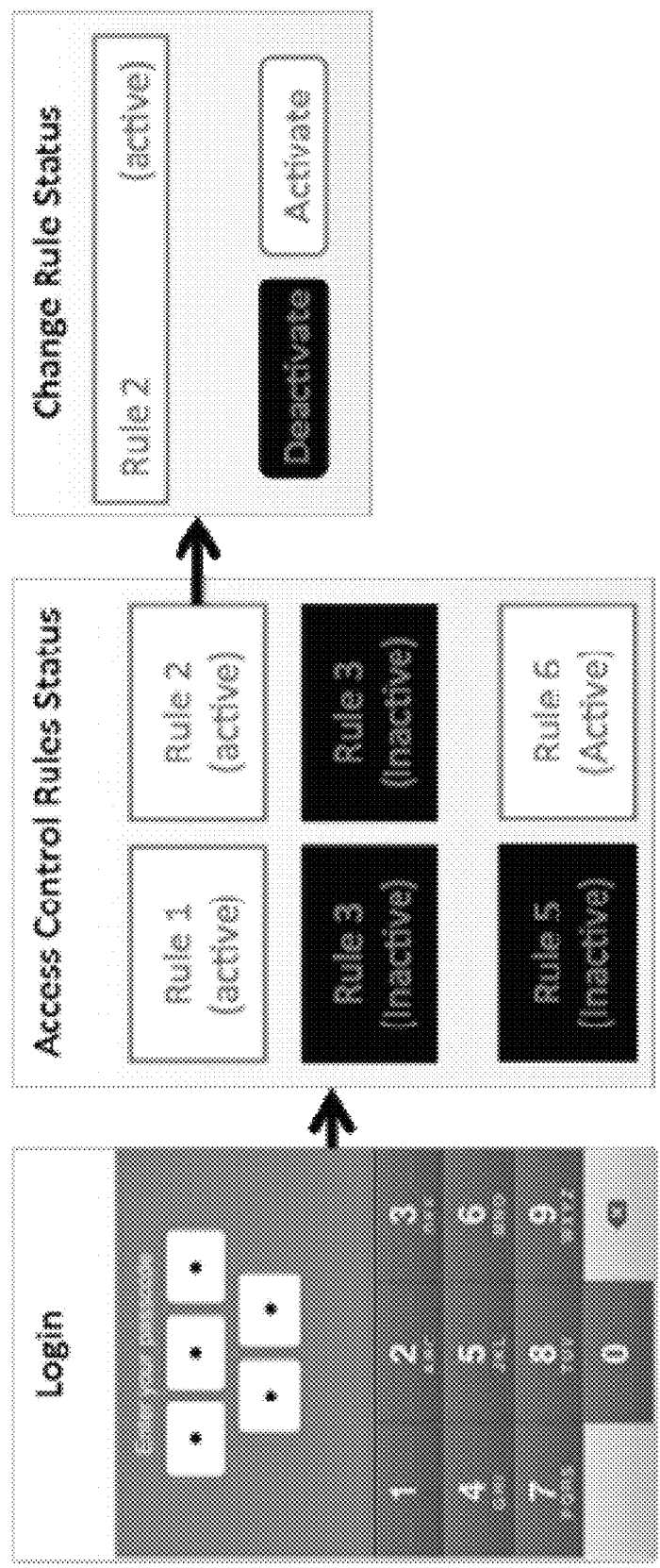
FIG. 23 illustrates a manual change to access control rule status according to various embodiments.

FIG. 23 illustrates a manual change to access control rule status according to various embodiments. Referring to FIG. 23, in a manual mode, the user controls the status of the access control rules. When the user wants to change the access control rule status, the system presents a UI enabling the user to edit access control rules. For example, if the user is challenged for authentication with a login screen to confirm the user identity, the login screen can take a password form, a picture code form, a lock key form, or any other authentication form. The UI can be presented that lists the access control rules and the status (e.g., enabled, disabled, active, deactivated, etc.) of each access control rule. When the user clicks on one of the rules, the user is presented with a UI that allows the user to change the status (e.g., enabled, disabled, active, deactivated, etc.) of the rule.

According to various embodiments, a system for enforcing restrictive access control with respect to a set of media objects includes on a single device. The single device may be configured to: determine, based at least in part on a first access control rule, to block access to at least a first media object included in the set of media objects; determine, based at least in part on a second access control rule, to block access to at least a second media object included in the set of media objects; and provide, to a user of the single device, at least a third media object included in the set of media objects but not the first media object and the second media object. The device can be configured to provide the third media object but not the first media object and the second media object based at least in part on the lock count associated with each of the first media object, the second media object, and the third media object.

Restrictive Access Control in Independent and Distributed Multi-System Environments In some embodiments, data may be dispersed across multiple independent systems including, for example, but not limited to, the user device 110, the data store 125, the first data source 140, and the second data source 150. The media platform 120 can synchronize access control rules on separate systems on a separate and a higher priority synchronization channel than for data synchronization. Additionally, data objects metadata can also use a separate synchronization mechanism and/or channel, thereby allowing each system to enforce the rules independently of a centralized system.

Synchronization

In a multi-system ecosystem, different systems (e.g., the data store 125, the first data source 140, and the second data source 150) are linked together to enable the user to reuse the same access control rules for any one system. The media platform 120 synchronizes access control rules, data objects, and metadata for data objects to enable each system to operate independently. Multiple synchronization networks can operate independently. For example, the access control rules synchronization network can operate in a substantially real time fashion on a high priority level. The metadata synchronization network can also work on a high priority level. The data object synchronization network may be a third independent network.

According to an example implementation, the system can enforce restrictive access control with respect to a set of digital objects accessible by a first device and second device of a user. The system includes the first device of the user configured to detect an update associated with a first system access control rule, wherein the first system access control rule is to block access to at least a first digital object included in the set of digital objects on the first device; determine, based at least in part on the update to the first system access control rule, to block access to at least a second digital object included in the set of digital objects on a second device; and provide, to the second device, the update associated with a first system access control rule to maintain restrictive access control over the set of digital objects on a second device.

According to an example implementation, the system for enforcing restrictive access control with respect to a set of media objects includes on multiple devices device for a single user. A first device may be configured to: determine, based at least in part on a first access control rule, to block access to at least a first media object included in the set of media objects; determine, based at least in part on a second access control rule, to block access to at least a second media object included in the set of media objects; and provide, to a user of the first device, at least a third media object included in the set of media objects but not the first media object and the second media object. The system can include a second device of the user and the first access control rule can include a universal rule applicable to the first device and the second device and the second access control rule can include a device specific rule applicable to the first device but not the second device.

According to an example implementation, the first device and the second device are configured to engage in a browsing session wherein a user of the second device browses the set of media objects via the first device. For example, the first device and the second device can be configured to conduct the browsing session based on a third access control rule that is applicable to the browsing session between the first device and the second device for the user. The third access control rule can block access to the third media object included in the set of media objects. For example, the first device can be configured to provide to the user of the second device at least the second media object but not the first media object and the third media object.

Central Server

Figure 24:
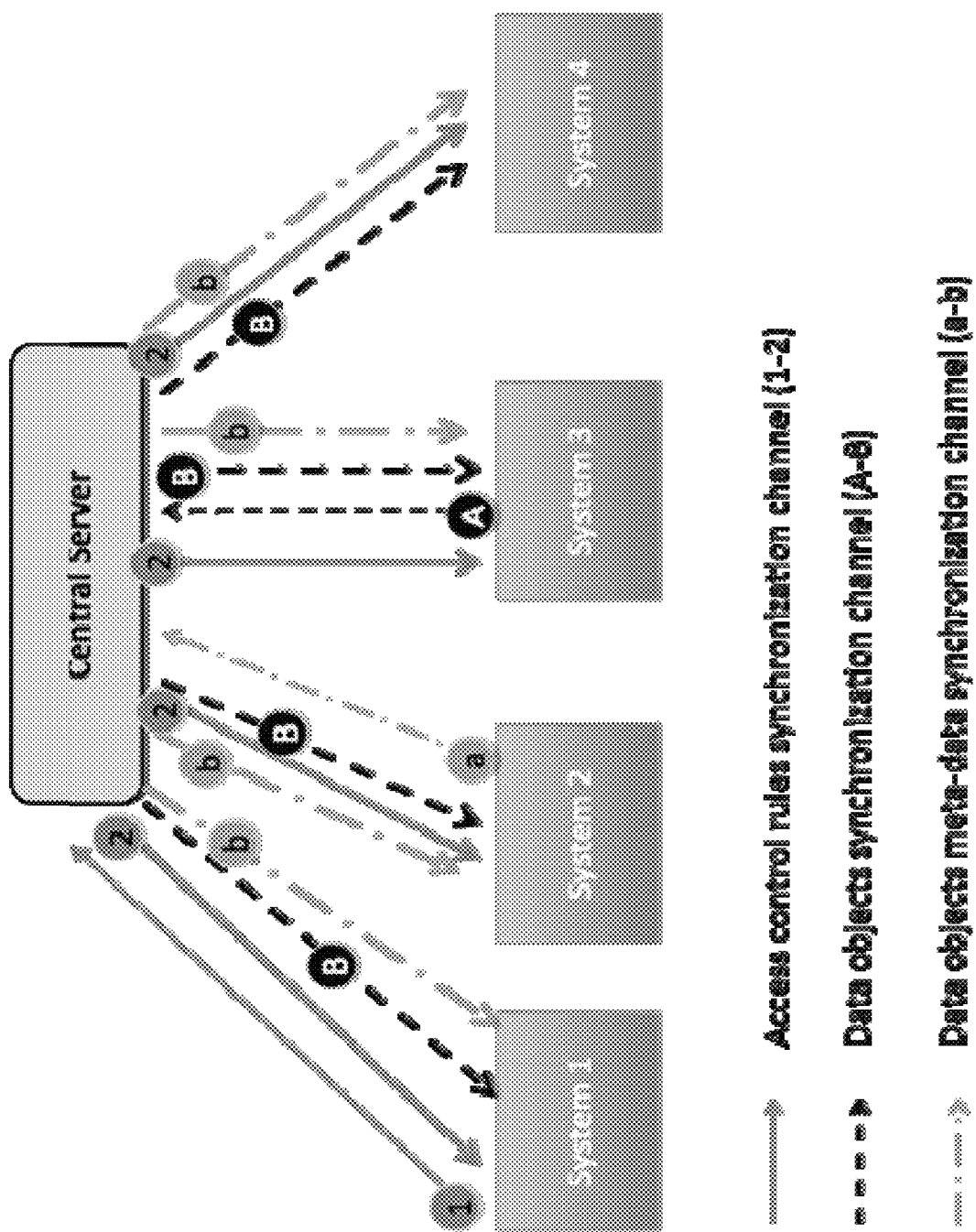
FIG. 24 illustrates central server based synchronization according to various embodiments.

In some embodiments, synchronization can take place with a central server or cloud acting as a maestro. All changes are first transmitted to the central server or the cloud before the changes are propagated to other systems. FIG. 24 illustrates central server based synchronization according to various embodiments.

Peer to Peer

Figure 25:
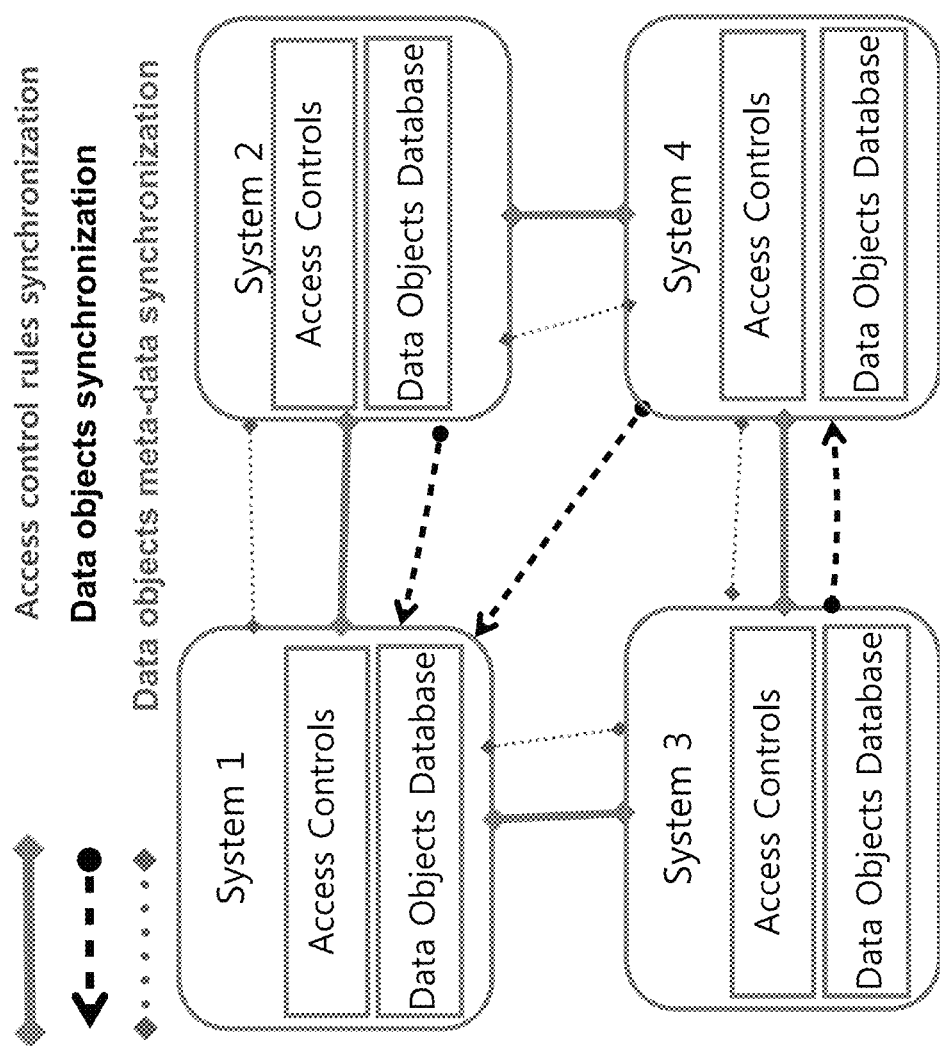
FIG. 25 illustrates peer-to-peer synchronization according to various embodiments.

In some embodiments, a peer-to-peer paradigm is applied in synchronizing multiple systems. For example, peer-to-peer synchronization can use independent versioning to track the latest updates. FIG. 25 illustrates peer-to-peer synchronization according to various embodiments.

Hierarchical Synchronization Network

Figure 26:
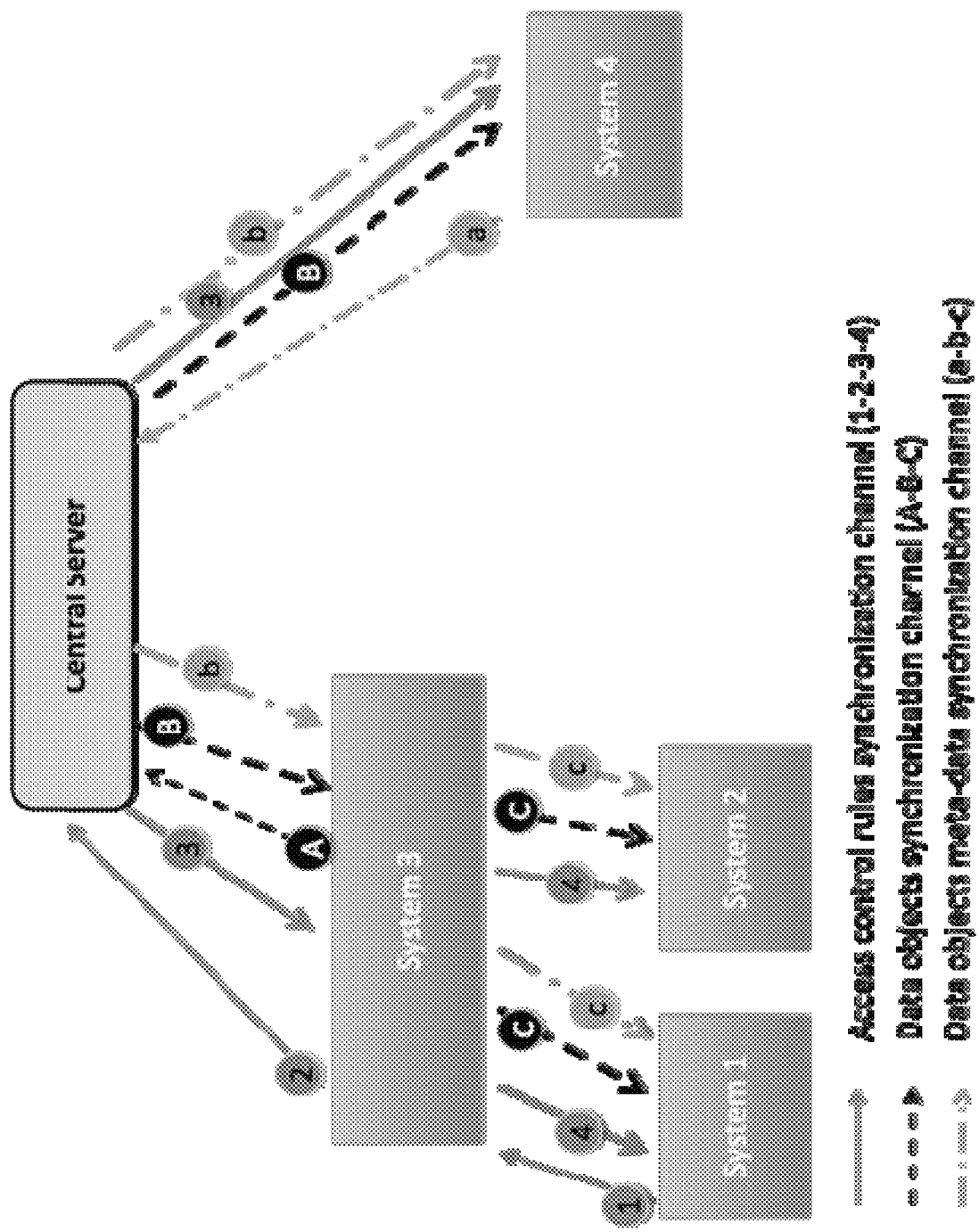
FIG. 26 illustrates hierarchical synchronization according to various embodiments.

In some embodiments, some systems may act as a local synchronization server orchestrating the status between local devices. The local synchronization server is responsible for communication with a centralized server. For example, in the absence of a mobile network, a WiFi hotspot could host a server that orchestrates the synchronization between various systems connected to the hotspot as well and communicates with a central server. FIG. 26 illustrates hierarchical synchronization according to various embodiments.

Data Access Computation

In various embodiments, data object visibility is calculated by access control rule status cascade and effecting data masking computation.

Access Control Rule Status Cascade

To support access control rule distribution and peer-to-peer browsing, multiple layers can be defined at which access control rules may be turned on or off. The layers can include, for example, but not limited to, a universal layer (i.e., for the whole ecosystem), a system or device layer (i.e., for each individual device or system), an application layer (i.e., for systems implemented at a platform level), and a session layer (i.e., for peer-to-peer or temporary changes).

Figure 27:
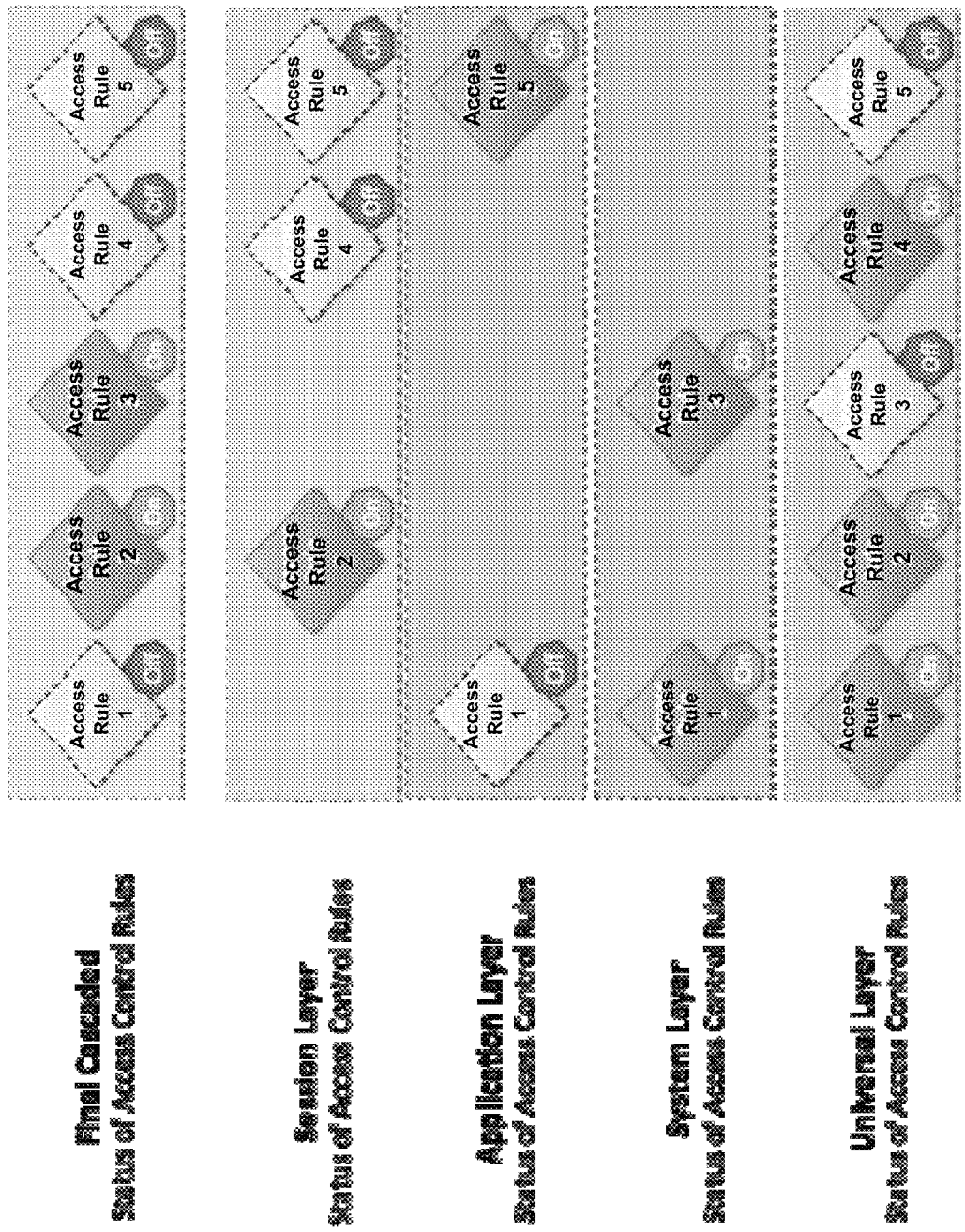
FIG. 27 illustrates access control rule cascade according to various embodiments.

In various embodiments, access control rules can be turned on or off at each layer. To calculate the status of each rule, rule status is cascaded from the least specific (i.e., universal) layer to the most specific (i.e., session) layer. The status of each rule is computed by allowing a rule status at a more general layer override the rule status at a more specific layer. FIG. 27 illustrates access control rule cascade according to various embodiments.

Effective Data Masking Computation

The effective data masking computation is conducted in a similar manner as described above, but the process is repeated for each target session.

Peer-to-Peer Browsing Session with Access Control

Figure 28:
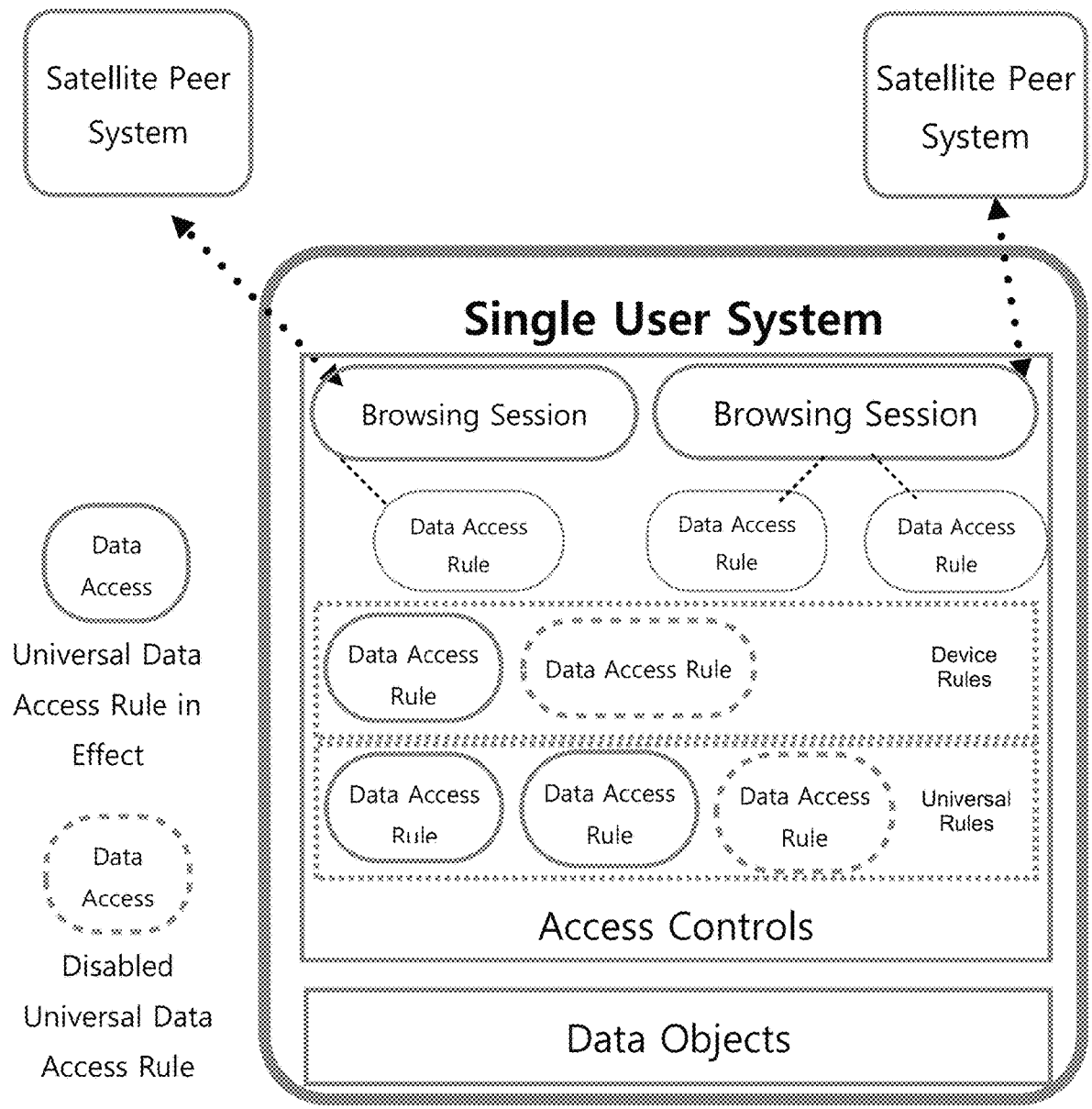
FIG. 28 illustrates a peer-to-peer browsing session according to various embodiments.

In peer-to-peer browsing mode, other systems are able to browse data objects stored in the host device, in an ad-hoc fashion, while maintaining access control rules. For each satellite system that request to browse the hosting, system can create a browsing session and change the status of access control rules for a particular browsing session. The session rules can be included in the computation of the rule status cascade, as described above. In some embodiments, peer-to-peer browsing converts the host device into an ad-hoc server for the purpose of data browsing. FIG. 28 illustrates a peer-to-peer browsing session according to various embodiments.

Browsing Session Initiation

Figure 29:
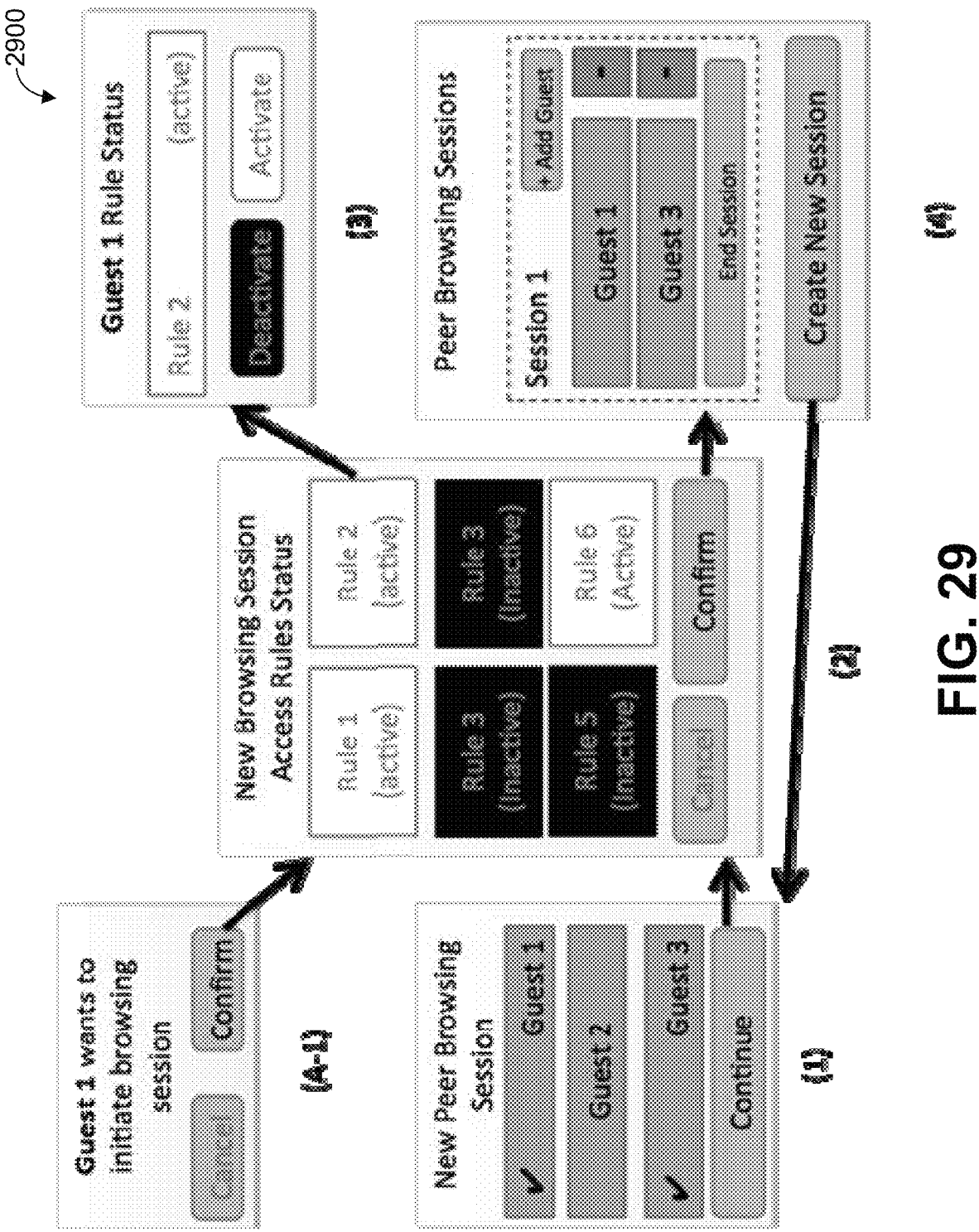
FIG. 29 illustrates a process for initiating a peer-to-peer browsing session according to various embodiments.

FIG. 29 illustrates a process 2900 for initiating a peer-to-peer browsing session according to various embodiments. For a user to initiate a peer-to-peer browsing session, the user is presented with the set of guests the user can invite to browse the user's own device (1). The user selects the desired guests then continues to examine the access control rules. The effective status of the access control rules for the new session is presented to the user allowing the user to change the effective status of each rule for that particular session (2). The user can active and deactivate each access control rule for that particular guest session (3). The user is presented with a UI allowing the user to see the currently active browsing sessions along with the guests participating in each session (4). The user can add guests, remove guests, and/or terminate the session via the UI.

According to an example implementation, the system can enforce restrictive access control for a user while browsing another user's device.

Visual Access Codes

In various embodiments, access may be controlled via a visual access code mechanism that makes it easier for the user to remember while providing enhanced security by increasing the possible combinations. The visual access code mechanism is presented via a UI having two entry phases. The first entry phasesrequests the user to select one photo from a set of photos or images, which can be preconfigured by a system administrator. The photo set can be the same for all users or be user-specific. Moreover, the photo set can be the same for all devices or be device-specific.

FIG. 30 illustrates a process 3000 for configuring a visual access code according to various embodiments. The user can be presented with an image (e.g., photo) in step 1. In step 2, the user is required to select (e.g., by clicking, touching, gesturing, etc.) a subset of (e.g., four, five, etc.) hotspots from a group of possible (e.g., 16, 25, 36, etc.) hotspots. For example, the user can select a subset of 4 hotspots from 16 hotspots marked on the photo by touching the hotspots in any order. In some embodiments, the image can have an overlay or marking to make the hotspots visible and aid the user in selecting and recalling the selected hotspots. The visual access code is composed of the photo index associated with the photo selected at step 1 and the subset of hotspots values selected at step 2. The photo index and coordinates associated with the subset of hotspots can be stored as an encrypted digest.

A user's visual memory is employed to store and recall the registered image and the hotspots by using visual cues in the image. Visual memory is a form of memory which preserves some characteristics of our senses pertaining to visual experience. Visual memory describes the relationship between perceptual processing and the encoding, storage and retrieval of the resulting neural representations. Visual memory occurs over time ranges from eye movements in order to visually navigate to a previously visited location. Visual access codes including a subset of hotspots on a registered image can stored longer and more readily recalled for providing authentication. Further, selecting trivial visual access codes is less likely than trivial alphanumeric pass-codes (e.g., "1111," "1234," "password," etc.) since available hotspots are different for each photo. The user can place in memory visual information which resembles objects, places, animals or people as a mental image of the visual access code. The user can recall the visual access codes as patterns from long term visual memory using different areas of their prefrontal cortex and the anterior cingulate cortex.

According to various embodiments, a system for visual access code process can include a first device configured to: present, to a user of the first device or service, a plurality of images; receive, from the user, a selection of a first of the plurality of images; receive, from the user, a selection of at least a first of a plurality of hotspots included in the first images; and generate a visual access code based at least in part on the selection of the first images and the first hotspot.

According to an example implementation, a registration process of the visual access process may include a first selection from a grid of images (e.g., photographs, pictures, complex shapes, images, etc.) and a second selection for a series of hotspot locations of the first selected image (e.g., pixel location, screen coordinates, overlay point, etc.) For example, the user may be presented with a grid of photographs depicting various landmarks, select a picture depicting a landmark from the grid. Then from the selected landmark picture, the user can select a series of hotspot locations on the selected picture. For example, the selected hotspot locations may be locations on the picture or image that correspond to different parts of a landmark, the background, border of the picture, etc. The depicted features in the picture or image serve as visual clues to the user where the visual cues correspond to the selected hotspot locations. Accordingly, depicted features in the picture may be more readily stored in the user's memory than traditional alpha-numerical combinations The system can efficiently store the user selection of the picture and set of hotspots during the registration process, as described in greater detail with reference to FIGS. 32-41. For example, each of the plurality of photographs can be associated with a corresponding index number. For example, each index number can include a globally unique photo identifier. In an embodiment, the first phase selection of the image from a grid of images can include additional pages of grids of multiple images. The user can scroll through multiple pages of grids of images to identify the registered image for the first phase image selection. Each of the images in the multiple grids of images can include an index number based on the globally unique photo identifier of each image.

Each image can include a number of predefined hotspots for the user to select a subset of for the second phase set of hotspots. According to an example implementation, each of the plurality of hotspots is associated with a corresponding hotspot identifier that can be cryptographically stored with the image index number. According to another example implementation, each of the plurality of hotspots can be associated with a two dimensional coordinate of a corresponding pixel in the photograph.

According to an embodiment, the visual access code can be implemented by an authentication service, for example, on a destination device or service. In an example, a website can replace a traditional alphanumeric login form with a visual access code two phase input method to authenticate the user. After the user register's a visual access code with the authentication service, the authentication service (e.g., the mobile device or website) can user various techniques for securely storing the user's visual access code to match subsequent entry of the visual access code to the stored registered access code. For example, after the user register's a visual access code, the authentication service can transform an identifier associated with the first phase and coordinates associated with the second phase into a text string and cryptographically store the string. Then, when the user re-visits the destination and enters the visual access code, the authentication service can decrypt the stored string to verify the user's authorization to access the destination.

According to another embodiment, the visual access code can be implemented by a client side visual authorization interface (VAI) that receives from the user a visual access code and outputs an alphanumeric password to various destinations. In this embodiment, the VAI includes an algorithm that recreates the alphanumeric password based on the destination. In an example, a user can access a website that uses a traditional alphanumeric login form with the VAI. To use the VAI with the destination, the user employs the VAI to set-up or registers the alphanumeric password.

The visual access code system can further include a system and method for entering visual access codes through on-screen virtual input mechanisms or visual authorization interface (VAI). The VAI acts as a client side visual password entry software that does not require support from other applications or websites. The VAI present to the user a user interface that allows him to enter the password visually and then the software encodes such visual access code into regular alpha-numeric characters that are suitable for current websites and applications. The system does not store the passwords anywhere and generates consistently them every time the user enters a visual access code.

For example, a virtual keyboard may be VAI dedicated for entering visual access codes. The VAI can perform client-side authentication for entry of visual passwords via the visual access code process. The VAI presents the user with an interface to input the visual access code independent of the device hardware. That is, the VAI provides compatibility for secure authentication that does not require hardware, such as a fingerprint reader, and maintains integrity of the visual access codes independent of locally stored passwords.

The user may navigate to a reset my password form and launch the VAI to populate the alphanumeric password in the destination's password form. As described below, the VAI will consistently regenerate the alphanumeric password for the destination based on the visual access code entered by the user. Moreover, when the same visual access code is entered into the VAI for a different destination, the VAI generates a different alphanumeric password. Accordingly, the VAI can authenticate a user using a visual access code compatible with the traditional destination login method. After the user uses the VAI to register with a destination, the destination stores the output of the VAI (e.g., an alphanumeric password). The output of the VAI serves as a destination side authentication key while the visual access code is a client side authentication key.

For example, after the destination records the output of the VAI, the user can re-visits the destination, launch the VAI, enter the user's visual access code, and the VAI will output a passcode that matches the passcode previously stored by the destination. In various embodiments the output of the VAI can be based a hex digest that uses a user's unique identifier, selection of a first image, a unique identifier of the first image, an image blending algorithm, selection of hotpots, shifting of hotspot coordinates, and/or one or more one-way cryptographic algorithms.

After the user registers a series or set of hotspots of a selected image, the user can be presented with the visual access code process for authenticating the user to the device or service. For example, the user may navigate to an access interface of the device or service, be presented with multiple photographs or image during a first phase of the visual access process. The user must recall the correct photograph previously selected during the registered process among multiple photographs presented. For example, the user may be presented with a grid of pictures depicting various famous landmarks. The user's registered image may be grouped with the same plurality of photographs from during the registration process or grouped with photographs that are different from the images presented during the registration process. The user first selects the registered image from the plurality of images. For example, the user selected image can be matched to the index number of the photograph's globally unique photo identifier.

Figure 31:
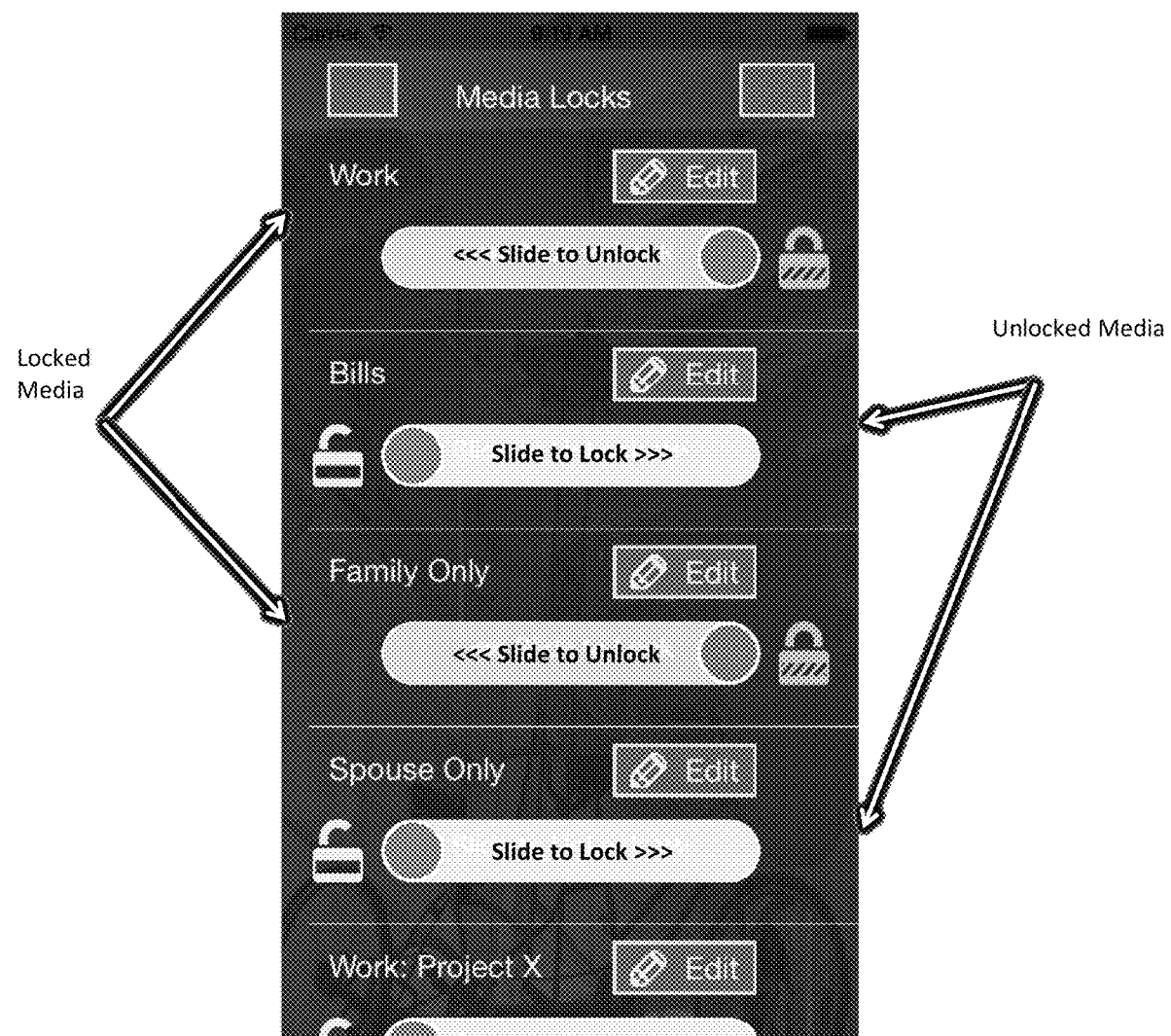
FIG. 31 illustrates an example lock code management interface for use with visual access codes.

FIG. 31 illustrates an example lock code management interface for use with visual access codes. The lock code management interface 3100 allows the user to manage visual access codes, configure visual access code preferences, assign user profiles, etc. In an example embodiment, the lock code management interface allows the user to configure different visual access codes based on an application category, such as media applications, financial applications, work applications, etc. A master user can configure multiple visual access codes for different sub-users of a service or device. For example, a parent may configure guest visual access codes that allow children to access gaming applications. In another example, a spouse may configure a partner visual access code that allows the spouse's partner to access financial accounts but not social media or messaging accounts of the spouse.

Figure 32:
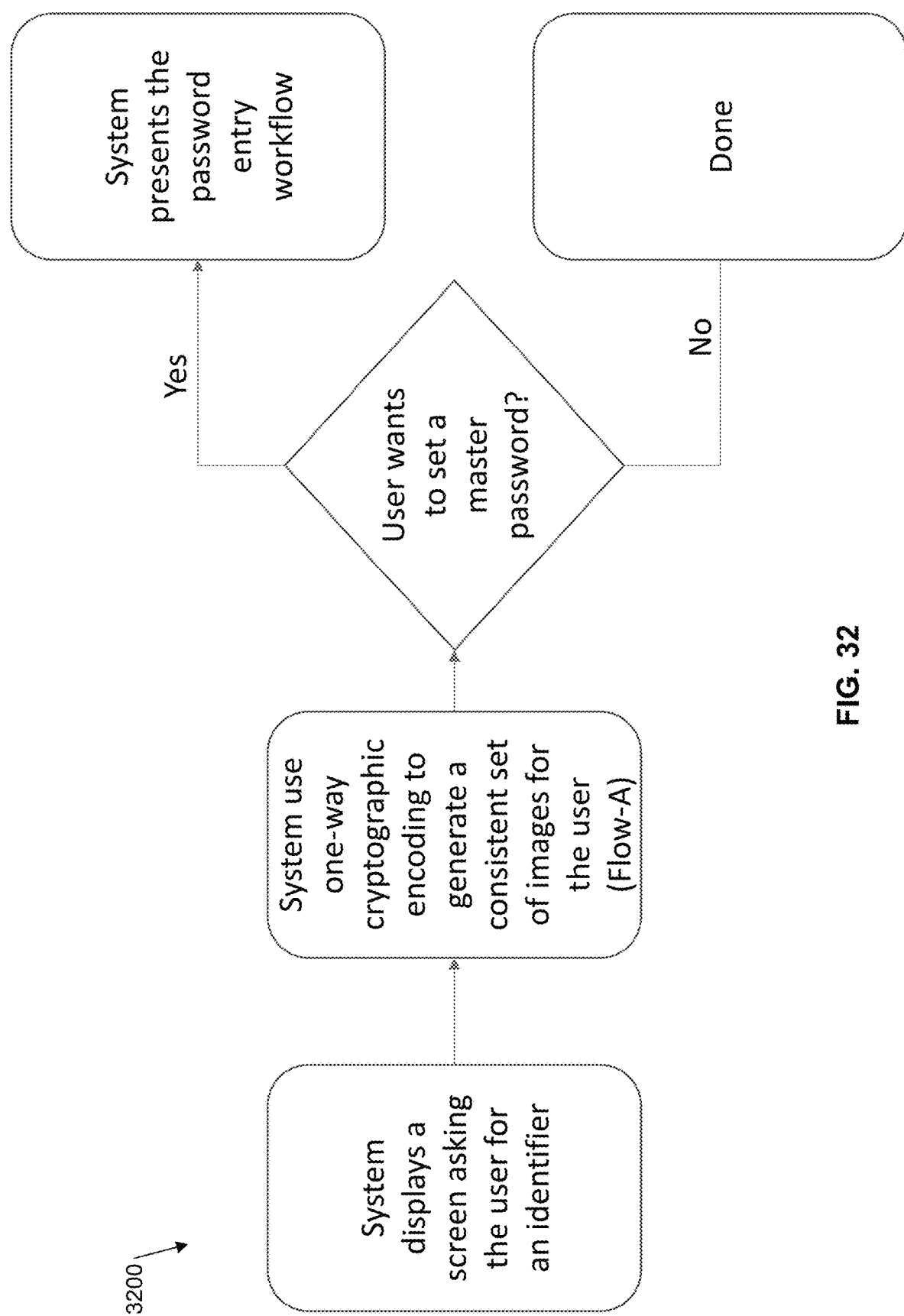
FIG. 32 illustrate an example flow for configuring visual access codes according to an exemplary embodiment.

FIG. 32 illustrates an example flow 3200 for configuring visual access codes according to an exemplary embodiment. The process begins with gathering a unique identifier from the user. The process 3200 uses a one-way cryptographic encoding to generate a consistent set of images for the user, as further described in reference to FIG. 33. The workflow 3200 proceeds to determine whether the user wants to set a master password, as further described in reference to FIG. 36.

Figure 33:
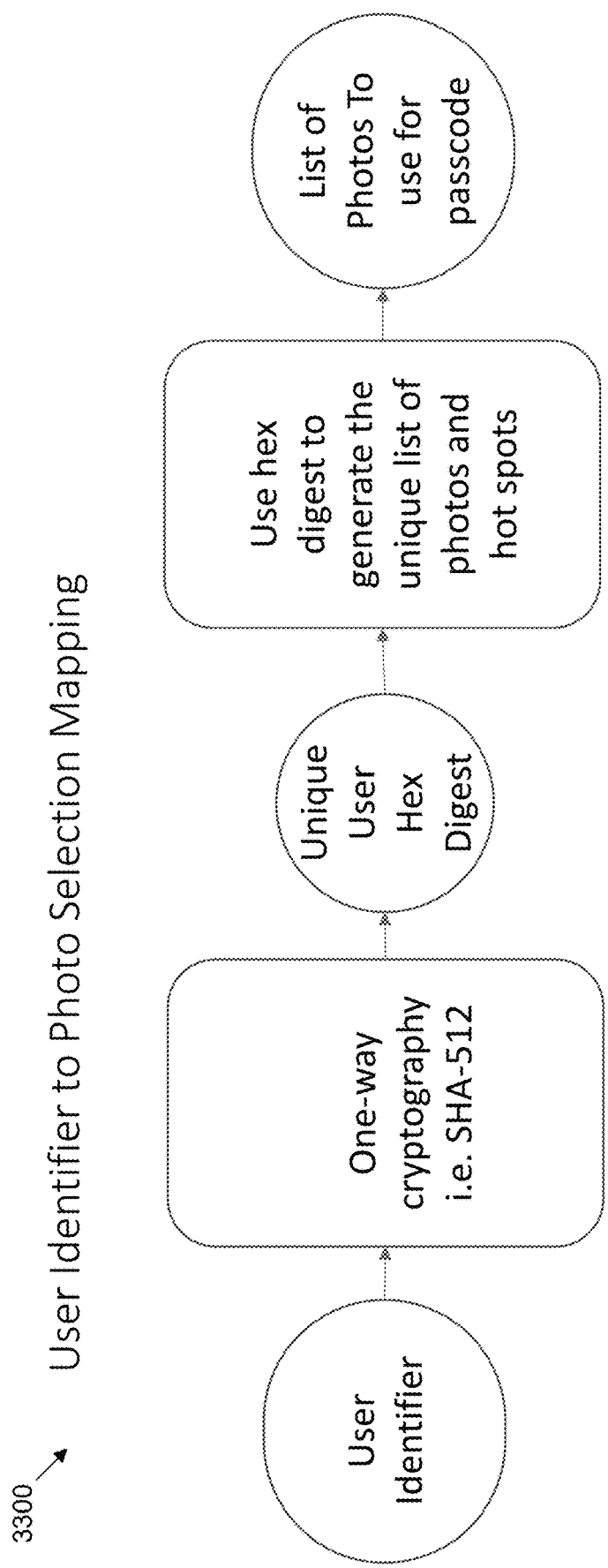
FIG. 33 illustrates an example process for mapping a user identifier to photo selection mapping according to various embodiments.

FIG. 33 illustrates an example process 3300 for mapping a user identifier to photo selection mapping according to various embodiments. Process 3300 may begin with the user providing a unique identifier. Process 3300 may determine a one-way cryptographic code and generate a unique user hex digest, as described in more detail in reference to FIGS. 35-36. Then, unique user hex digest can be used to generate a unique list of photos and hotspots, as described in more detail in reference to FIGS. 40-41. Then process 3300 presents the list of photos to the user to register a passcode, as described in more detail in reference to FIGS. 37-39.

Compact Encoding

In some embodiments, the visual access code may be encoded using compact encoding. For example, in compact encoding, each photo can have an index from 0 to 8 while each hotspot has an index from 0 to 15. There may be no fixed correlation between an index that is assigned to a hotspot and the hotspot's position in the photo. The correlation between the index that is assigned to the hotspot and the hotspot's position in the photo is photo dependent. In an embodiment, the index value associated with the hotspot is assigned randomly. Accordingly, random index assignments for the hotspot create secure access passcode.

In the example above, compact encoding creates 16 possible values. Four of the values are selected in any order any number of times, giving rise to 3,876 possibilities. Since there are further 9 different photos, the number of possible combinations increases to 9×3,876=34,884, which is more than 3 times the number of possibilities afforded by a conventional 4-digit numeric passcode.

Positioned Encoding

In some embodiments, the visual access code may be generated using positioned encoding based on each chosen hotspot's coordinates. For the same photo, the coordinates of each hotspot may be fixed but those coordinates are not transportable from one photo to another. Table 1 shows how a simple hotspot index encoding as described in the previous section is mapped to coordinate indices. For example, hotspot index 2 corresponds to values (140 and 59) in Photo 1 and (89 and 147) in Photo 2. With compact encoding the value 2 is shared between photos but coordinate values for the same hotspot is not shared between photos. Moreover, the number of stored digits is also increased (e.g., 8 instead of 4 values). Thus, positioned encoding generates even more possibilities and renders the corresponding visual access code even harder to break.

In some embodiment, the visual access code can depend on the size and/or resolution of the photo. For instance, in a 500×500 pixel photo, each hotspot can generate a code from 0 to 499 in the horizontal axis and from 0 to 499 in the vertical axis. As such, 4 hotspots is equivalent to 8 digits, which gives 1.02432860e+17 possibilities. That number is further multiplied by the number of photos (e.g., 9), which yields ~9e+17 possibilities for a much stronger password than a conventional 8-character long alphanumeric case sensitive password with special characters (i.e., 2.02095455e+11 possibilities).

TABLE 1

Positioned Encoding with Unique Photo Identifiers

| hotspot Index | Photo 1 Coordinates | Photo 2 Coordinates |
|---|---|---|
| 0 | (0, 0) | (100, 100) |
| 1 | (40, 50) | (24, 135) |
| 2 | (140, 59) | (89, 147) |
| 3 | (240, 15) | (29, 225) |
| 4 | (370, 50) | (54, 135) |
| 5 | (140, 150) | (214, 335) |
| 6 | (78, 150) | (334, 235) |
| 7 | (67, 20) | (344, 185) |
| 8 | (80, 500) | (124, 195) |
| 9 | (90, 310) | (249, 435) |
| 10 | (140, 240) | (214, 235) |
| 11 | (400, 150) | (314, 135) |
| 12 | (230, 60) | (245, 135) |
| 13 | (312, 70) | (124, 235) |
| 14 | (32, 80) | (274, 535) |
| 15 | (42, 98) | (214, 335) |

In some embodiments, every photo can be associated with a globally unique identifier. As such, storing the passcode is dependent on the system or on the user. The user cannot select the same password for the two different systems. For example, a passcode of (0,100,101,200,201,300,301,400, 401) that has been encoded using positioned coding corresponds to the first photo (i.e., photo 0). But incorporating a unique photo identifier generates a password of (38A52BE4-9352-453E-AF97 5C3B448652F 0,100,101,200,201,300, 301,400,401), where '38A52BE4-9352-453E-AF97-5C3B448652F0' is the photo globally unique identifier. In various embodiments, the globally unique identifier could be a length value (e.g., a 16 characters long number) that is hard to guess.

Figure 34:
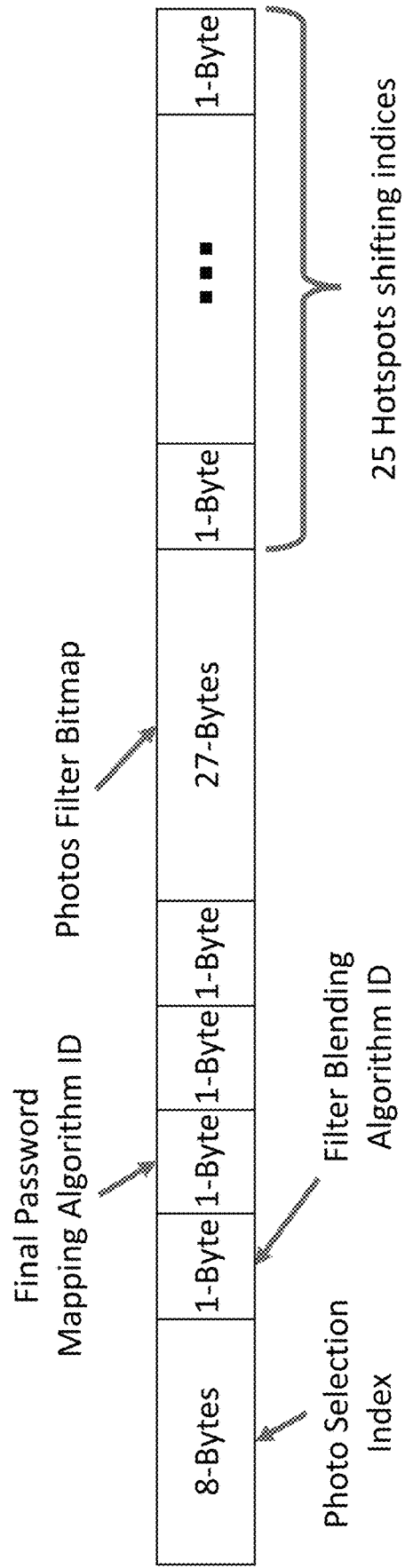
FIG. 34 illustrates an example unique user hex digest, according to various embodiments.

FIG. 34 illustrates an example unique user hex digest, according to various embodiments. The hex digest can include a photo selection index, a filter blending algorithm identifier, a final password mapping algorithm identifier, photo filter bitmap, and hotspot identifiers. For example a unique user hex digest may begin with eight bytes designated for the photo selection index, followed by a one byte filter blending algorithm identifier, and an indicator for the final password mapping algorithm. In an example embodiment the photo filter bitmap may consist of 27 bytes. According to an example embodiment, the unique user hex digest can include 25 bytes for indicating hotspot shifting indices.

Figure 35:
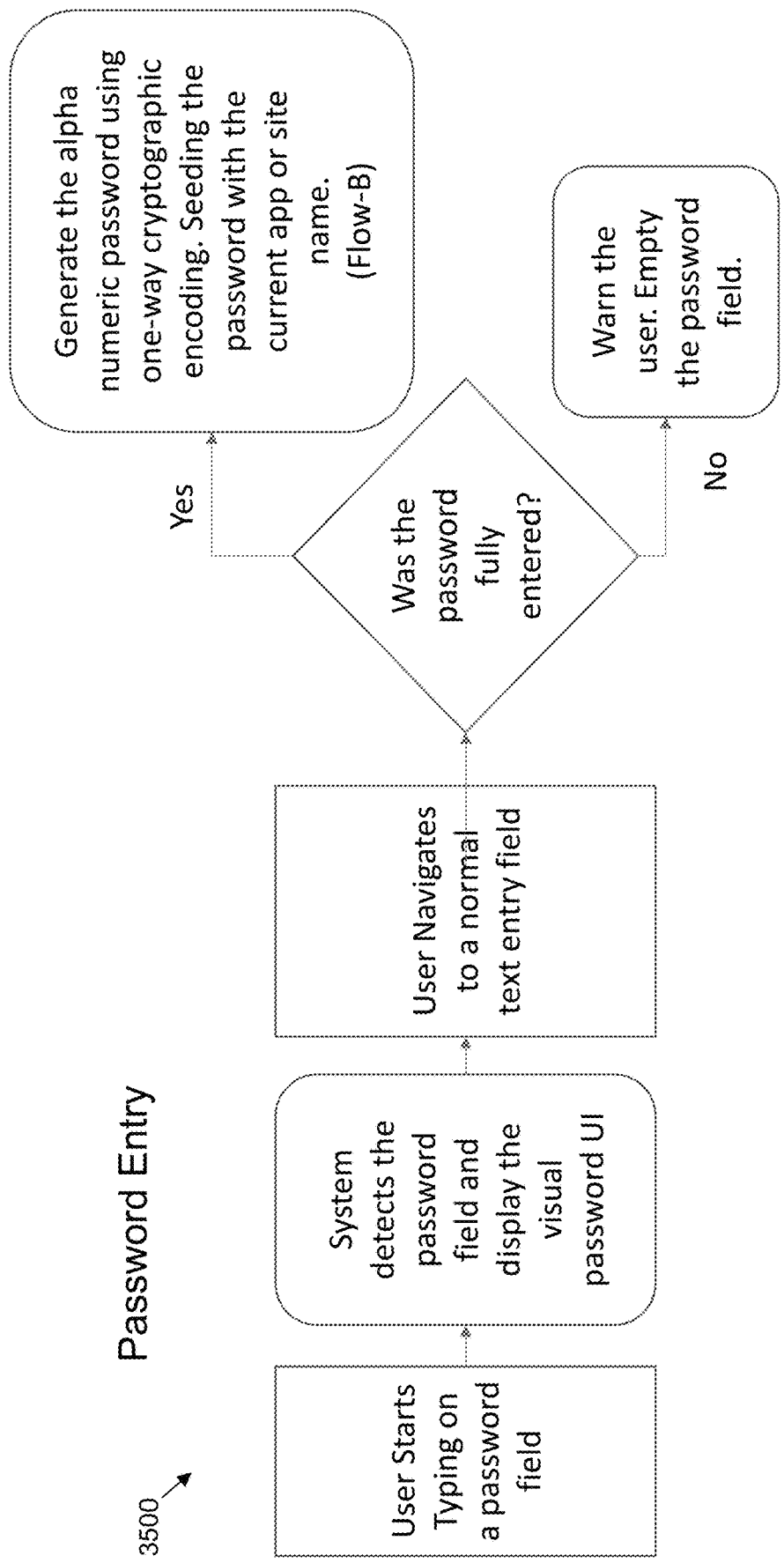
FIG. 35 illustrates an example registration process for assigning a visual access code according to an example embodiment.

FIG. 35 illustrates an example registration process for assigning a visual access code according to an example embodiment. The registration process 3500 may begin with a user navigating to a destination that requires authentication. A virtual input (e.g., VAI) method may detect a traditional login form requiring a username and password. After the user types a username into a traditional login form, the registration process 3500 method may present a registration interface for assigning a visual access code to the destination using a hex digest. The user may proceed via the VAI with selecting a first image and series of hotspots to register a new visual access code for the destination, as described above.

Based on the provided username and destination identifier, the VAI can regenerate a password based on the hex digest to match a stored password with the destination.

The registration process 3500 may proceed to completing the traditional login form with the password based on the hex digest. For example, registration process 3500 can generate the alphanumeric password using one-way cryptographic encoding and seeding the password with a destination identifier. A password seed is used to feed the one-way cryptographic algorithm prior to generating an alphanumeric password, as described in reference to FIG. 36. The seed has a direct one-to-one mapping between the user's selected hotspots and the seed. The process generates a password seeded with the application/website destination name before the one-way cryptographic such that different application/websites destinations have different passwords even when the same visual passcode is used. Therefore, the user's system does not need to store the passwords for each site since the access code process consistently replicates generation of the password based on the user input.

According to an exemplary embodiment, the algorithm for setting up a visual access code can include

---

Encode the phrase with one-way cryptography i.e. sha-512
let uniqueUserHexDigest = onewayCryptography(user phrase)
save uniqueUserHexDigest to hostsystem Keystore
Use the cryptography to generate the list of photos
    let basePhotoIndex = getByteAtIndex(0,8, uniqueUserHexDigest)
Repeat index i 0 to (number of Photos to use for key) − 1
Let photoIndex = (basePhotoIndex + i)modulus (total number of photos in the system)
let photo = getPhotoWithIndex(photoIndex)
let blendingAlgorithmIndex= getByteAtIndex(8, uniqueUserHexDigest)
let photoFilterBitmap = getNumberOfBytesFromPosition(27,12, uniqueUserHexDigest)
let photoBlendingFilter = generateFullPhotoFromBitmap(photoFilterBitmap)
let finalPhoto = blendPhotoWithFilterUsingAlgorithm(photo, photoBlendingFilter, blendingAlgorithmIndex)
let hotspots = getPhotoHotSpotsForIndex(photoIndex)
let h=0
letshiftedHotSpots = Array of size of 25
for each hotspot
    let hotspotShift = getByteAtIndex (h+38, uniqueUserHexDigest)
    let adjusted HotSpot = adjustHotSpotCenterByShift(hotspots[h], hotspotShift)
    shiftedHotSpots.add(adjustedHotSpot)

---

When the destination is visited, the VAI may determine the associated visual access code and present the user with the virtual input method to authenticate the user. In response to a successful visual access code authentication via the virtual input method, the system may populate the traditional login form with the assigned alphanumeric password to complete destination authentication.

Figure 36:
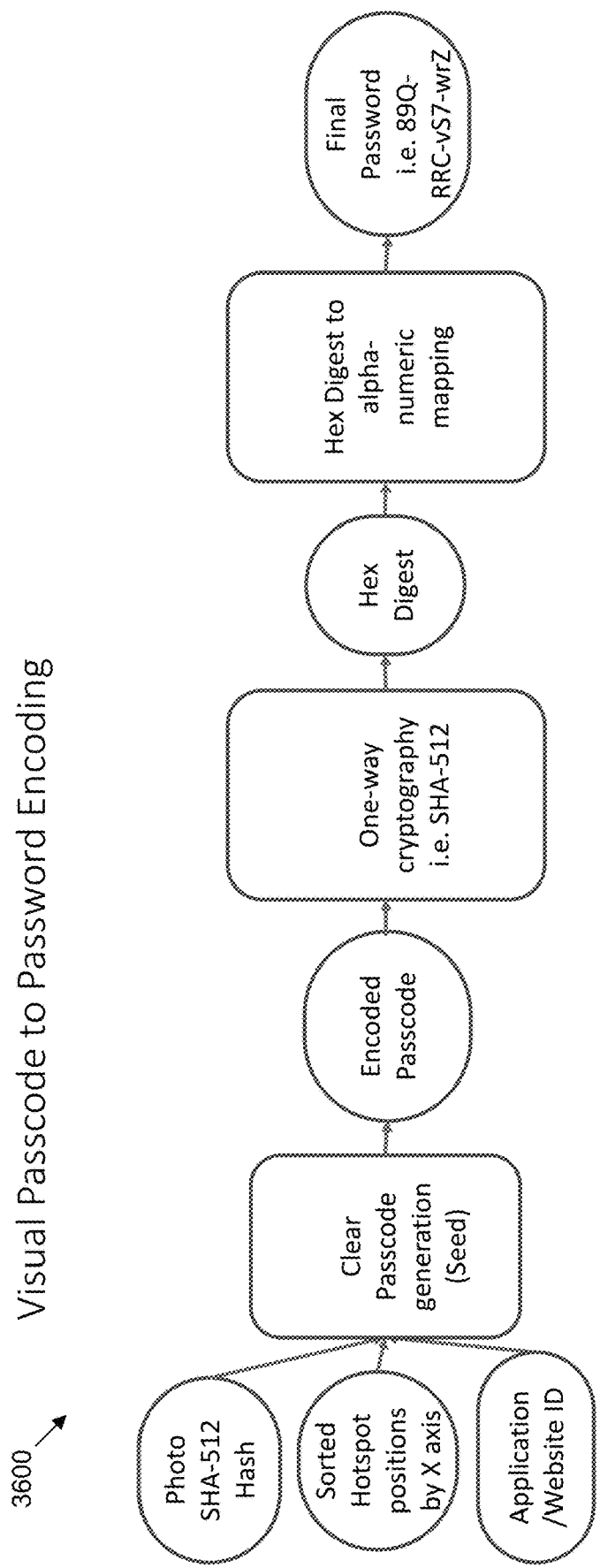
FIG. 36 illustrates an example process for encoding a visual access code with a password according to an example embodiment.

FIG. 36 illustrates an example process 3600 for encoding a visual access code with a password according to an example embodiment. The process 3600 may input photo SHA-512 has, sorted hotspot positions by the X axis, and an application/website destination identifier to generate a passcode seed. The process 3600 uses the encoded passcode with a one-way cryptographic algorithm to generate the hex digest that is used to map an alphanumeric password. In an example embodiment, the resulting password will generate a secure ASCII password that can include upper case and lower case English alphabet and numbers as well as special characters. According to an example embodiment the algorithm can include:

```
input passwordHexDigest
let passwordBytes = getNumberOfBytesFromPosition(0,16,
passwordHexDigest)
let finalPassword = ""
For each byte in passwordBytes
If ( byte == 45 OR
(byte >=48 AND byte <=57) OR
(byte >=65 AND byte <=90) OR
(byte >=97 AND byte <=122)){
// take the value as is
finalPassword.append(byte)
continue to next byte
}
    let modByte = byte modulus 63
    if(modByte == 0){
        modByte += 45
    } else if (byte >=1 AND byte <=11){
        modByte += 47
    } else if (byte >=12 AND byte <=37){
        modByte+= 53
    }else{
        modByte+= 59
    }
finalPassword.append(modByte)
```

FIG. 37 illustrates an example mobile interface in accordance with various embodiments. To set up a visual access code for the virtual input method, the user begins by selecting a unique passphrase such as their name, a mother's maiden name, birthdate, or favorite location, etc. Step two the system generates a set of images for the user to select a registration image. According to an example embodiment the algorithm can include:

```
Let photoHexDigest = generateOneWayCryptographyFrom(photoBitmpa)
Let selectedHotspotsXY = ""
For each selected hotspot
    Let hotspotXY=getXYForHotspot
    selectedHotspotsXY.append(hotspotXY)
End
Let siteOrAppId = collectCurrentSiteOrAppId
Let finalPasswordSeed = concat(photoHexDigest, selectedHotspotsXY,
SiteOrAppId)
Let passwordHexDigest =
generateOneWayCryptographyFrom(finalPasswordSeed)
Let passordMappingAlgorithmIndex=
getByteAtIndex(9, uniqueUserHexDigest)
let asciiPassword=
generateAsciiPasswordWithAlgorithm(passwordHexDigest,
passordMappingAlgorithmIndex)
```

Figure 38:
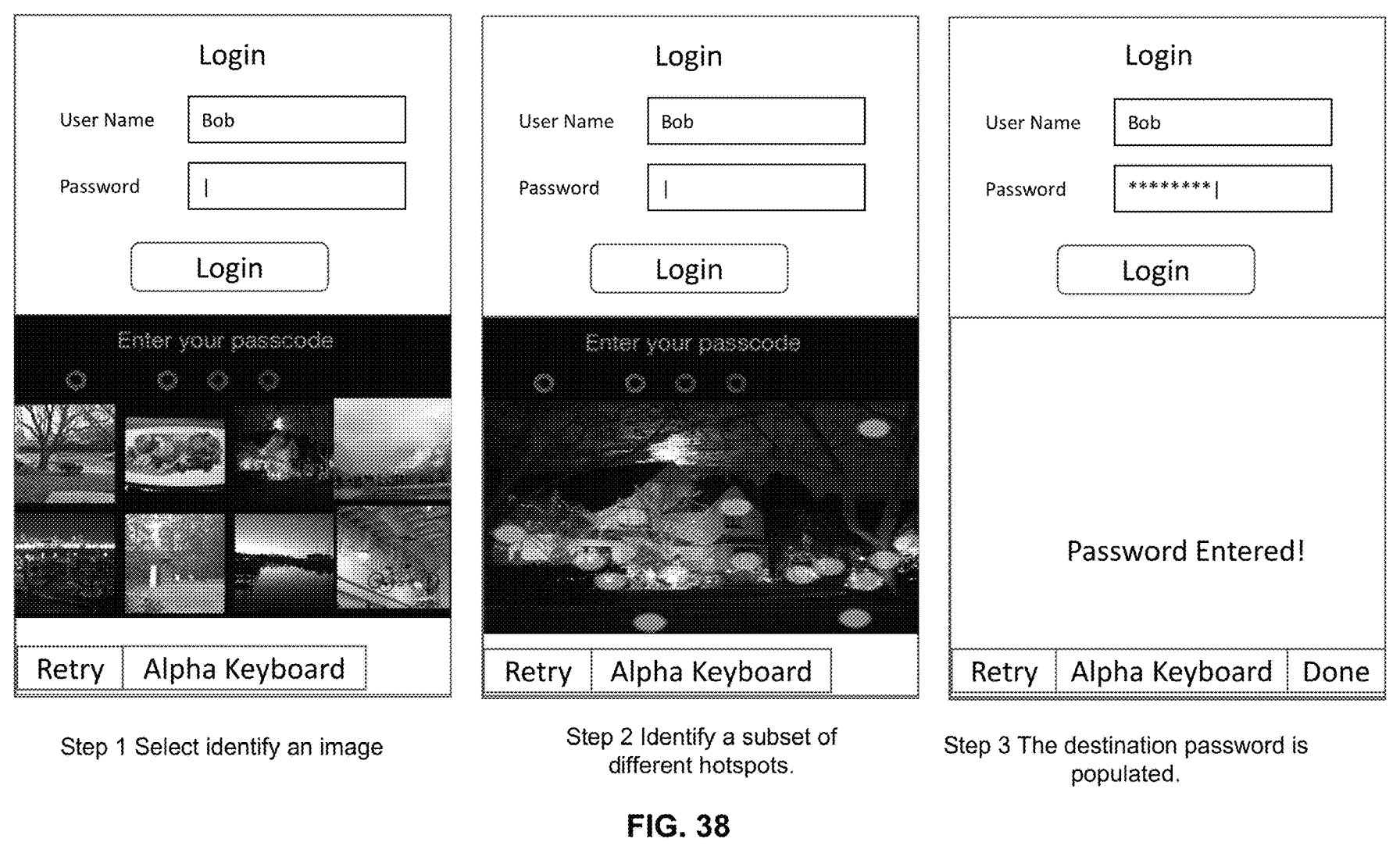

FIG. 38 illustrates an example implementation of entering a visual access code according to an example embodiment. At step one, the user navigates to a destination website or application or login screen that requires authentication. The VAI can detect the destination's authentication form and retrieves the visual access code associated with the destinations identifier. The VAI presents the user with a set of images that includes the image previously registered by the user for the destination. In response to the user selecting the image matching the registered image, the VAI proceeds to step two to present the user hotspots of the registered image. For example, the registered image may be of a house in include 16 possible hotspots.

In response to the user selecting a series of hotspots that match previously registered hotspots, the visual input method proceeds to step three. For example, the user may identify four hotspots by touching different locations on the image that correspond to different parts of the house depicted that match the hotspots user selected during the registration process. At step three, the virtual input method inputs the alphanumeric password stored with the visual access code into the destination's authentication form. In some example embodiments, the virtual input method may present a confirmation message that the user has successfully input the visual access code. The user may proceed by clicking on the destination's authentication form to complete logging in without having to type an alphanumeric password.

Figure 39A:
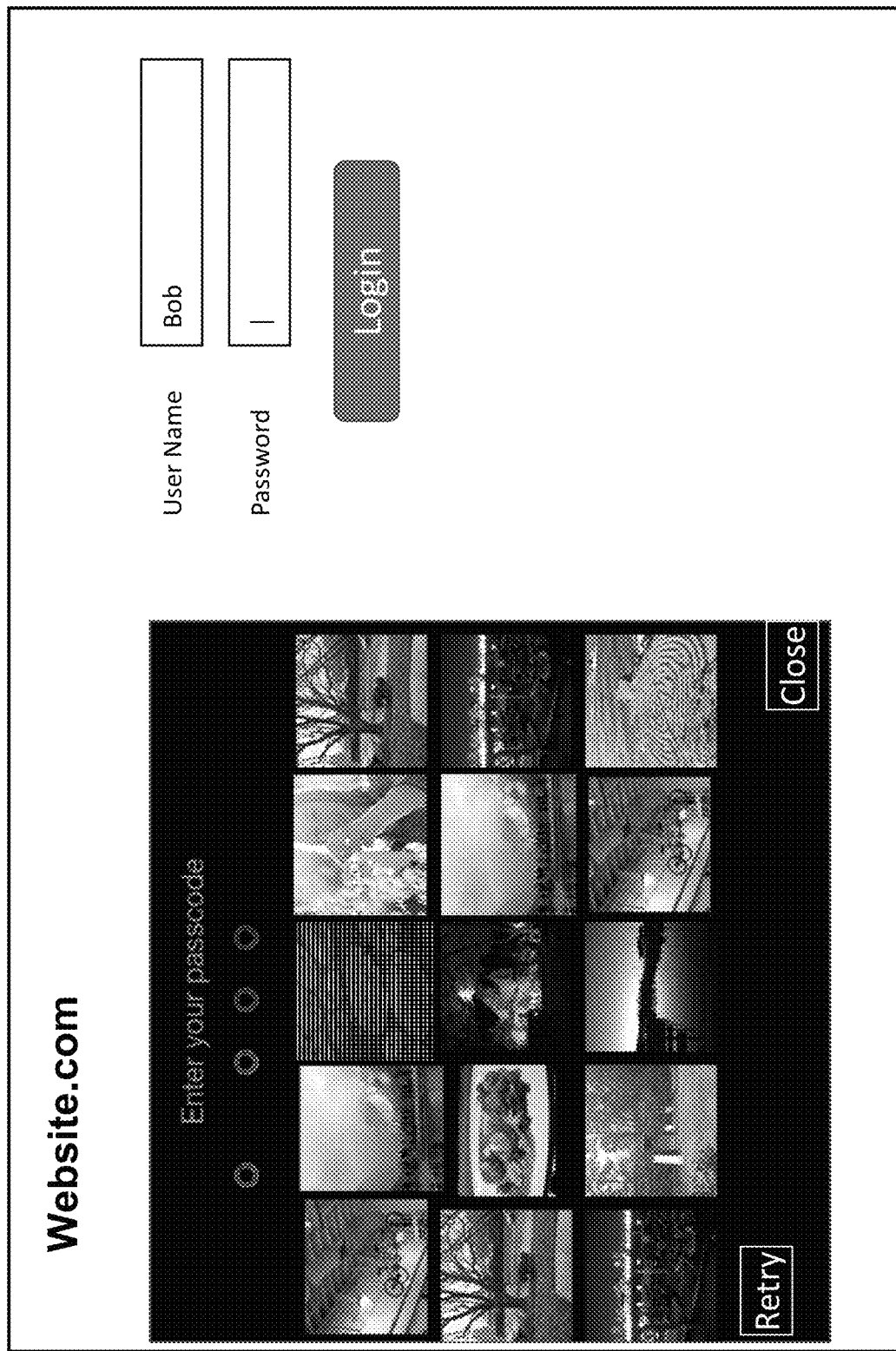
FIGS. 39A-C illustrate an example implementations of the virtual input method on a website according to various embodiments.
Figure 39B:
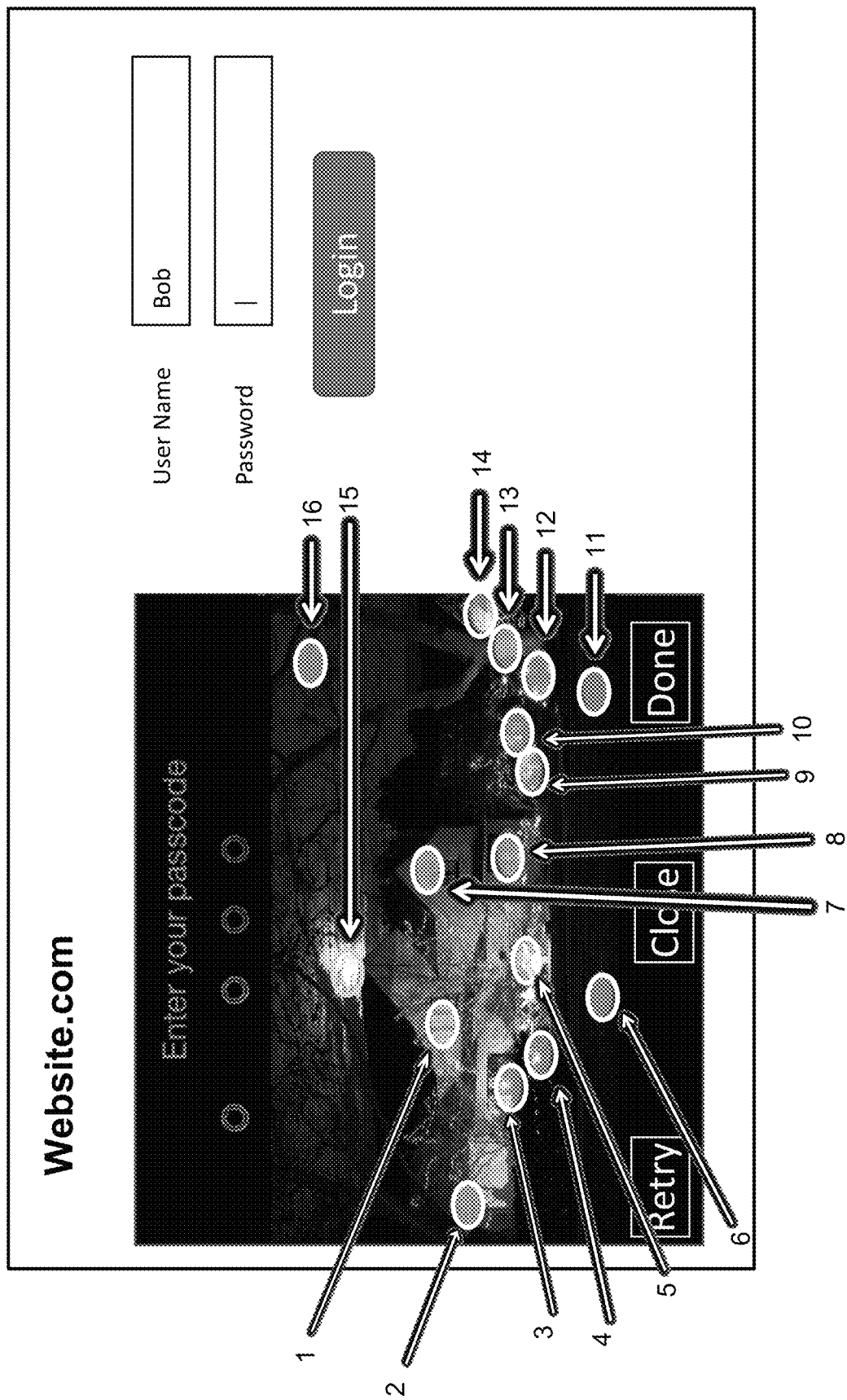
Figure 39C:
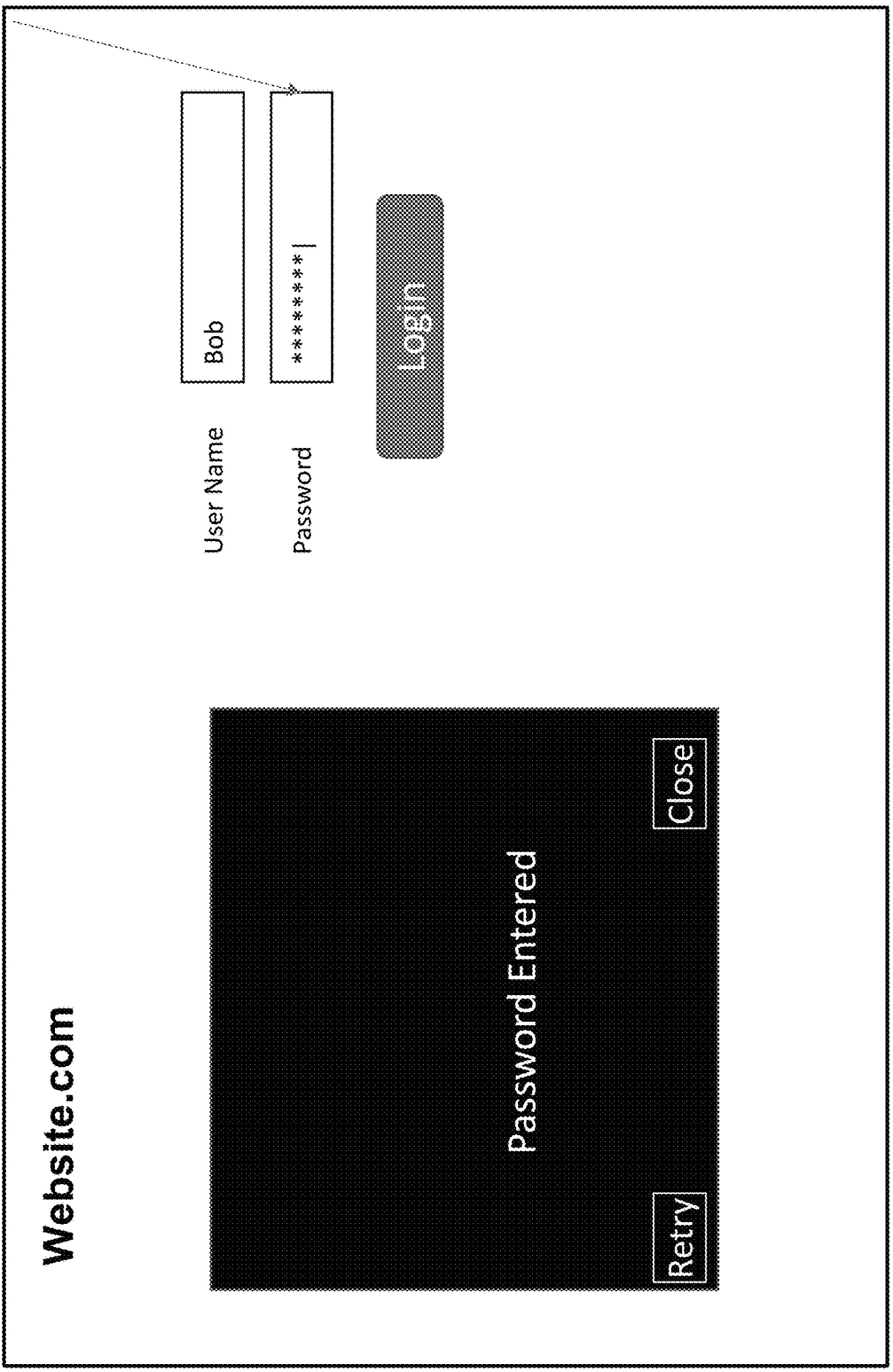

FIGS. 39A-C illustrate an example implementations of the virtual input method on a website according to various embodiments. FIG. 39A illustrates a first phase for the virtual input method that present the user with several images that include a previously registered image. The user may identify the previously registered image by clicking or touching the registered image. In response to the user selecting the image that matches the registered image, the user may be presented with the registered image and instructed to identify a series of hotspots the registered image At FIG. 39B the user is presented a hotspot selection screen for the virtual input method. The interface can present the user with several hotspots for the selected image. In response to the user selecting the series of hotspots the registered image that match the registered series of hotspots, the visual access code process may authenticate the user to the device or service. For example, the user can click or touch four locations on the picture that correspond to the hotspot locations the user selected during the registration process. For example, the visual access process determines if the user selected locations satisfy the corresponding index numbers stored during the registration process. According to another example implementation, the visual access process determines if the user selected locations satisfy the two dimensional coordinate of a corresponding pixel in the photograph from the registration process.

In an example implementation, to satisfy the second phase of the visual access code process for authenticating the user, the series of hotspots on the registered image may be identified in the same order as the hotspots were selected during the registration process. In another example implementation, the series of hotspots on the registered image may be identified in the any order to satisfy the second phase of the visual access code process for authenticating the user. Since permutations of locations and visual cues are greatly increased over traditional alphanumerical combinations, the user first recalling the correct image and then identifying the series of hotspot locations on the correct image may be sufficient for authenticating the user.

In response to the user selecting the image that does not match the registered image, the user may be presented with a non-matching image and instructed to identify a series of hotspots the non-matching image. To authenticate the user, the visual access code process can provide or suppress feedback to the user regarding the first selection of an image from the plurality of images. Accordingly, an unauthorized user may not be notified whether the first selection of an image or second identification of the series of hotspots failed to satisfy the visual access code process. Repeated attempts indicating a guessing of different combinations of images from the group of images and hotspot locations may be then be detected as a brute force attack.

Figure 40:
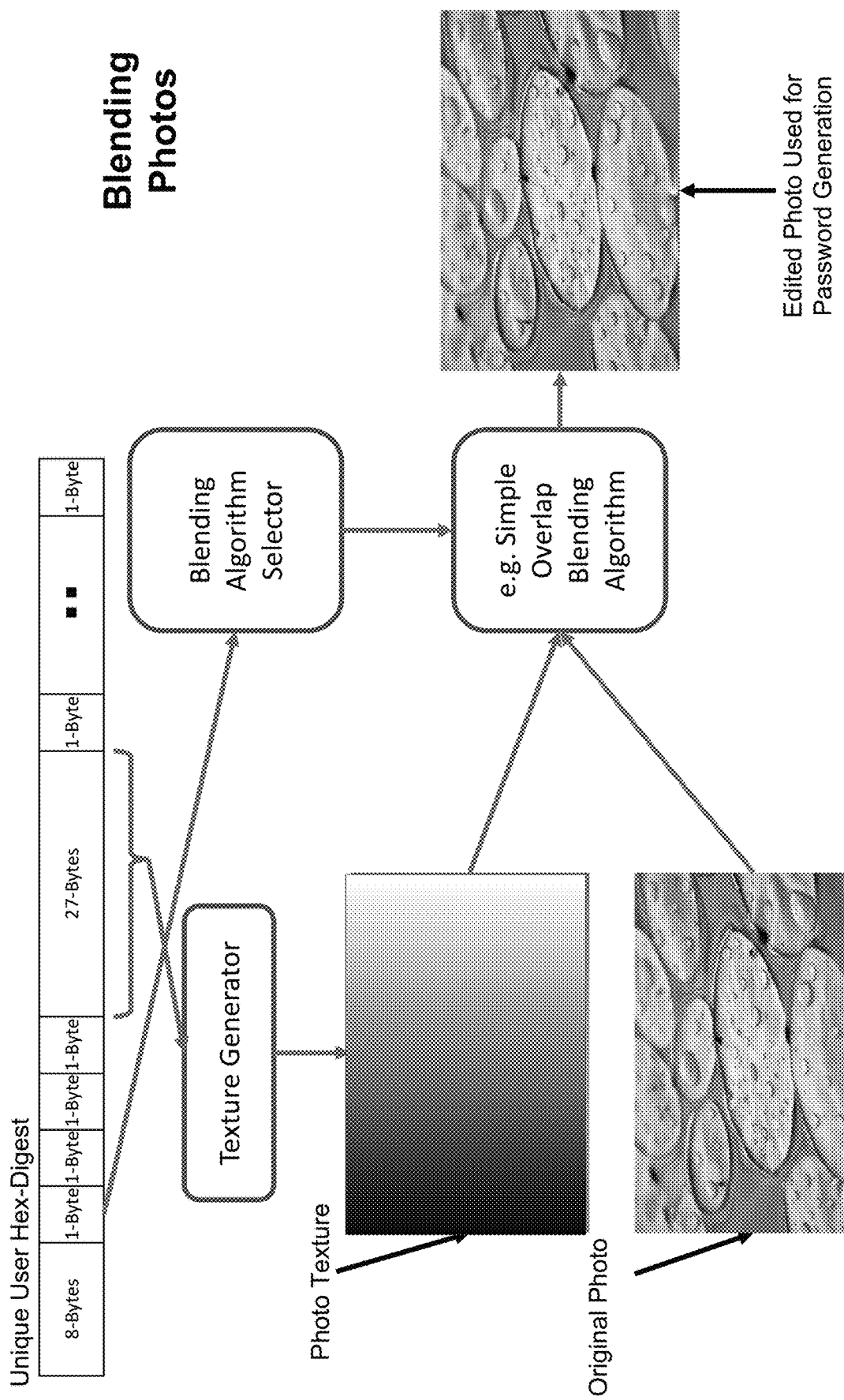
FIG. 40 illustrates an image blending process in accordance with various embodiments.

If the correct hotspots are selected, the virtual input method can proceed to FIG. 39C to present the user with a confirmation and populate an alphanumeric final password in the destination's login form To create secure visual access codes for each user, the process can employ modified images that are unique for each user that appear visually indiscernible. In an embodiment, the process can include shifting center point of the original image to modify the coordinates of the hotspots and add a blended texture secure the image data FIG. 40 illustrates an image blending process in accordance with various embodiments. Blending photos for each user provides different password for each user that are not detectable by simply looking observing a user's image selection. In an embodiment, the system combines a texture masking with an original photo via a blending algorithm creates a modified photo for generating secure visual access codes. An example phot blending algorithm can include:

```
Let resultingPhoto = copyPhoto(originalPhotoSize)
For each x in 0 to photoWidth
    For each y in 0 to photoHeight
        resultingPhotoPixelAt(x,y) = resultingPhotoPixelAt(x,y) +
setTransparencyTo(photoBlendingFilterPixelAt(x,y),20%)
    End
End
```

In an example embodiment, the system selects a blending algorithm and the photo filter bitmap based on data stored in the unique user hex digest. For example, the hex digest can include value to indicate a simple overlap blending algorithm for creating the modified photo. Multiple blending and password mapping algorithms improves security of the access code.

Figure 41:
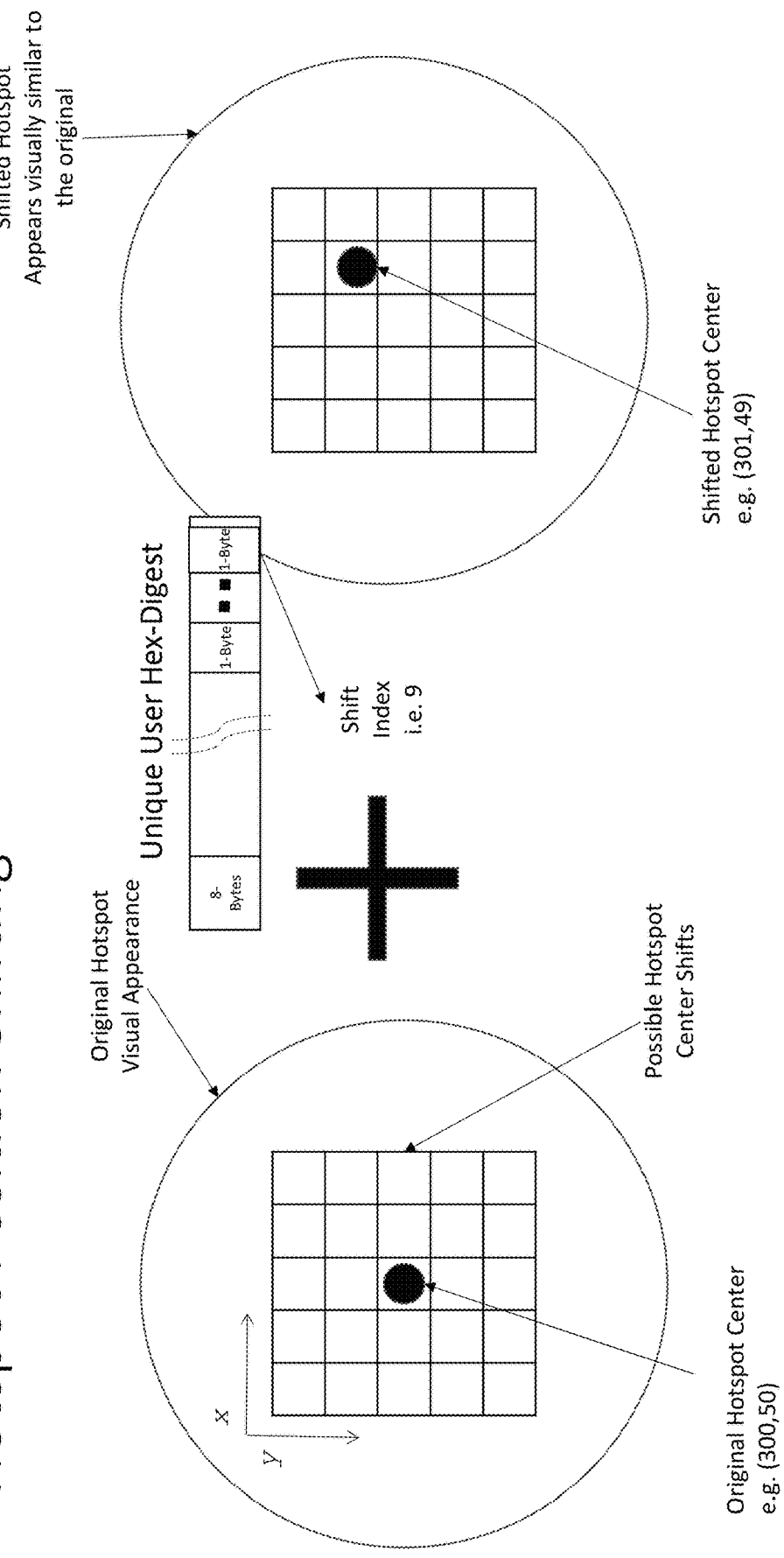
FIG. 41 illustrates an example implementation of hotspot position shifting in accordance with various embodiments.

FIG. 41 illustrates an example implementation of hotspot position shifting in accordance with various embodiments. By shifting the center point of the original photo coordinates, the location values of the hotspots the image can be changed to generate different passwords for each user using the same visual image and maintaining the visual appearance of the image An example hotspot shifting algorithm can include:

```
Input hotspotShiftingIndex
For each hotspot
    hotspot.x = (hotspot.x - 2) + (hotspotShiftingIndex remainder 5)
    hotspot.y = (hotspot.y - 2) + (hotspotShiftingIndex modulus 5)
End
```

For example, based on the unique user phrase provided by during the registration phase, the hex digest can provide a shift value for shifting the hotspot center and thereby differentiating the hotspot coordinates for the image for the user. For example, an original hotspot center with location coordinates 30, 50 when shifted based on a shift value of 9 in the unique user hex digest shifts the hotspot center to location coordinates 301, 49.

Figure 42:
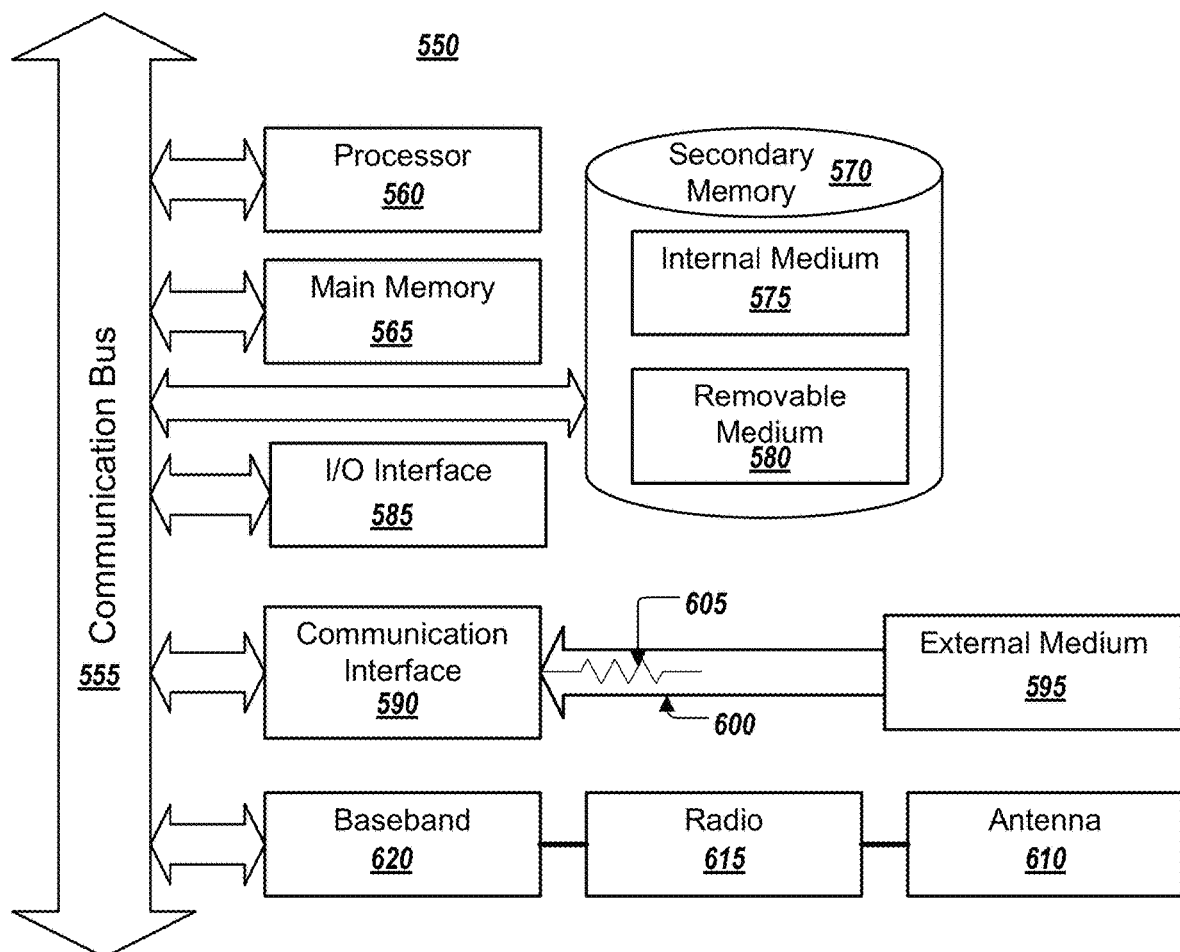
FIG. 42 is a block diagram illustrating wired or wireless system according to various embodiments.

FIG. 42 is a block diagram illustrating wired or wireless system 550 according to various embodiments. Referring to FIGS. 1 and 21, the system 550 may be used to implement the media platform 120. In various embodiments, the system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, the secondary memory 570 may include other similar means for allowing computer programs or other data or instructions to be loaded into the system 550. Such means may include, for example, an external storage medium 595 and a communication interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable medium 580 and a communication interface, which allow software and data to be transferred from an external storage medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g., printers, networks, information sources, etc.). For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. The electrical communication signals 605 are preferably provided to communication interface 590 via a communication channel 600. In one embodiment, the communication channel 600 may be a wired or wireless network, or any variety of other communication links. Communication channel 600 carries the electrical communication signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of the media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The processor 560 has access to one or more data storage areas including, for example, but not limited to, the main memory 565 and the secondary memory 570. The processor 560 is preferably configured to execute instructions (i.e., computer programs or software) that can be stored in the main memory 565 or in the secondary memory 570. Computer programs can also be received from the baseband processor 610 and stored in the main memory 565 or in the secondary memory 570, or executed upon receipt. Such computer programs, when executed, enable the system 550 to perform the various functions of the present invention as previously described. For example, the main memory 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for authenticating a user in system comprising a plurality of devices, each storing a plurality of media objects, comprising:
   in response to a first device of the plurality of devices detecting an attempt to access a media object stored thereon by a second device of the plurality of devices, presenting to a user of the second device via visual authentication interface (VAI), a plurality of images;
   receiving, from the user, a selection of a first image from the plurality of images;
   receiving, from the user, a selection of at least a first set of hotspots, wherein the first set of hotspots are associated with the user, from a plurality of hotspots included in the first image;
   generating, via a processing device, a visual access code based on on an index number associated with the first image and a set of attributes associated with the first set of hotspots;
   encoding and storing the visual access code in order to authenticate the user in the future.

2. The method of claim 1, wherein each of the plurality of images is associated with a corresponding index number.

3. The method of claim 2, wherein each index number comprises a globally unique image identifier.

4. The method of claim 1, wherein the set of attributes associated with each of the plurality of hotspots includes a corresponding index number.

5. The method of claim 1, wherein the set of attributes associated with each of the plurality of hotspots includes a two dimensional coordinate of a corresponding pixel in the image.

6. The method of claim 1, wherein the generating the visual access code is based on the order of the selected hotspots.

7. The method of claim 1, wherein the generating the visual access code is not based on the order of the selected hotspots.

8. The method of claim 1, wherein the plurality of hotspots are visible to the user.

9. The method of claim 1, wherein the plurality of hotspots are hidden from the user.

10. The method of claim 1, wherein the locations of the plurality of hotspots are based on features of the photographs.

11. A method for authenticating a user in system comprising a plurality of services, comprising:
    presenting, to a user, a plurality of images, wherein the plurality of images include a registered image, wherein a subset of hotspots located on the registered image are associated with the user; and in response to receiving, from the user, a visual access code associated with a service, wherein the visual access code is based at least in part on a selection of the registered image from the plurality of images, and a selection of the hotspots from a plurality of hotspots located on the registered image, decrypting a stored visual access code;

comparing the decrypted visual access code to the received access code; and when the decrypted and received visual access codes are the same, authenticating the user to the service.

12. The method of claim 11, wherein each of the plurality of images is associated with a corresponding index number, and wherein the visual access code received from the user is based on the index number.

13. The method of claim 12, wherein each index number comprises a globally unique image identifier.

14. The method of claim 11, wherein each of the plurality of hotspots is associated with a corresponding index number, and wherein the visual access code received from the user is based on the index number.

15. The method of claim 11, wherein each of the plurality of hotspots is associated with a two dimensional coordinate of a corresponding pixel in the image, and wherein the visual access code received from the user is based on the two dimensional coordinate.

16. The method of claim 11, wherein the visual access code is further based on the order of the selected hotspots.

17. The method of claim 11, wherein the visual access code is not based on the order of the selected hotspots.

18. The method of claim 11, wherein the plurality of hotspots are visible to the user.

19. The method of claim 11, wherein the plurality of hotspots are hidden from the user.

20. The method of claim 11, wherein the locations of the plurality of hotspots are based on features of the photographs.

* * * * *